US010876408B2

(12) United States Patent
Nishikawa et al.

(10) Patent No.: US 10,876,408 B2
(45) Date of Patent: Dec. 29, 2020

(54) STEAM TURBINE

(71) Applicant: Mitsubishi Hitachi Power Systems, Ltd., Kanagawa (JP)

(72) Inventors: Toyoharu Nishikawa, Tokyo (JP); Katsuhisa Hamada, Kanagawa (JP); Takumi Matsumura, Tokyo (JP)

(73) Assignee: MITSUBISHI POWER, LTD., Kanagawa (JP)

(*) Notice: Subject to any disclaimer, the term of this patent is extended or adjusted under 35 U.S.C. 154(b) by 328 days.

(21) Appl. No.: 16/062,957

(22) PCT Filed: Dec. 21, 2016

(86) PCT No.: PCT/JP2016/088148
§ 371 (c)(1),
(2) Date: Jun. 15, 2018

(87) PCT Pub. No.: WO2017/110894
PCT Pub. Date: Jun. 29, 2017

(65) Prior Publication Data
US 2018/0371917 A1 Dec. 27, 2018

(30) Foreign Application Priority Data

Dec. 24, 2015 (JP) .................................. 2015-252489
Dec. 24, 2015 (JP) .................................. 2015-252490

(51) Int. Cl.
*F02C 6/18* (2006.01)
*F01D 5/08* (2006.01)
(Continued)

(52) U.S. Cl.
CPC .............. *F01D 5/08* (2013.01); *F01D 25/12* (2013.01); *F01K 7/22* (2013.01); *F01K 13/006* (2013.01);
(Continued)

(58) Field of Classification Search
CPC . Y02E 20/16; F02C 6/18; F01K 23/10; F05D 2260/2322
See application file for complete search history.

(56) References Cited

U.S. PATENT DOCUMENTS 4,571,153 A 2/1986 Keller
5,491,971 A * 2/1996 Tomlinson ............ F01K 23/106
60/39.182
(Continued)

FOREIGN PATENT DOCUMENTS

JP 58-167802 10/1983
JP 06-200704 7/1994
(Continued)

OTHER PUBLICATIONS

International Search Report dated Feb. 21, 2017 in International (PCT) Application No. PCT/JP2016/088148, with English Translation.
(Continued)

*Primary Examiner* — Gerald L Sung
(74) *Attorney, Agent, or Firm* — Wenderoth, Lind & Ponack, L.L.P.

(57) ABSTRACT

A steam turbine is for a combined cycle plant. The combined cycle plant includes a gas turbine; a boiler a heat source of which is a flue gas discharged from the gas turbine; a high-pressure steam turbine that includes a rotor extending along an axial center of rotation of the rotor, a steam passage provided along the extending direction of the rotor between the rotor and a casing for the rotor, and a high-pressure steam supply portion provided to communicate, from outside the casing through the casing, with the steam passage and configured to be supplied with superheated steam, the high-pressure steam turbine being driven by high-pressure steam generated by the boiler; and a low-pressure steam turbine configured to be driven by low-pressure steam
(Continued)

generated by the boiler and by the steam that has flowed through the high-pressure steam turbine.

14 Claims, 32 Drawing Sheets

(51) Int. Cl.
*F01D 25/12* (2006.01)
*F01K 7/22* (2006.01)
*F01K 13/00* (2006.01)
*F02C 7/16* (2006.01)

(52) U.S. Cl.
CPC .................. *F02C 6/18* (2013.01); *F02C 7/16* (2013.01); *F05D 2220/31* (2013.01); *F05D 2260/2322* (2013.01)

(56) References Cited

U.S. PATENT DOCUMENTS

| | | | |
|---|---|---|---|
| 8,277,173 B2 | 10/2012 | Yamashita et al. | |
| 8,376,687 B2 | 2/2013 | Kasibhotla et al. | |
| 9,074,480 B2 | 7/2015 | Ishiguro et al. | |
| 9,759,091 B2 | 9/2017 | Ishiguro et al. | |
| 2004/0045274 A1 | 3/2004 | Uematsu et al. | |
| 2004/0247433 A1 | 12/2004 | Haje et al. | |
| 2012/0023945 A1* | 2/2012 | Ishiguro | F01K 7/04 60/646 |
| 2012/0308360 A1* | 12/2012 | Willett, Jr. | F01D 11/02 415/115 |

FOREIGN PATENT DOCUMENTS

| | | |
|---|---|---|
| JP | 11-132006 | 5/1999 |
| JP | 2002-147205 | 5/2002 |
| JP | 2004-239262 | 8/2004 |
| JP | 2011-085135 | 4/2011 |
| JP | 5008735 | 6/2012 |
| WO | 2010/097983 | 9/2010 |

OTHER PUBLICATIONS

Written Opinion of the International Searching Authority dated Feb. 21, 2017 in International (PCT) Application No. PCT/JP2016/088148, with English Translation.

* cited by examiner

STEAM TURBINE

FIELD

The present invention relates to a steam turbine applied to a combined cycle plant.

BACKGROUND

Conventionally, for example, a steam turbine described in Patent Literature 1 includes a rotor having a plurality of early stages, a stator portion that surrounds a portion of the rotor, that is configured such that a leakage region is present between the rotor and the stator portion, and that has a cooling steam channel for conducting cooling steam from a portion of the stator portion to the leakage region, and at least one cooling steam transmission channel that is disposed so as to be axially displaced around the rotor, and that receives the cooling steam from the leakage region and supplies the cooling steam to at least a part of the early stages. Patent Literature 1 also describes a combined cycle power plant that includes a gas turbine and a boiler (heat recovery steam generator) that is connected to the output of the gas turbine and uses a flue gas of the gas turbine to heat the steam/water to a high temperature, and that supplies the high-temperature steam to the steam turbine.

Conventionally, for example, a steam turbine described in Patent Literature 2 includes an inner casing. A rotor rotatable about the axis line thereof is disposed in the inner casing. A steam passage is formed between the rotor and the inner casing. Guide vanes fixed to the inner casing and a multi-stage arrangement of rotor blades fixed to the rotor are provided in the steam passage. In this arrangement, high-temperature steam is released from an inlet port under a work output. In Patent Literature 2, it is also described that, in such a steam turbine, to protect the rotor and the inner casing from thermal loads, a plate-shaped protective shield is provided parallel and close to a surface of the rotor, and/or parallel and close to an inner surface of the inner casing in at least the steam passage, for protecting the rotor or a surface of the inner casing located thereunder from a direct effect of the high-temperature steam flowing through the steam passage.

Conventionally, for example, a method and a device for cooling steam turbine generating equipment are described in Patent Literature 3 in which a boiler includes a superheater that superheats steam, and the steam from which air has been bled is supplied as cooling steam from the superheater to a steam turbine.

CITATION LIST

Patent Literature

Patent Literature 1: Japanese Patent Application Laid-open No. 2011-085135
Patent Literature 2: Japanese Patent No. 5008735
Patent Literature 3: International Publication WO2010/097983 pamphlet

SUMMARY

Technical Problem

Thus, to protect, for example, the rotor of the steam turbine from the heat of the steam, it is known to supply the cooling steam as described in Patent Literature 1, and to provide the protective shield as described in Patent Literature 2.

The steam turbine described in Patent Literature 1 is described to include a steam source that supplies the high-pressure, low-temperature steam to a casing and the steam channel, but the steam source is not specifically described. To cool, for example, the rotor, the steam at a lower temperature than that of steam supplied to drive the steam turbine needs to be supplied, and the steam at a higher pressure than that of the steam supplied to drive the steam turbine needs to be supplied. A maximum temperature portion of the rotor of the steam turbine is at the highest pressure in the steam turbine, and is not easily supplied with the cooling steam that is at a higher pressure than this pressure and is at a lower temperature. This is because the steam in the steam turbine is simultaneously subjected to a reduction in temperature and a reduction in pressure. This causes the problem that, in the case of using a fluid outside the steam turbine, another source of power is required to reduce the temperature and/or increase the pressure of the fluid, or the problem that, in the case of using a fluid inside the steam turbine, the steam turbine is reduced in operating efficiency, and a combined cycle plant, such as the combined cycle power plant described in Patent Literature 1, is reduced in cycle efficiency.

In the steam turbine, the steam passage in which turbine blades provided on the rotor and turbine vanes provided in the casing are arranged is formed between the rotor and the casing. Nozzle portion vanes are provided at an opening of a nozzle portion that communicates with the steam passage and supplies the superheated steam. Accordingly, the nozzle portion vanes are exposed to the steam superheated to approximately 550° C. to 600° C., and therefore is desired to be improved in durability. However, in Patent Literature 3, the cooling steam is supplied to an outlet side of the nozzle portion vanes, and therefore does not cool the nozzle portion vanes, thus not contributing to the improvement of the durability thereof.

The present invention has been made to solve the above-described problems, and an object of the present invention is to provide a steam turbine that is capable of preventing the combined cycle plant from decreasing in the cycle efficiency and improving the durability of the nozzle portion vanes without requiring another source of power.

Solution to Problem

To achieve the object described above, a steam turbine of a first invention is for a combined cycle plant. The combined cycle plant includes a gas turbine; a boiler a heat source of which is a flue gas discharged from the gas turbine; a high-pressure steam turbine configured to be driven by high-pressure steam generated by the boiler; a low-pressure steam turbine configured to be driven by low-pressure steam generated by the boiler and by the steam that has flowed through the high-pressure steam turbine; a condenser configured to condense the steam that has flowed through the low-pressure steam turbine into a condensate; and a condensate pump configured to supply the condensate from the condenser to the boiler. The boiler includes a high-pressure evaporator configured to generate steam from the condensate from the condenser, a high-pressure primary superheater configured to superheat the steam generated by the high-pressure evaporator, and a high-pressure secondary superheater configured to further superheat the steam superheated by the high-pressure primary superheater, the steam superheated by the high-pressure secondary superheater being supplied for driving the high-pressure steam turbine. The steam turbine includes a cooling steam supply portion including a connection line that communicates a portion extending from an outlet of the high-pressure evaporator through the high-pressure primary superheater into the high-pressure secondary superheater with an inside of the high-pressure steam turbine.

Since this steam turbine includes the cooling steam supply portion that includes the connection line that communicates the portion extending from the outlet of the high-pressure evaporator through the high-pressure primary superheater into the high-pressure secondary superheater with the inside of the high-pressure steam turbine, the cooling steam higher in pressure and lower in temperature than the superheated steam supplied to the high-pressure steam turbine can be supplied to the inside of the high-pressure steam turbine in the combined cycle plant. As a result, high-temperature portions in the high-pressure steam turbine can be cooled without requiring another source of power. Since the cooling is performed using the steam generated in the combined cycle plant and not using any fluid in the high-pressure steam turbine, the high-pressure steam turbine can be prevented from decreasing in operating efficiency, and as a result, the cycle efficiency can be prevented from decreasing.

In the steam turbine of a second invention according to the first invention, the connection line communicates a portion extending from an outlet of the high-pressure primary superheater to an inlet of the high-pressure secondary superheater with the inside of the high-pressure steam turbine.

When the cooling steam is supplied from the portion extending from the outlet of the high-pressure primary superheater to the inlet of the high-pressure secondary superheater to the inside of the high-pressure steam turbine, the steam supplied to the high-pressure secondary superheater decreases. Consequently, the high-pressure secondary superheater increases in superheating efficiency, and the superheated steam supplied to the high-pressure steam turbine increases in temperature. As a result, the high-pressure steam turbine can increase in operating efficiency, and the cycle efficiency can increase.

When the cooling steam is supplied from the portion extending from the outlet of the high-pressure primary superheater to the inlet of the high-pressure secondary superheater to the inside of the high-pressure steam turbine, the amount of steam obtained from the high-pressure evaporator can increase to increase the amount of superheated steam supplied to the high-pressure steam turbine if the temperature of the superheated steam supplied to the high-pressure steam turbine is constant. Consequently, the amount of the superheated steam supplied to the high-pressure steam turbine can increase. As a result, the high-pressure steam turbine can increase in operating efficiency, and the cycle efficiency can increase.

In the steam turbine of a third invention according to the first or second invention, the high-pressure steam turbine includes a rotor extending along an axial center of rotation of the rotor, a casing accommodating the rotor, a steam passage provided along the extending direction of the rotor between the rotor and the casing, and a high-pressure steam supply portion that is provided so as to communicate, from outside the casing through the casing, with the steam passage and that is supplied with the steam superheated by the high-pressure secondary superheater, and in that the cooling steam supply portion includes a communication flow passage connected to the connection line and communicating, from outside the casing through the casing, with the steam passage separately from the high-pressure steam supply portion.

With this steam turbine, the cooling steam higher in pressure and lower in temperature than the superheated steam supplied to the high-pressure steam turbine can be suitably supplied to the inside of the high-pressure steam turbine.

In the steam turbine of a fourth invention according to the third invention, the high-pressure steam supply portion includes a high-pressure steam nozzle portion that is formed in an annular shape surrounding an outer circumference of the rotor and mounted to the casing to have a gap communicating with the steam passage between an outer surface of the high-pressure steam nozzle portion and the outer circumferential surface of the rotor, the high-pressure steam nozzle portion having a high-pressure steam nozzle chamber formed therein along an annular shape and an opening communicating with the steam passage from the high-pressure steam nozzle chamber toward the extending direction of the rotor, the high-pressure steam nozzle chamber being supplied with the steam superheated by the high-pressure secondary superheater, and in that the communication flow passage is provided so as to communicate with the gap on the opposite side of the opening of the high-pressure steam nozzle chamber in the high-pressure steam nozzle portion.

With this steam turbine, since the cooling steam higher in pressure and lower in temperature than the superheated steam supplied to the high-pressure steam turbine is discharged through the communication flow passage to the gap between the high-pressure steam supply portion and the outer circumferential surface of the rotor, the rotor can be cooled. In addition, since the cooling steam higher in pressure and lower in temperature than the superheated steam supplied to the high-pressure steam turbine is discharged through the communication flow passage to the gap between the high-pressure steam supply portion and the outer circumferential surface of the rotor, the superheated steam is prevented from leaking out from the steam passage through the gap. As a result, since the superheated steam is prevented from being lost, the high-pressure steam turbine can increase in operating efficiency, and the cycle efficiency can increase.

In the steam turbine of a fifth invention according to the fourth invention, the communication flow passage includes a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of a sixth invention according to the fifth invention, the cooling steam nozzle is provided with a tip thereof directed toward a rotational direction of the rotor.

With this steam turbine, the cooling steam is discharged through the cooling steam nozzle along the rotational direction of the rotor from the communication flow passage to the gap. As a result, a frictional loss generated by a difference between the rotational velocity of the rotor and the velocity of the cooling steam can be reduced.

In the steam turbine of a seventh invention according to any one of the fourth to sixth inventions, the high-pressure steam turbine includes nozzle portion vanes mounted to the opening of the high-pressure steam nozzle chamber in the high-pressure steam nozzle portion and turbine blades mounted to the outer circumference of the rotor adjacent to the nozzle portion vanes, and in that the cooling steam supply portion includes a projecting portion provided at least at either one of a proximal end portion on the nozzle portion vane side of the turbine blades or a distal end portion on the turbine blade side of the nozzle portion vanes.

With this steam turbine, the projecting portion causes the cooling steam flowing toward the steam passage to generate a vortex between the distal end portion of the nozzle portion vanes and the proximal end portion of the turbine blades. As a result, the superheated steam in the steam passage is prevented from being mixed in a complex manner with the cooling steam flowing toward the steam passage to raise the temperature of the cooling steam, and thus, the cooling efficiency can increase.

In the steam turbine of an eighth invention according to the third invention, the high-pressure steam supply portion includes a high-pressure steam nozzle portion that is formed in an annular shape surrounding an outer circumference of the rotor and mounted to the casing to have a gap communicating with the steam passage between an outer surface of the high-pressure steam nozzle portion and the outer circumferential surface of the rotor, the high-pressure steam nozzle portion having a high-pressure steam nozzle chamber formed therein along an annular shape and an opening communicating with the steam passage from the high-pressure steam nozzle chamber toward the extending direction of the rotor, the high-pressure steam nozzle chamber being supplied with the steam superheated by the high-pressure secondary superheater, and in that nozzle portion vanes are mounted to the opening of the high-pressure steam nozzle chamber in the high-pressure steam nozzle portion, and the communication flow passage is provided so as to penetrate the nozzle portion vanes and communicate with the gap.

With this steam turbine, since the cooling steam higher in pressure and lower in temperature than the superheated steam supplied to the high-pressure steam turbine is discharged through the communication flow passage to the gap between the high-pressure steam supply portion and the outer circumferential surface of the rotor, the rotor can be cooled. In addition, since the cooling steam higher in pressure and lower in temperature than the superheated steam supplied to the high-pressure steam turbine is discharged through the communication flow passage to the gap between the high-pressure steam supply portion and the outer circumferential surface of the rotor, the superheated steam is prevented from leaking out from the steam passage through the gap. As a result, since the superheated steam is prevented from being lost, the high-pressure steam turbine can increase in operating efficiency, and the cycle efficiency can increase. Furthermore, since the communication flow passage is provided so as to penetrate the nozzle portion vanes, the nozzle portion vanes can be cooled, and thus, the nozzle portion vanes can be improved in durability against a rise in temperature of the high-pressure steam turbine.

In the steam turbine of a ninth invention according to the eighth invention, the communication flow passage includes a cooling hole penetrating the nozzle portion vanes and open to the steam passage.

With this steam turbine, the cooling steam is discharged to the steam passage through the cooling hole penetrating the nozzle portion vanes. As a result, the nozzle portion vanes can be cooled, and thus, the nozzle portion vanes can be improved in durability against a further rise in temperature of the high-pressure steam turbine.

In the steam turbine of a tenth invention according to the eighth or ninth invention, the communication flow passage includes a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of an eleventh invention according to the tenth invention, the cooling steam nozzle is provided with a tip thereof directed toward the rotational direction of the rotor.

With this steam turbine, the cooling steam is discharged through the cooling steam nozzle along the rotational direction of the rotor from the communication flow passage to the gap. As a result, the frictional loss generated by the difference between the rotational velocity of the rotor and the velocity of the cooling steam can be reduced.

In the steam turbine of a twelfth invention according to the third invention, steam passage vanes are mounted to the casing forming the steam passage to have a gap communicating with the steam passage between the steam passage vanes and the outer circumferential surface of the rotor, and the communication flow passage is provided so as to penetrate the steam passage vanes and communicate with the gap.

With this steam turbine, since the cooling steam higher in pressure and lower in temperature than the superheated steam supplied to the high-pressure steam turbine is discharged through the communication flow passage to the gap between the steam passage vanes and the outer circumferential surface of the rotor, the rotor can be cooled. In addition, since the communication flow passage is provided so as to penetrate the steam passage vanes, the steam passage vanes can be cooled, and thus, the steam passage vanes can be improved in durability against the rise in temperature of the high-pressure steam turbine.

In the steam turbine of a thirteenth invention according to the twelfth invention, the communication flow passage includes a cooling hole penetrating the steam passage vanes and open to the steam passage.

With this steam turbine, the cooling steam is discharged to the steam passage through the cooling hole penetrating the steam passage vanes. As a result, the nozzle portion vanes can be cooled, and thus, the steam passage vanes can be improved in durability against the further rise in temperature of the high-pressure steam turbine.

In the steam turbine of a fourteenth invention according to the twelfth or thirteenth invention, the communication flow passage includes a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of a fifteenth invention according to the fourteenth invention, the cooling steam nozzle is provided with a tip thereof directed toward the rotational direction of the rotor.

With this steam turbine, the cooling steam is discharged through the cooling steam nozzle along the rotational direction of the rotor from the communication flow passage to the gap. As a result, the frictional loss generated by the difference between the rotational velocity of the rotor and the velocity of the cooling steam can be reduced.

In the steam turbine of a sixteenth invention according to any one of the eighth invention to the fifteenth invention, turbine blades are mounted to the outer circumference of the rotor adjacent to the vanes, and the first cooling steam supply portion comprises a projecting portion provided at least at either one of a proximal end portion on the vane side of the turbine blades adjacent to the vanes penetrated by the communication flow passage and a distal end portion on the turbine blade side of the vanes penetrated by the communication flow passage.

With this steam turbine, the projecting portion causes the cooling steam flowing toward the steam passage to generate a vortex between the distal end portion of the vanes and the proximal end portion of the turbine blades. As a result, the superheated steam in the steam passage is prevented from being mixed in a complex manner with the cooling steam flowing toward the steam passage to raise the temperature of the cooling steam, and thus, the cooling efficiency can increase.

To achieve the object described above, a steam turbine of a seventeenth invention is for a combined cycle plant. The combined cycle plant includes a gas turbine; a boiler a heat source of which is a flue gas discharged from the gas turbine; a high-pressure steam turbine configured to be driven by high-pressure steam generated by the boiler; an intermediate-pressure steam turbine configured to be driven by intermediate-pressure steam generated by the boiler; a low-pressure steam turbine configured to be driven by low-pressure steam generated by the boiler and by the steam that has flowed through the intermediate-pressure steam turbine; a condenser configured to condense the steam that has flowed through the low-pressure steam turbine into a condensate; and a condensate pump configured to supply the condensate from the condenser to the boiler. The boiler includes an intermediate-pressure evaporator configured to generate steam from the condensate from the condenser, an intermediate-pressure superheater configured to superheat the steam generated by the intermediate-pressure evaporator, a primary reheater configured to reheat the steam superheated by the intermediate-pressure superheater, and a secondary reheater configured to reheat the steam superheated by the primary reheater, the steam superheated by the secondary reheater being supplied for driving the intermediate-pressure steam turbine. The steam turbine includes a cooling steam supply portion comprising a connection line that communicates a portion extending from an outlet of the intermediate-pressure evaporator through the intermediate-pressure superheater and the primary reheater into the secondary reheater with an inside of the intermediate-pressure steam turbine.

Since this steam turbine includes the cooling steam supply portion that includes the connection line that communicates the portion extending from the outlet of the intermediate-pressure evaporator through the intermediate-pressure superheater and the primary reheater to the inside of the secondary reheater with the inside of the intermediate-pressure steam turbine, the cooling steam higher in pressure and lower in temperature than the superheated steam supplied to the intermediate-pressure steam turbine can be supplied to the inside of the intermediate-pressure steam turbine in the combined cycle plant. As a result, high-temperature portions, such as a rotor, inside the intermediate-pressure steam turbine can be cooled without requiring another source of power. Since the cooling is performed using the steam generated in the combined cycle plant and not using any fluid in the intermediate-pressure steam turbine, the intermediate-pressure steam turbine can be prevented from decreasing in operating efficiency, and as a result, the cycle efficiency can be prevented from decreasing.

In the steam turbine of an eighteenth invention according to the seventeenth invention, the connection line communicates a portion extending from an outlet of the intermediate-pressure superheater to an inlet of the primary reheater with the inside of the intermediate-pressure steam turbine.

When the cooling steam is supplied from the portion extending from the outlet of the intermediate-pressure superheater to the inlet of the primary reheater to the inside of the intermediate-pressure steam turbine, the steam supplied to the primary reheater and the secondary reheater decreases. Consequently, the primary reheater and the secondary reheater increase in superheating efficiency, and the superheated steam supplied to the intermediate-pressure steam turbine increases in temperature. As a result, the intermediate-pressure steam turbine can increase in operating efficiency, and the cycle efficiency can increase.

When the cooling steam is supplied from the portion extending from the outlet of the intermediate-pressure superheater to the inlet of the primary reheater to the inside of the intermediate-pressure steam turbine, the amount of steam obtained from the intermediate-pressure evaporator can increase to increase the amount of superheated steam supplied to the intermediate-pressure steam turbine if the temperature of the superheated steam supplied to the intermediate-pressure steam turbine is constant. As a result, the intermediate-pressure steam turbine can increase in operating efficiency, and the cycle efficiency can increase.

In the steam turbine of a nineteenth invention according to the seventeenth invention, the connection line communicates a portion extending from an outlet of the primary reheater to an inlet of the secondary reheater with the inside of the intermediate-pressure steam turbine.

When the cooling steam is supplied from the portion extending from the outlet of the primary reheater to the inlet of the secondary reheater to the inside of the intermediate-pressure steam turbine, the steam supplied to the secondary reheater decreases. Consequently, the secondary reheater increases in superheating efficiency, and the superheated steam supplied to the intermediate-pressure steam turbine increases in temperature. As a result, the intermediate-pressure steam turbine can increase in operating efficiency, and the cycle efficiency can increase.

When the cooling steam is supplied from the portion extending from the outlet of the primary reheater to the inlet of the secondary reheater to the inside of the intermediate-pressure steam turbine, the amount of steam obtained from the intermediate-pressure evaporator can increase to increase the amount of superheated steam supplied to the intermediate-pressure steam turbine if the temperature of the superheated steam supplied to the intermediate-pressure steam turbine is constant. As a result, the intermediate-pressure steam turbine can increase in operating efficiency, and the cycle efficiency can increase.

In the steam turbine of a twentieth invention according to any one of the seventeenth to nineteenth inventions, the intermediate-pressure steam turbine includes a rotor extending along an axial center of rotation of the rotor, a casing accommodating the rotor, a steam passage provided along the extending direction of the rotor between the rotor and the casing, and an intermediate-pressure steam supply portion that is provided so as to communicate, from outside the casing through the casing, with the steam passage and that is supplied with the steam superheated by the secondary repeater, and in that the cooling steam supply portion includes a communication flow passage connected to the connection line and communicating, from outside the casing through the casing, with the steam passage separately from the intermediate-pressure steam supply portion.

With this steam turbine, the cooling steam higher in pressure and lower in temperature than the superheated steam supplied to the intermediate-pressure steam turbine can be suitably supplied to the inside of the intermediate-pressure steam turbine.

In the steam turbine of a twenty-first invention according to the twentieth invention, the intermediate-pressure steam supply portion includes an intermediate-pressure steam nozzle portion that is formed in an annular shape surrounding an outer circumference of the rotor and mounted to the casing to have a gap communicating with the steam passage between an outer surface of the intermediate-pressure steam nozzle portion and the outer circumferential surface of the rotor, the intermediate-pressure steam nozzle portion having an intermediate-pressure steam nozzle chamber formed therein along an annular shape and an opening communicating with the steam passage from the intermediate-pressure steam nozzle chamber toward the extending direction of the rotor, the intermediate-pressure steam nozzle chamber being supplied with the steam superheated by the secondary repeater, and in that the communication flow passage is provided so as to communicate with the gap on the opposite side of the opening of the intermediate-pressure steam nozzle chamber in the intermediate-pressure steam nozzle portion.

With this steam turbine, since the cooling steam higher in pressure and lower in temperature than the superheated steam supplied to the intermediate-pressure steam turbine is discharged through the communication flow passage to the gap between the intermediate-pressure steam supply portion and the outer circumferential surface of the rotor, the rotor can be cooled. In addition, since the cooling steam higher in pressure and lower in temperature than the superheated steam supplied to the intermediate-pressure steam turbine is discharged through the communication flow passage to the gap between the intermediate-pressure steam supply portion and the outer circumferential surface of the rotor, the superheated steam is prevented from leaking out from the steam passage through the gap. As a result, since the superheated steam is prevented from being lost, the intermediate-pressure steam turbine can increase in operating efficiency, and the cycle efficiency can increase.

In the steam turbine of a twenty-second invention according to the twenty-first invention, the communication flow passage comprises a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of a twenty-third invention according to the twenty-second invention, the cooling steam nozzle is provided with a tip thereof directed toward a rotational direction of the rotor.

With this steam turbine, the cooling steam is discharged through the cooling steam nozzle along the rotational direction of the rotor from the communication flow passage to the gap. As a result, the frictional loss generated by the difference between the rotational velocity of the rotor and the velocity of the cooling steam can be reduced.

In the steam turbine of a twenty-fourth invention according to any one of the twentieth to twenty-third inventions, the intermediate-pressure steam turbine includes nozzle portion vanes mounted to the opening of the intermediate-pressure steam nozzle chamber in the intermediate-pressure steam nozzle portion and turbine blades mounted to the outer circumference of the rotor adjacent to the nozzle portion vanes, and in that the cooling steam supply portion includes a projecting portion provided at least at either one of a proximal end portion on the nozzle portion vane side of the turbine blades or a distal end portion on the turbine blade side of the nozzle portion vanes.

With this steam turbine, the projecting portion causes the cooling steam flowing toward the steam passage to generate a vortex between the distal end portion of the nozzle portion vanes and the proximal end portion of the turbine blades. As a result, the superheated steam in the steam passage is prevented from being mixed in a complex manner with the cooling steam flowing toward the steam passage to raise the temperature of the cooling steam, and thus, the cooling efficiency can increase.

In the steam turbine of a twenty-fifth invention according to the twentieth invention, the intermediate-pressure steam supply portion includes an intermediate-pressure steam nozzle portion that is formed in an annular shape surrounding an outer circumference of the rotor and mounted to the casing to have a gap communicating with the steam passage between an outer surface of the intermediate-pressure steam nozzle portion and the outer circumferential surface of the rotor, the intermediate-pressure steam nozzle portion having an intermediate-pressure steam nozzle chamber formed therein along an annular shape and an opening communicating with the steam passage from the intermediate-pressure steam nozzle chamber toward the extending direction of the rotor, the intermediate-pressure steam nozzle chamber being supplied with the steam superheated by the secondary repeater, and in that nozzle portion vanes are mounted to the opening of the intermediate-pressure steam nozzle chamber in the intermediate-pressure steam nozzle portion, and the communication flow passage is provided so as to penetrate the nozzle portion vanes and communicate with the gap.

With this steam turbine, since the cooling steam higher in pressure and lower in temperature than the superheated steam supplied to the intermediate-pressure steam turbine is discharged through the communication flow passage to the gap between the intermediate-pressure steam supply portion and the outer circumferential surface of the rotor, the rotor can be cooled. In addition, since the cooling steam higher in pressure and lower in temperature than the superheated steam supplied to the intermediate-pressure steam turbine is discharged through the communication flow passage to the gap between the intermediate-pressure steam supply portion and the outer circumferential surface of the rotor, the superheated steam is prevented from leaking out from the steam passage through the gap. As a result, since the superheated steam is prevented from being lost, the intermediate-pressure steam turbine can increase in operating efficiency, and the cycle efficiency can increase. Furthermore, since the communication flow passage is provided so as to penetrate the nozzle portion vanes, the nozzle portion vanes can be cooled, and thus, the nozzle portion vanes can be improved in durability against a rise in temperature of the intermediate-pressure steam turbine.

In the steam turbine of a twenty-sixth invention according to the twenty-fifth invention, the communication flow passage includes a cooling hole penetrating the nozzle portion vanes and open to the steam passage.

With this steam turbine, the cooling steam is discharged to the steam passage through the cooling hole penetrating the nozzle portion vanes. As a result, the nozzle portion vanes can be cooled, and thus, the nozzle portion vanes can be improved in durability against a further rise in temperature of the intermediate-pressure steam turbine.

In the steam turbine of a twenty-seventh invention according to the twenty-fifth or twenty-sixth invention, the communication flow passage includes a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of a twenty-eighth invention according to the twenty-seventh invention, the cooling steam nozzle is provided with a tip thereof directed toward the rotational direction of the rotor.

With this steam turbine, the cooling steam is discharged through the cooling steam nozzle along the rotational direction of the rotor from the communication flow passage to the gap. As a result, the frictional loss generated by the difference between the rotational velocity of the rotor and the velocity of the cooling steam can be reduced.

In the steam turbine of a twenty-ninth invention according to the twentieth invention, the intermediate-pressure steam turbine includes steam passage vanes mounted to the casing forming the steam passage to have a gap communicating with the steam passage between the steam passage vanes and the outer circumferential surface of the rotor, and in that the communication flow passage is provided so as to penetrate the steam passage vanes and communicate with the gap.

With this steam turbine, since the cooling steam higher in pressure and lower in temperature than the superheated steam supplied to the intermediate-pressure steam turbine is discharged through the communication flow passage to the gap between the steam passage vanes and the outer circumferential surface of the rotor, the rotor can be cooled. In addition, since the communication flow passage is provided so as to penetrate the steam passage vanes, the steam passage vanes can be cooled, and thus, the steam passage vanes can be improved in durability against the rise in temperature of the intermediate-pressure steam turbine.

In the steam turbine of a thirtieth invention according to the twenty-ninth invention, the communication flow passage includes a cooling hole penetrating the steam passage vanes and open to the steam passage.

With this steam turbine, the cooling steam is discharged to the steam passage through the cooling hole penetrating the steam passage vanes. As a result, the nozzle portion vanes can be cooled, and thus, the steam passage vanes can be improved in durability against the further rise in temperature of the intermediate-pressure steam turbine.

In the steam turbine of a thirty-first invention according to the twenty-ninth or thirtieth invention, the communication flow passage includes a cooling steam nozzle provided at an opening communicating with the gap.

With this steam turbine, the flow velocity of the cooling steam discharged from the communication flow passage to the gap is increased by the cooling steam nozzle. As a result, the temperature of the cooling steam can be lowered, and the cooling efficiency can increase.

In the steam turbine of a thirty-second invention according to the thirty-first invention, the cooling steam nozzle is provided with a tip thereof directed toward the rotational direction of the rotor.

With this steam turbine, the cooling steam is discharged through the cooling steam nozzle along the rotational direction of the rotor from the communication flow passage to the gap. As a result, the frictional loss generated by the difference between the rotational velocity of the rotor and the velocity of the cooling steam can be reduced.

In the steam turbine of a thirty-third invention according to any one of the twenty-fifth to thirty-second inventions, the intermediate-pressure steam turbine includes turbine blades mounted to the outer circumference of the rotor adjacent to the vanes, and in that the cooling steam supply portion includes a projecting portion provided at least at either one of a proximal end portion on the vane side of the turbine blades adjacent to the vanes penetrated by the communication flow passage or a distal end portion on the turbine blade side of the vanes penetrated by the communication flow passage.

With this steam turbine, the projecting portion causes the cooling steam flowing toward the steam passage to generate a vortex between the distal end portion of the vanes and the proximal end portion of the turbine blades. As a result, the superheated steam in the steam passage is prevented from being mixed in a complex manner with the cooling steam flowing toward the steam passage to raise the temperature of the cooling steam, and thus, the cooling efficiency can increase.

Advantageous Effects of Invention

The present invention can prevent a combined cycle plant from decreasing in cycle efficiency and can improve the durability of nozzle portion vanes without requiring another source of power.

DESCRIPTION OF EMBODIMENTS

First Embodiment

The following describes a first embodiment according to the present invention in detail based on the drawings. The present invention is not limited to the first embodiment. Components in the first embodiment to be described below include those replaceable by those skilled in the art and easy, or those substantially equivalent thereto.

Figure 1:
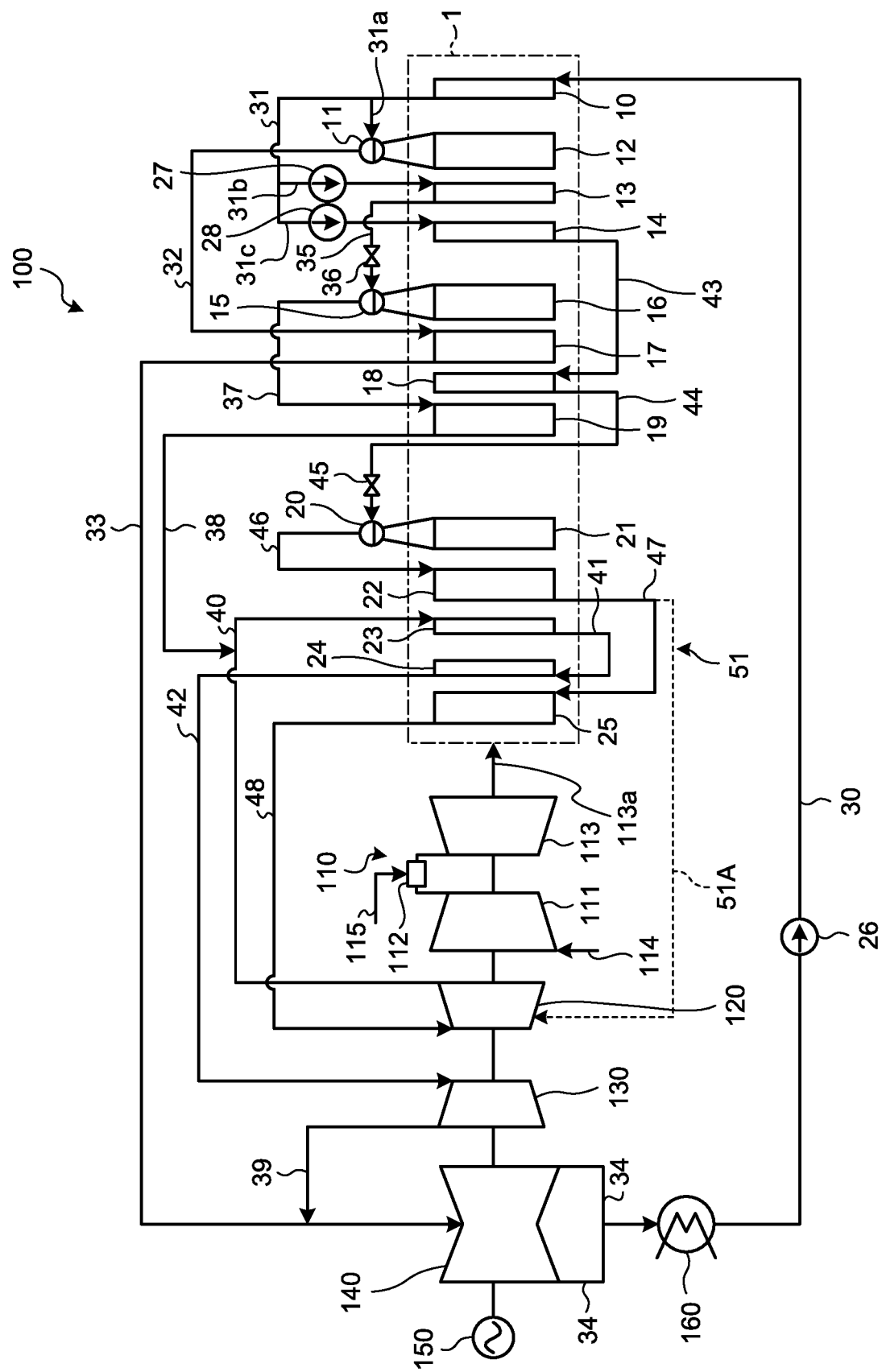
FIG. 1 is a schematic configuration diagram illustrating an example of a combined cycle plant according to a first embodiment of the present invention.

FIG. 1 is a schematic configuration diagram illustrating an example of a combined cycle plant according to the first embodiment. A combined cycle plant 100 illustrated in FIG. 1 includes a gas turbine 110, a high-pressure steam turbine 120, an intermediate-pressure steam turbine 130, and a low-pressure steam turbine 140. The gas turbine 110, the high-pressure steam turbine 120, the intermediate-pressure steam turbine 130, and the low-pressure steam turbine 140 are coaxially disposed with a generator 150.

The gas turbine 110 includes a compressor 111, a combustor 112, and a turbine 113. In the compressor 111, compressor inlet air 114 is raised in pressure and supplied to the combustor 112. In the combustor 112, a high-temperature combustion gas is generated from the supplied air and fuel 115, and is supplied to the turbine 113. The combustion gas passing through the turbine 113 rotationally drives the turbine 113, and is then discharged as a flue gas.

The combined cycle plant 100 includes a boiler (exhausted heat recovery boiler) 1 that uses the flue gas discharged from the turbine 113 in the gas turbine 110 as a heat source to generate superheated steam from water. The superheated steam generated by the boiler 1 drives the high-pressure steam turbine 120, the intermediate-pressure steam turbine 130, and the low-pressure steam turbine 140. The generator 150 is driven by the gas turbine 110, the high-pressure steam turbine 120, the intermediate-pressure steam turbine 130, and the low-pressure steam turbine 140 to generate electric power. The steam used by the low-pressure steam turbine 140 is condensed into water by a condenser 160 connected to the low-pressure steam turbine 140, and is fed as the water for generating the superheated steam to the boiler 1.

The boiler 1 is connected to a flue gas duct 113a provided on a discharge side of the turbine 113 in the gas turbine 110. The boiler 1 is provided, from a downstream side of flow of the flue gas, with a low-pressure economizer 10, a low-pressure drum 11, a low-pressure evaporator 12, an intermediate-pressure economizer 13, a high-pressure primary economizer 14, an intermediate-pressure drum 15, an intermediate-pressure evaporator 16, a low-pressure superheater 17, a high-pressure secondary economizer 18, an intermediate-pressure superheater 19, a high-pressure drum 20, a high-pressure evaporator 21, a high-pressure primary superheater 22, a primary reheater 23, a secondary reheater 24, and a high-pressure secondary superheater 25, and is also provided with a condensate pump 26, an intermediate-pressure feed water pump 27, and a high-pressure feed water pump 28.

The boiler 1 includes a low-pressure system that generates the superheated steam of low pressure for driving the low-pressure steam turbine 140, an intermediate-pressure system that generates the superheated steam of intermediate pressure for driving the intermediate-pressure steam turbine 130, and a high-pressure system that generates the superheated steam of high pressure for driving the high-pressure steam turbine 120. The low-pressure system includes the low-pressure economizer 10, the low-pressure drum 11, the low-pressure evaporator 12, the low-pressure superheater 17, and the condensate pump 26. The intermediate-pressure system includes the intermediate-pressure economizer 13, the intermediate-pressure drum 15, the intermediate-pressure evaporator 16, the intermediate-pressure superheater 19, the primary reheater 23, the secondary reheater 24, and the intermediate-pressure feed water pump 27. The high-pressure system includes the high-pressure primary economizer 14, the high-pressure secondary economizer 18, the high-pressure drum 20, the high-pressure evaporator 21, the high-pressure primary superheater 22, the high-pressure secondary superheater 25, and the high-pressure feed water pump 28.

In the low-pressure system, the low-pressure economizer 10 is connected to the condenser 160 through a connection line 30. The condensate pump 26 is provided in the connection line 30. The low-pressure economizer 10 is connected to the low-pressure drum 11 through a low-pressure branch line 31a of a connection line 31 branching into three lines. The low-pressure drum 11 is connected to the low-pressure evaporator 12. The low-pressure drum 11 is moreover connected to the low-pressure superheater 17 through a connection line 32. The low-pressure superheater 17 is connected to an inlet side of the low-pressure steam turbine 140 through a connection line 33. An outlet side of the low-pressure steam turbine 140 is connected to the condenser 160 through a connection line 34.

That is, in the low-pressure system, the water (condensed water) in the condenser 160 is conducted by the condensate pump 26 through the connection line 30 into the low-pressure economizer 10, is heated therein, and flows into the low-pressure drum 11 through the low-pressure branch line 31a of the connection line 31. The water supplied to the low-pressure drum 11 evaporates into saturated steam in the low-pressure evaporator 12, is returned to the low-pressure drum 11, and is fed out to the low-pressure superheater 17 through the connection line 32. The saturated steam is superheated by the low-pressure superheater 17, and this superheated steam is supplied to the low-pressure steam turbine 140 through the connection line 33. The steam discharged after driving the low-pressure steam turbine 140 is conducted to the condenser 160 through the connection line 34 to turn into the water (condensed water), and the water is fed out by the condensate pump 26 to the low-pressure economizer 10 through the connection line 30.

In the intermediate-pressure system, the intermediate-pressure economizer 13 is connected to the low-pressure economizer 10 through an intermediate-pressure branch line 31b of the connection line 31 branching into the three lines. The intermediate-pressure feed water pump 27 is provided in the intermediate-pressure branch line 31b. The intermediate-pressure economizer 13 is also connected to the intermediate-pressure drum 15 through a connection line 35. A flow control valve 36 is provided at an intermediate portion of the connection line 35. The intermediate-pressure drum 15 is connected to the intermediate-pressure evaporator 16. The intermediate-pressure drum 15 is connected to the intermediate-pressure superheater 19 through a connection line 37. The intermediate-pressure superheater 19 is connected to an inlet side of the primary reheater 23 through a connection line 38. In the intermediate-pressure system, the primary reheater 23 is connected to an outlet side of the high-pressure steam turbine 120 through a connection line 40. The primary reheater 23 is connected to the secondary reheater 24 through a connection line 41. The secondary reheater 24 is connected to an inlet side of the intermediate-pressure steam turbine 130 through a connection line 42. An outlet side of the intermediate-pressure steam turbine 130 is connected to the inlet side of the low-pressure steam turbine 140 through a connection line 39.

That is, in the intermediate-pressure system, the water heated in the low-pressure economizer 10 is conducted by the intermediate-pressure feed water pump 27 into the intermediate-pressure economizer 13 through the intermediate-pressure branch line 31b of the connection line 31, is further heated therein, and flows into the intermediate-pressure drum 15 through the connection line 35. The water supplied to the intermediate-pressure drum 15 evaporates into saturated steam in the intermediate-pressure evaporator 16, is returned to the intermediate-pressure drum 15, and is fed out to the intermediate-pressure superheater 19 through the connection line 37. The saturated steam is superheated by the intermediate-pressure superheater 19, and this superheated steam is supplied to the primary reheater 23 through the connection line 38. In the intermediate-pressure system, the steam discharged after driving the high-pressure steam turbine 120 is fed out to the primary reheater 23 through the connection line 40. The steam is superheated by the primary reheater 23, and this superheated steam is fed out to the secondary reheater 24 through the connection line 41. The steam is further superheated by the secondary reheater 24, and this superheated steam is supplied to the intermediate-pressure steam turbine 130 through the connection line 42. The steam discharged after driving the intermediate-pressure steam turbine 130 is supplied to the low-pressure steam turbine 140 through the connection line 39.

Each of the primary reheater 23 and the secondary reheater 24 superheats the steam, thus having the same function as that of the superheater, and being included in superheaters in the first embodiment. In other words, the primary reheater 23 is also called a first superheater, and the secondary reheater 24 is also called a second superheater.

In the high-pressure system, the high-pressure primary economizer 14 is connected to the low-pressure economizer 10 through a high-pressure branch line 31c of the connection line 31 branching into the three lines. The high-pressure feed water pump 28 is provided in the high-pressure branch line 31c. The high-pressure primary economizer 14 is also connected to the high-pressure secondary economizer 18 through a connection line 43. The high-pressure secondary economizer 18 is connected to the high-pressure drum 20 through a connection line 44. A flow control valve 45 is provided at an intermediate portion of the connection line 44. The high-pressure drum 20 is connected to the high-pressure evaporator 21. The high-pressure drum 20 is also connected to the high-pressure primary superheater 22 through a connection line 46. The high-pressure primary superheater 22 is connected to the high-pressure secondary superheater 25 through a connection line 47. The high-pressure secondary superheater 25 is connected to an inlet side of the high-pressure steam turbine 120 through a connection line 48. The outlet side of the high-pressure steam turbine 120 is connected to the primary repeater 23 of the intermediate-pressure system through the connection line 40 as described above.

That is, in the high-pressure system, the water heated in the low-pressure economizer 10 is conducted by the high-pressure feed water pump 28 into the high-pressure primary economizer 14 through the high-pressure branch line 31c of the connection line 31, is further heated therein, further flows into the high-pressure secondary economizer 18 through the connection line 43, is further heated therein, and flows into the high-pressure drum 20 through the connection line 44. The water supplied to the high-pressure drum 20 evaporates into saturated steam in the high-pressure evaporator 21, is returned to the high-pressure drum 20, and is fed out to the high-pressure primary superheater 22 through the connection line 46. The saturated steam is superheated by the high-pressure primary superheater 22, and this superheated steam is supplied to the high-pressure secondary superheater 25 through the connection line 47. The superheated steam is further superheated by the high-pressure secondary superheater 25, and this superheated steam is supplied to the high-pressure steam turbine 120 through the connection line 48.

Figure 2:
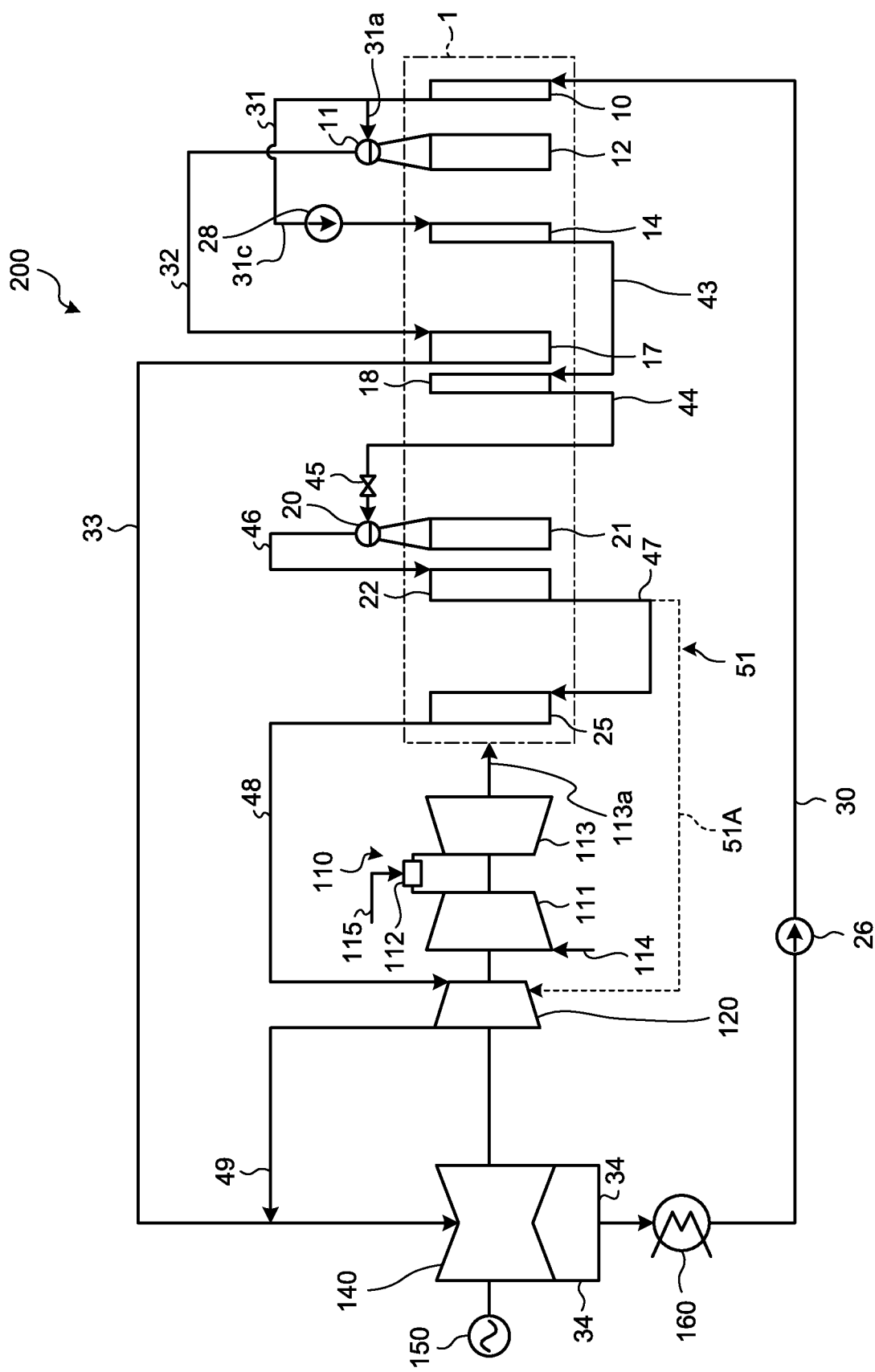
FIG. 2 is a schematic configuration diagram illustrating another example of the combined cycle plant according to the first embodiment of the present invention.

FIG. 2 is a schematic configuration diagram illustrating another example of the combined cycle plant according to the first embodiment. A combined cycle plant 200 illustrated in FIG. 2 does not include the above-described intermediate-pressure steam turbine 130, the intermediate-pressure system (the intermediate-pressure economizer 13, the intermediate-pressure drum 15, the intermediate-pressure evaporator 16, the intermediate-pressure superheater 19, the primary reheater 23, the secondary reheater 24, and the intermediate-pressure feed water pump 27) in the boiler 1, and the lines 31b, 35, 37, 38, 40, 41, and 42 and the flow control valve 36 related to these components. Accordingly, the same parts of the combined cycle plant 200 and the boiler 1 illustrated in FIG. 2 are assigned with the same reference numerals, and description thereof will not be given. In the combined cycle plant 200, the outlet side of the high-pressure steam turbine 120 is connected to the inlet side of the low-pressure steam turbine 140 through a connection line 49, and the steam discharged after driving the high-pressure steam turbine 120 is supplied to the low-pressure steam turbine 140 through the connection line 49.

In the combined cycle plant 100 or 200 described above, the steam turbine of the first embodiment includes a cooling steam supply portion (first cooling steam supply portion) 51 that cools the inside of the high-pressure steam turbine 120. As illustrated in FIGS. 1 and 2, the cooling steam supply portion 51 includes a connection line 51A that communicates a portion extending from an outlet of the high-pressure evaporator 21 through the high-pressure primary superheater 22 to the inside of the high-pressure secondary superheater 25 with the inside of the high-pressure steam turbine 120. Specifically, the connection line 51A communicates at least a part of the connection line 46 connecting the high-pressure drum 20 to the high-pressure primary superheater 22, the inside of the high-pressure primary superheater 22, the connection line 47 connecting the high-pressure primary superheater 22 to the high-pressure secondary superheater 25, and the inside of the high-pressure secondary superheater 25 with the inside of the high-pressure steam turbine 120.

The superheated steam supplied to the high-pressure steam turbine 120 flows from the high-pressure secondary superheater 25 through the connection line 48 as described above, and decreases in pressure while flowing through the connection line 48. Therefore, the steam flowing from the outlet of the high-pressure evaporator 21 through the high-pressure primary superheater 22 to the inside of the high-pressure secondary superheater 25 is higher in pressure and lower in temperature (at a temperature lower than approximately 550° C. to 600° C. of the superheated steam) than the superheated steam supplied to the high-pressure steam turbine 120. Accordingly, cooling steam higher in pressure and lower in temperature than the superheated steam supplied to the high-pressure steam turbine 120 can be supplied to the inside of the high-pressure steam turbine 120.

As described above, since the steam turbine of the first embodiment includes the cooling steam supply portion 51 that includes the connection line 51A that communicates the portion extending from the outlet of the high-pressure evaporator 21 through the high-pressure primary superheater 22 to the inside of the high-pressure secondary superheater 25 with the inside of the high-pressure steam turbine 120, the cooling steam higher in pressure and lower in temperature than the superheated steam supplied to the high-pressure steam turbine 120 can be supplied to the inside of the high-pressure steam turbine 120 in the combined cycle plants 100 and 200. As a result, high-temperature portions, such as a rotor, inside the high-pressure steam turbine 120 can be cooled without requiring another source of power. Since the cooling is performed using the steam generated in the combined cycle plant 100 or 200 and not using any fluid in the high-pressure steam turbine 120, the high-pressure steam turbine 120 can be prevented from decreasing in operating efficiency, and as a result, the cycle efficiency can be prevented from decreasing.

In the steam turbine of the first embodiment, the connection line 51A preferably communicates the connection line 47 extending from an outlet of the high-pressure primary superheater 22 to an inlet of the high-pressure secondary superheater 25 with the inside of the high-pressure steam turbine 120, as illustrated in FIGS. 1 and 2.

When the cooling steam is supplied from the connection line 47 extending from the outlet of the high-pressure primary superheater 22 to the inlet of the high-pressure secondary superheater 25 to the inside of the high-pressure steam turbine 120, the steam supplied to the high-pressure secondary superheater 25 decreases. Consequently, the high-pressure secondary superheater 25 increases in superheating efficiency, and the superheated steam supplied to the high-pressure steam turbine 120 increases in temperature. As a result, the high-pressure steam turbine 120 can increase in operating efficiency, and the cycle efficiency can increase.

When the cooling steam is supplied from the connection line 47 extending from the outlet of the high-pressure primary superheater 22 to the inlet of the high-pressure secondary superheater 25 to the inside of the high-pressure steam turbine 120, the amount of steam obtained from the high-pressure evaporator 21 can increase if the temperature of the superheated steam supplied to the high-pressure steam turbine 120 is constant. Consequently, the amount of the superheated steam supplied to the high-pressure steam turbine 120 can increase. As a result, the high-pressure steam turbine 120 can increase in operating efficiency, and the cycle efficiency can increase.

FIGS. 3 to 16 are schematic configuration diagrams illustrating examples of the cooling steam supply portion according to the first embodiment.

The high-pressure steam turbine 120 includes a rotor 121, a casing 122, a steam passage 123, and a high-pressure steam supply portion 124. The rotor 121 is provided so as to extend along an axial center S of rotation of the rotor 121. The casing 122 accommodates the rotor 121, and supports the rotor 121 so as to be rotatable about the axial center S. The steam passage 123 is an annular space provided along the extending direction of the rotor 121 between the rotor 121 and the casing 122. The high-pressure steam supply portion 124 is provided so as to communicate, from outside the casing 122 through the casing 122, with the steam passage 123, and is connected to the connection line 48 to be supplied with the steam superheated by the high-pressure secondary superheater 25 so as to supply the steam to the steam passage 123.

The high-pressure steam supply portion 124 includes a high-pressure steam nozzle portion 124A. The high-pressure steam nozzle portion 124A is formed in an annular shape surrounding the outer circumference of the rotor 121 and mounted to the casing 122 to have a gap 125A communicating with the steam passage 123 between the outer surface of the high-pressure steam nozzle portion 124A and the outer circumferential surface of the rotor 121. The high-pressure steam nozzle portion 124A has a high-pressure steam nozzle chamber 124Aa formed therein along an annular shape and an opening 124Ab communicating with the steam passage 123 from the high-pressure steam nozzle chamber 124Aa toward the extending direction of the rotor 121. The connection line 48 is connected to the high-pressure steam nozzle portion 124A, and the steam superheated by the high-pressure secondary superheater 25 is supplied to the high-pressure steam nozzle chamber 124Aa, and discharged from the opening 124Ab to the steam passage 123.

In the high-pressure steam supply portion 124, a plurality of nozzle portion vanes 126A are mounted along an annular shape to the opening 124Ab of the high-pressure steam nozzle chamber 124Aa in the high-pressure steam nozzle portion 124A. The rotor 121 side of the nozzle portion vanes 126A serves as a distal end portion, and the casing 122 side thereof serves as a proximal end portion. In the steam passage 123, a plurality of steam passage vanes 126B are mounted along an annular shape to the casing 122. A plurality of stages of the steam passage vanes 126B are provided along the extending direction of the rotor 121. The rotor 121 side of the steam passage vanes 126B serves as a distal end portion, to which an annular member 126Ba is mounted. A gap 125B is provided between the annular member 126Ba and the outer circumferential surface of the rotor 121. A side of the steam passage vanes 126B mounted to the casing 122 serves as a proximal end portion. In the steam passage 123, a plurality of turbine blades 127 are mounted to the outer circumference of the rotor 121 along an annular shape adjacent to the vanes 126A and 126B. A plurality of stages of the turbine blades 127 are provided along the extending direction of the rotor 121. A side of the turbine blades 127 mounted to the rotor 121 serves as a proximal end portion, and an annular member 127a is mounted between this proximal end portion and the rotor 121. A side of the turbine blades 127 facing the casing 122 serves as a distal end portion.

Accordingly, in the high-pressure steam turbine 120, the steam superheated by the high-pressure secondary superheater 25 is supplied to the high-pressure steam nozzle chamber 124Aa, and discharged from the opening 124Ab to the steam passage 123, and the rotor 121 is rotated by the vanes 126A and 126B and the turbine blades 127.

In the steam turbine of the first embodiment, as illustrated in FIGS. 3 to 16, the cooling steam supply portion 51 for the high-pressure steam turbine 120 having the above-described configuration includes a communication flow passage 51B that is connected to the connection line 51A and communicates from outside the casing 122 through the casing 122 to the steam passage 123 separately from the high-pressure steam supply portion 124.

Figure 3:
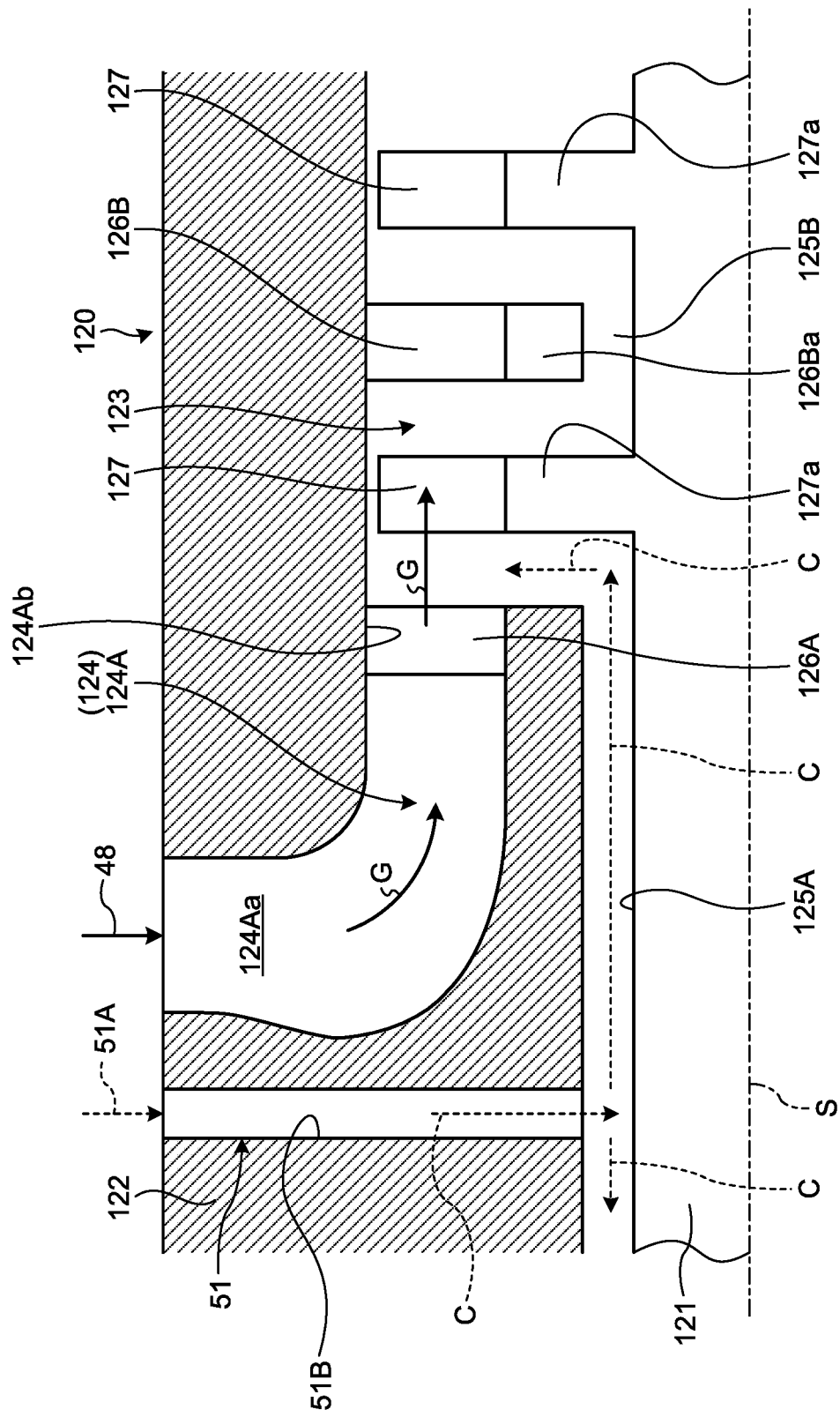
FIG. 3 is a schematic configuration diagram illustrating an example of a cooling steam supply portion according to the first embodiment of the present invention.

In the cooling steam supply portion 51 illustrated in FIG. 3, the communication flow passage 51B is provided so as to penetrate the casing 122 on the opposite side of the opening 124Ab of the high-pressure steam nozzle chamber 124Aa in the high-pressure steam nozzle portion 124A, and so as to communicate with the gap 125A and to be open toward the outer circumferential surface of the rotor 121. More than one of the communication flow passages 51B may be provided along the circumferential direction of the high-pressure steam nozzle portion 124A (rotational direction of the rotor 121), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 3, cooling steam C supplied through the connection line 51A is discharged through the communication flow passage 51B toward the outer circumferential surface of the rotor 121 up to the gap 125A between the high-pressure steam supply portion 124 and the outer circumferential surface of the rotor 121, flows along the extending direction of the rotor 121 through the gap 125A up to the steam passage 123, and merges, between the nozzle portion vanes 126A and the turbine blades 127, with superheated steam G supplied to the steam passage 123 through the high-pressure steam supply portion 124.

The cooling steam supply portion 51 illustrated in FIG. 3 discharges the cooling steam C higher in pressure and lower in temperature than the superheated steam G supplied to the high-pressure steam turbine 120 through the communication flow passage 51B to the gap 125A between the high-pressure steam supply portion 124 and the outer circumferential surface of the rotor 121. Thereby, the rotor 121 can be cooled. In addition, since the cooling steam supply portion 51 illustrated in FIG. 3 discharges the cooling steam C higher in pressure and lower in temperature than the superheated steam G supplied to the high-pressure steam turbine 120 through the communication flow passage 51B to the gap 125A between the high-pressure steam supply portion 124 and the outer circumferential surface of the rotor 121, the superheated steam G is prevented from leaking out from the steam passage 123 through the gap 125A. As a result, since the superheated steam G is prevented from being lost, the high-pressure steam turbine 120 can increase in operating efficiency, and the cycle efficiency can increase.

Figure 4:
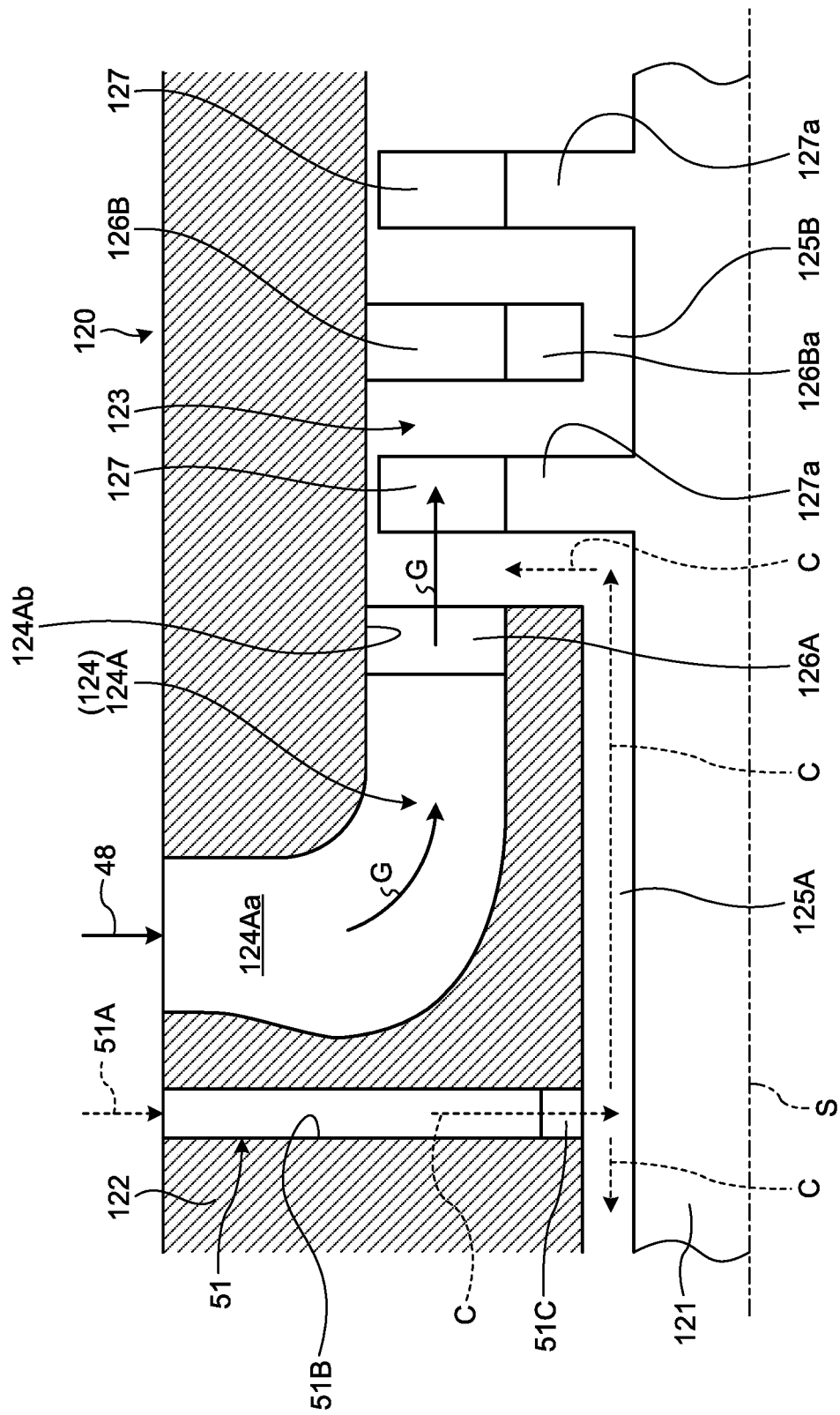
FIG. 4 is a schematic configuration diagram illustrating another example of the cooling steam supply portion according to the first embodiment of the present invention.
Figure 5:
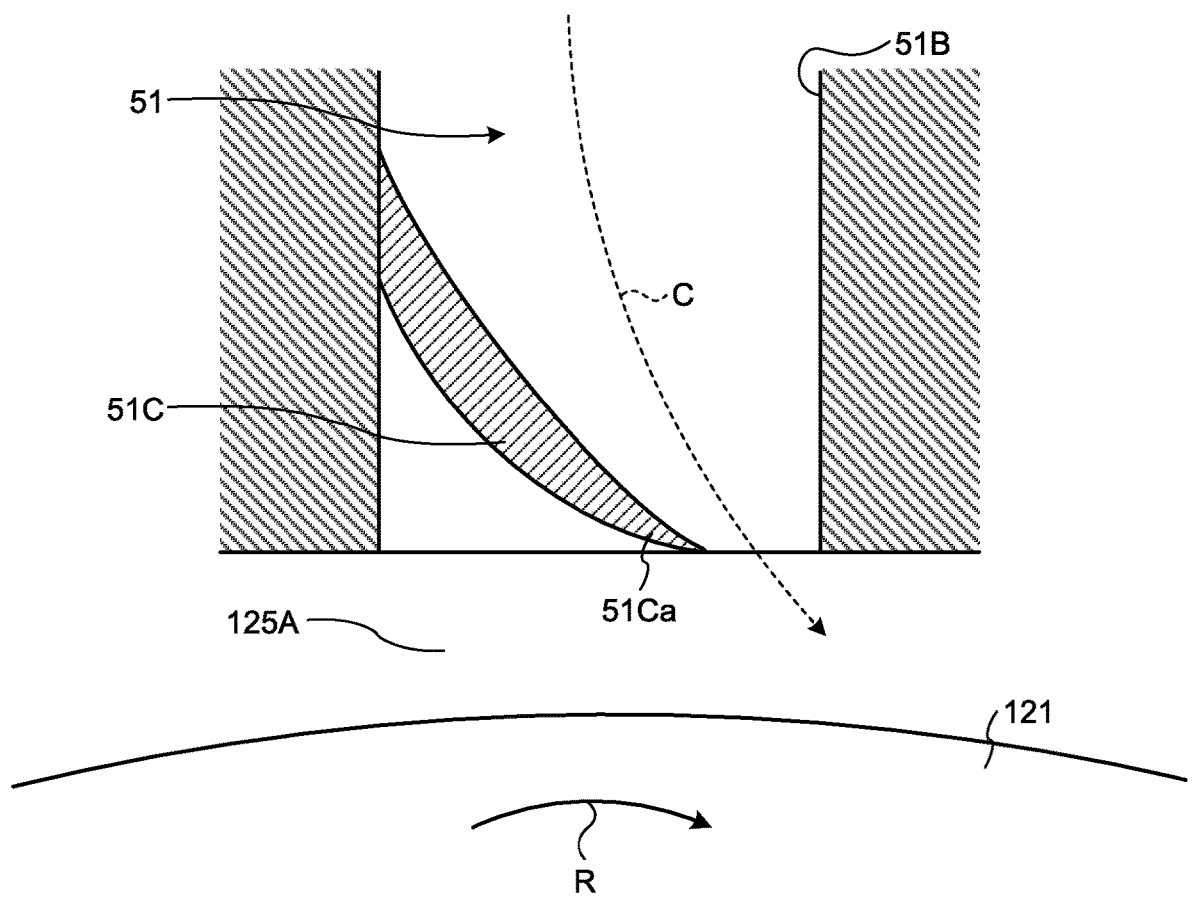
FIG. 5 is a schematic configuration diagram illustrating still another example of the cooling steam supply portion according to the first embodiment of the present invention.

In the cooling steam supply portion 51 illustrated in FIG. 4, the communication flow passage 51B illustrated in FIG. 3 preferably includes a cooling steam nozzle 51C provided at an opening communicating with the gap 125A. As illustrated in FIG. 5, the cooling steam nozzle 51C narrows the opening in the communication flow passage 51B communicating with the gap 125A. This configuration increases the flow velocity of the cooling steam C discharged from the communication flow passage 51B to the gap 125A. As a result, the temperature of the cooling steam C can be lowered, and the cooling efficiency can increase.

As illustrated in FIG. 5, the cooling steam nozzle 51C is preferably provided with a tip 51Ca thereof directed toward a rotational direction R of the rotor 121. With this configuration, the cooling steam C is discharged from the communication flow passage 51B to the gap 125A along the rotational direction R of the rotor 121. As a result, a frictional loss generated by a difference between the rotational velocity of the rotor 121 and the velocity of the cooling steam C can be reduced.

The configuration of the cooling steam nozzle 51C is not limited to a plate material as a separate member from the communication flow passage 51B as illustrated in FIGS. 4 and 5. The opening itself of the communication flow passage 51B may be narrowed to form the cooling steam nozzle 51C.

Figure 6:
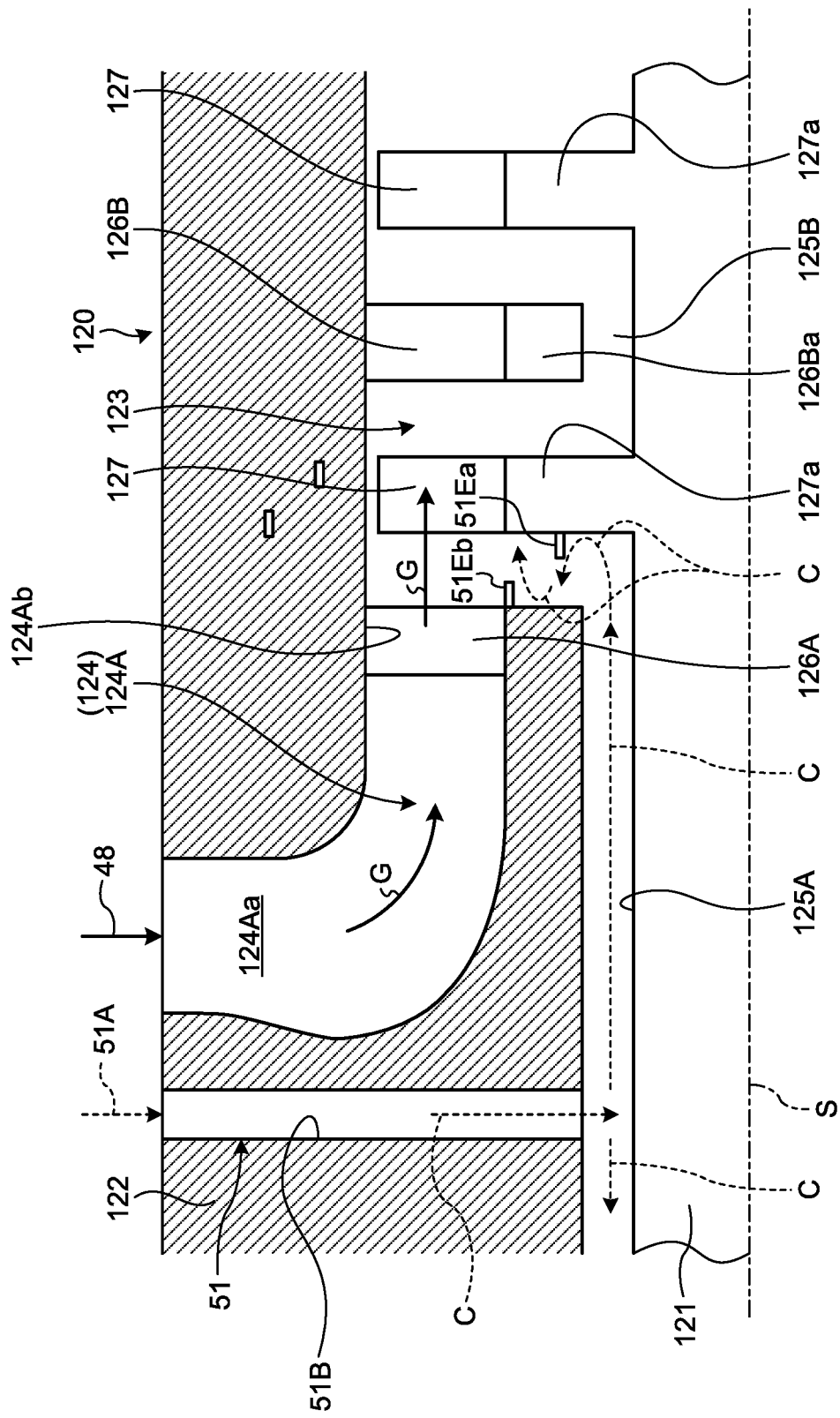
FIG. 6 is a schematic configuration diagram illustrating still another example of the cooling steam supply portion according to the first embodiment of the present invention.

The cooling steam supply portion 51 illustrated in FIG. 6 preferably includes a projecting portion 51Ea that serves as a portion where the gap 125A penetrated by the communication flow passage 51B illustrated in FIG. 3 reaches the steam passage 123 and that is provided at the annular member 127a at the proximal end portion on the nozzle portion vane 126A side of the turbine blades 127 adjacent to the nozzle portion vanes 126A. The cooling steam supply portion 51 illustrated in FIG. 6 also preferably includes a projecting portion 51Eb that serves as a portion where the gap 125A penetrated by the communication flow passage 51B illustrated in FIG. 3 reaches the steam passage 123 and that is provided at a part of the high-pressure steam nozzle portion 124A serving as the distal end portion of the nozzle portion vanes 126A and opposed to the annular member 127a at the proximal end portion of the turbine blades 127.

The projecting portions 51Ea and 51Eb are preferably continuously provided along the circumferential direction of the high-pressure steam turbine 120 (rotational direction of the rotor 121).

With this configuration, the projecting portions 51Ea and 51Eb cause the cooling steam C flowing toward the steam passage 123 to generate a vortex between the opening 124Ab of the high-pressure steam nozzle chamber 124Aa in the high-pressure steam nozzle portion 124A provided with the nozzle portion vanes 126A and the annular member 127a at the proximal end portion of the turbine blades 127. As a result, the superheated steam G in the steam passage 123 is prevented from being mixed in a complex manner with the cooling steam C flowing toward the steam passage 123 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 121 and provide the projecting portion 51Eb in a position farther from the rotor 121. This configuration causes the cooling steam C discharged from the communication flow passage 51B penetrating toward the nozzle portion vanes 126A toward the outer circumferential surface of the rotor 121 to generate the vortex first due to the projecting portion 51Ea, and then due to the projecting portion 51Eb. As a result, the effect can be significantly obtained to prevent the superheated steam G in the steam passage 123 from being mixed in a complex manner with the cooling steam C flowing toward the steam passage 123. The projecting portions 51Ea and 51Eb may be provided together with the cooling steam nozzle 51C.

Figure 7:
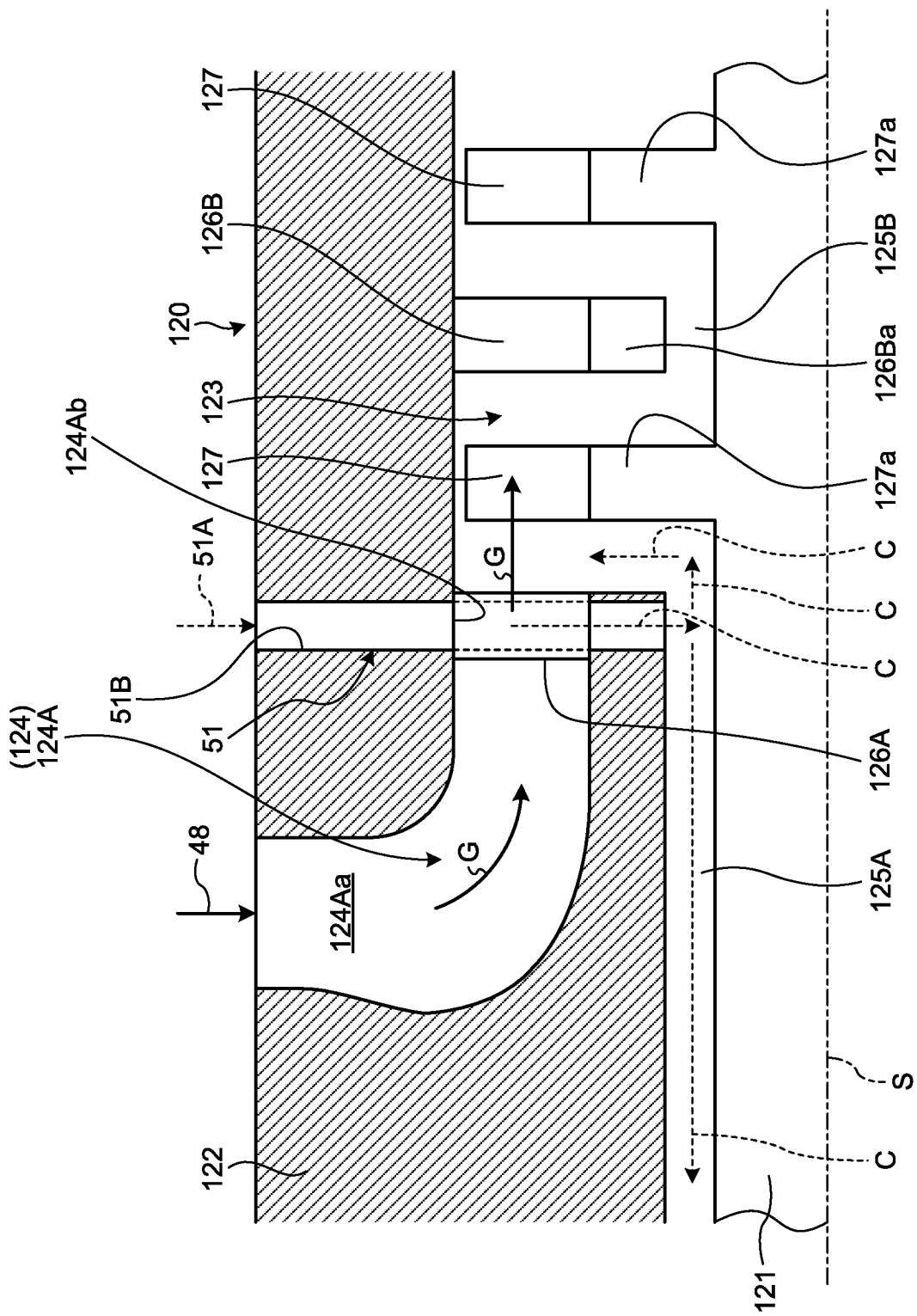
FIG. 7 is a schematic configuration diagram illustrating still another example of the cooling steam supply portion according to the first embodiment of the present invention.

In the cooling steam supply portion 51 illustrated in FIG. 7, the communication flow passage 51B is provided so as to penetrate the casing 122, the opening 124Ab of the high-pressure steam nozzle chamber 124Aa in the high-pressure steam nozzle portion 124A, and the nozzle portion vanes 126A, to communicate with the gap 125A, and to be open toward the outer circumferential surface of the rotor 121. More than one of the communication flow passages 51B may be provided along the circumferential direction of the high-pressure steam nozzle portion 124A (rotational direction of the rotor 121), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 7, the cooling steam C supplied through the connection line 51A is discharged through the communication flow passage 51B toward the outer circumferential surface of the rotor 121 up to the gap 125A between the high-pressure steam supply portion 124 and the outer circumferential surface of the rotor 121, flows along the extending direction of the rotor 121 through the gap 125A up to the steam passage 123, and merges, between the nozzle portion vanes 126A and the turbine blades 127, with the superheated steam G supplied to the steam passage 123.

The cooling steam supply portion 51 illustrated in FIG. 7 discharges the cooling steam C higher in pressure and lower in temperature than the superheated steam G supplied to the high-pressure steam turbine 120 through the communication flow passage 51B to the gap 125A between the high-pressure steam supply portion 124 and the outer circumferential surface of the rotor 121. Thereby, the rotor 121 can be cooled. In addition, since the cooling steam supply portion 51 illustrated in FIG. 7 discharges the cooling steam C higher in pressure and lower in temperature than the superheated steam G supplied to the high-pressure steam turbine 120 through the communication flow passage 51B to the gap 125A between the high-pressure steam supply portion 124 and the outer circumferential surface of the rotor 121, the superheated steam G is prevented from leaking out from the steam passage 123 through the gap 125A. As a result, since the superheated steam G is prevented from being lost, the high-pressure steam turbine 120 can increase in operating efficiency, and the cycle efficiency can increase. Furthermore, since the cooling steam supply portion 51 illustrated in FIG. 7 is provided with the communication flow passage 51B penetrating the nozzle portion vanes 126A, the nozzle portion vanes 126A can be cooled, and thus, the nozzle portion vanes 126A can be improved in durability against a rise in temperature of the high-pressure steam turbine 120.

Figure 8:
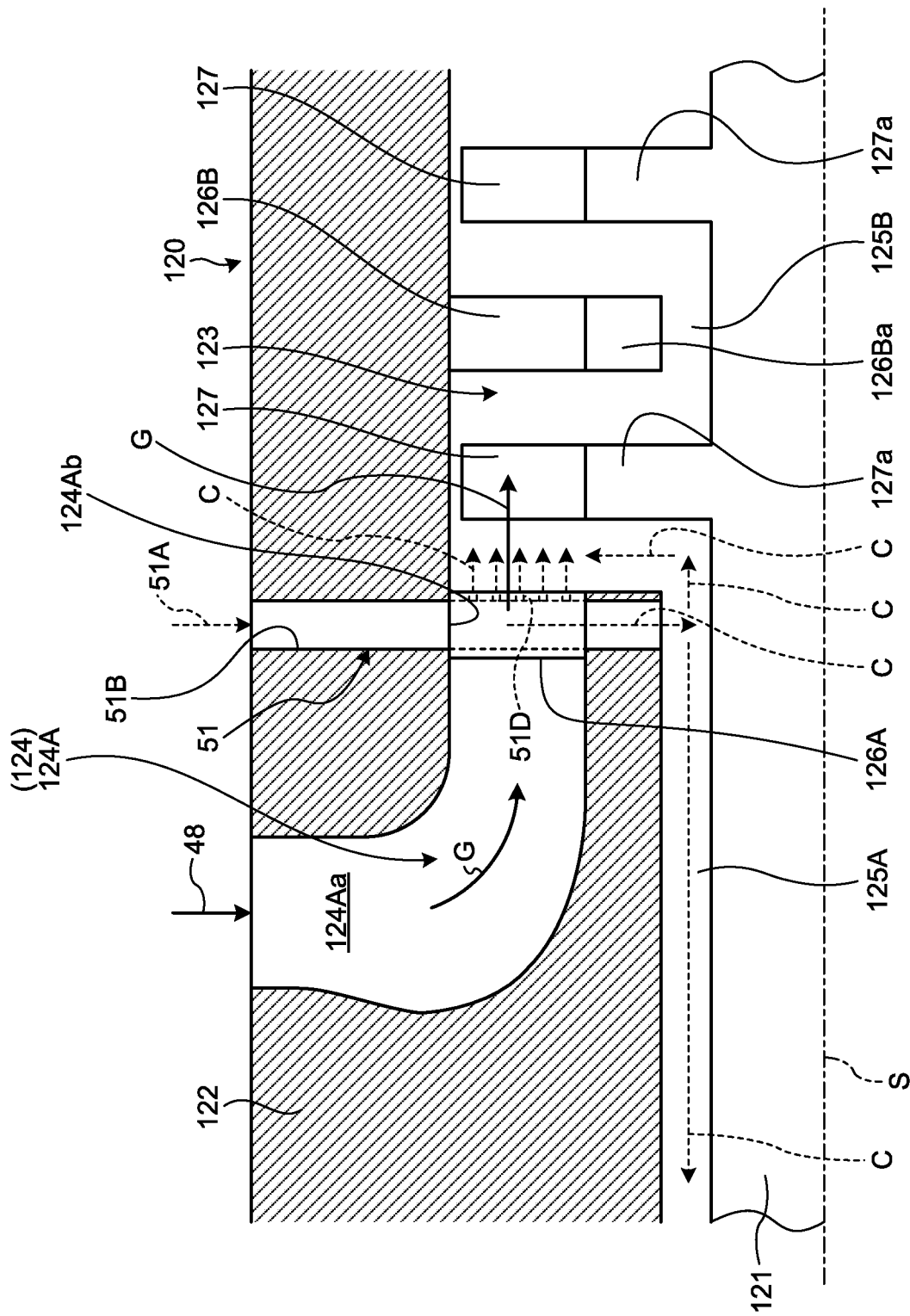
FIG. 8 is a schematic configuration diagram illustrating still another example of the cooling steam supply portion according to the first embodiment of the present invention.

In the cooling steam supply portion 51 illustrated in FIG. 8, the communication flow passage 51B illustrated in FIG. 7 includes cooling holes 51D that penetrate the nozzle portion vanes 126A and are open to the steam passage 123. With this configuration, the cooling steam C is discharged to the steam passage 123 through the cooling holes 51D penetrating the nozzle portion vanes 126A. As a result, the nozzle portion vanes 126A can be cooled, and thus, the nozzle portion vanes 126A can be improved in durability against a further rise in temperature of the high-pressure steam turbine 120.

Figure 9:
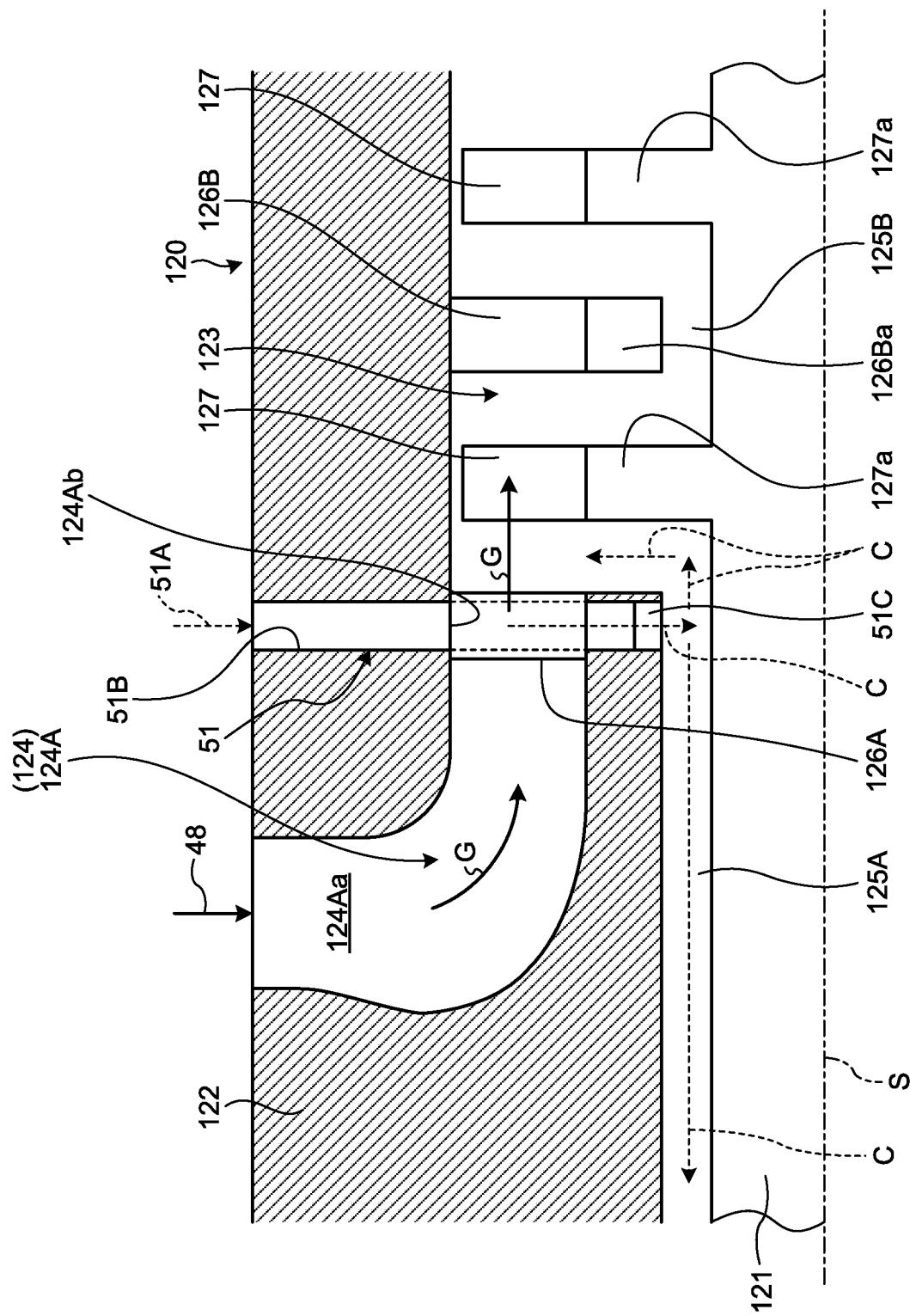
FIG. 9 is a schematic configuration diagram illustrating still another example of the cooling steam supply portion according to the first embodiment of the present invention.
Figure 10:
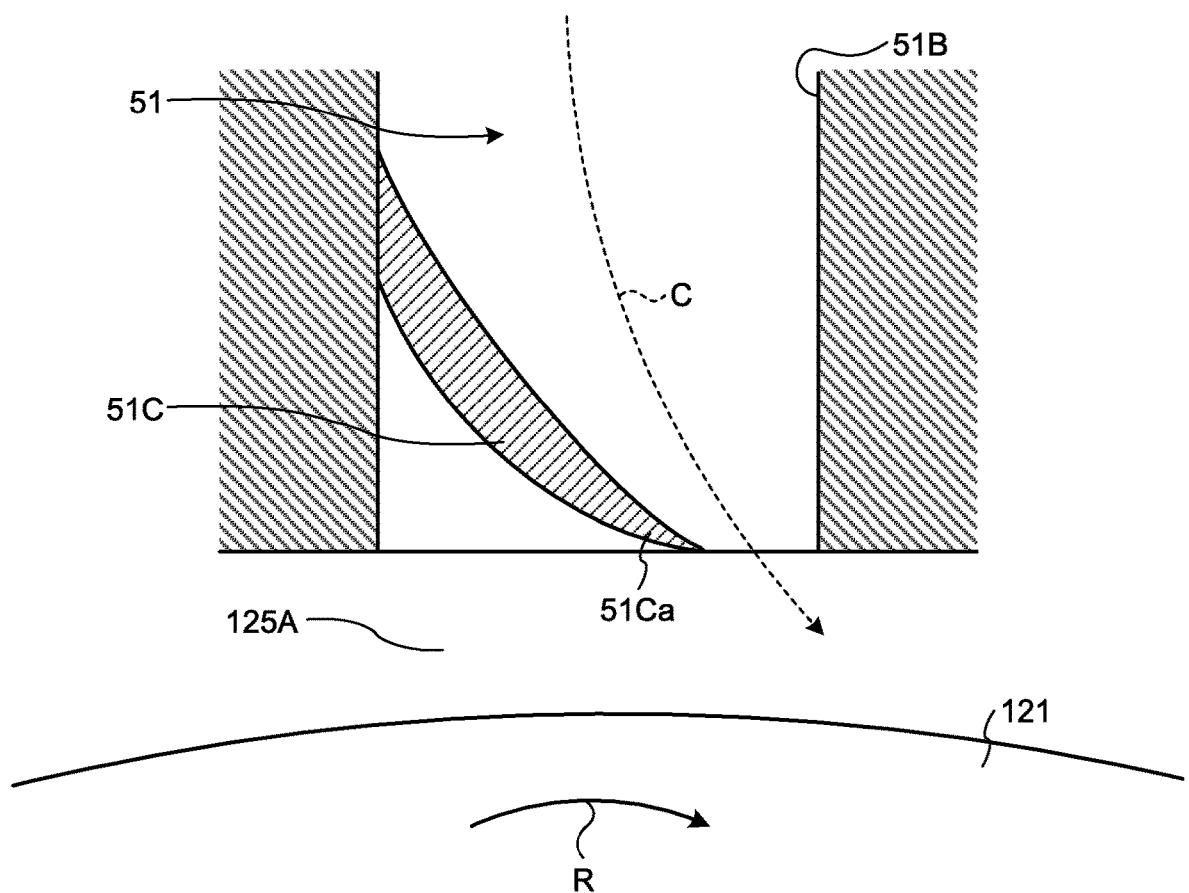
FIG. 10 is a schematic configuration diagram illustrating still another example of the cooling steam supply portion according to the first embodiment of the present invention.

In the cooling steam supply portion 51 illustrated in FIG. 9, the communication flow passage 51B illustrated in FIG. 7 preferably includes the cooling steam nozzle 51C provided at the opening communicating with the gap 125A. As illustrated in FIG. 10, the cooling steam nozzle 51C narrows the opening in the communication flow passage 51B communicating with the gap 125A. This configuration increases the flow velocity of the cooling steam C discharged from the communication flow passage 51B to the gap 125A. As a result, the temperature of the cooling steam C can be lowered, and the cooling efficiency can increase.

As illustrated in FIG. 10, the cooling steam nozzle 51C is preferably provided with the tip 51Ca thereof directed toward the rotational direction R of the rotor 121. With this configuration, the cooling steam C is discharged from the communication flow passage 51B to the gap 125A along the rotational direction R of the rotor 121. As a result, the frictional loss generated by the difference between the rotational velocity of the rotor 121 and the velocity of the cooling steam C can be reduced.

The configuration of the cooling steam nozzle 51C is not limited to a plate material as a separate member from the communication flow passage 51B as illustrated in FIGS. 9 and 10. The opening itself of the communication flow passage 51B may be narrowed to form the cooling steam nozzle 51C. The cooling steam nozzle 51C may be provided together with the cooling holes 51D.

Figure 11:
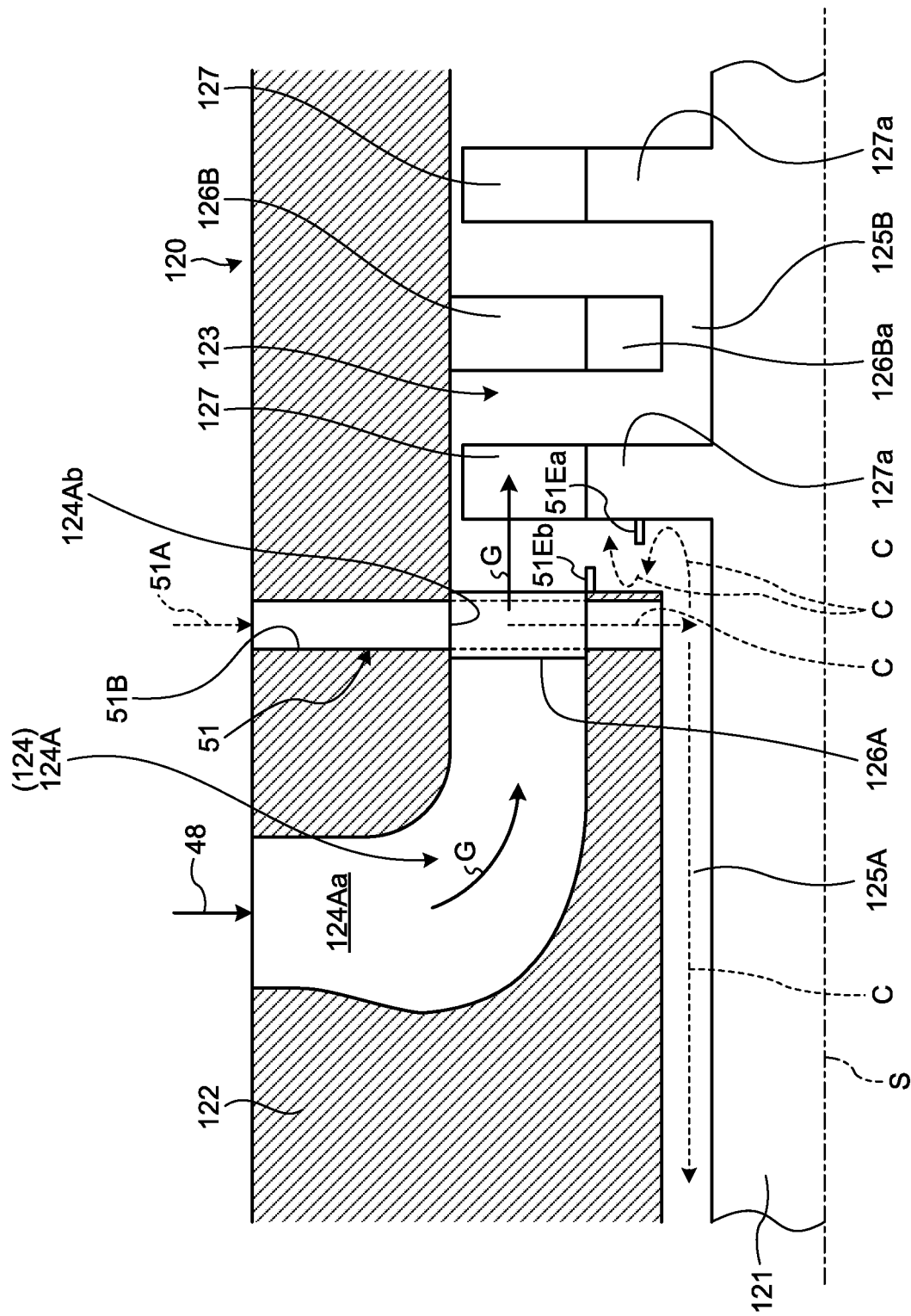
FIG. 11 is a schematic configuration diagram illustrating still another example of the cooling steam supply portion according to the first embodiment of the present invention.

The cooling steam supply portion 51 illustrated in FIG. 11 preferably includes the projecting portion 51Ea provided at the annular member 127a at the proximal end portion on the nozzle portion vane 126A side of the turbine blades 127 adjacent to the nozzle portion vanes 126A penetrated by the communication flow passage 51B illustrated in FIG. 7. The cooling steam supply portion 51 illustrated in FIG. 11 also preferably includes the projecting portion 51Eb provided at a part of the high-pressure steam nozzle portion 124A that serves as the distal end portion of the nozzle portion vanes 126A penetrated by the communication flow passage 51B illustrated in FIG. 7 and that is opposed to the annular member 127a at the proximal end portion of the turbine blades 127.

The projecting portions 51Ea and 51Eb are preferably continuously provided along the circumferential direction of the high-pressure steam turbine 120 (rotational direction of the rotor 121).

With this configuration, the projecting portions 51Ea and 51Eb cause the cooling steam C flowing toward the steam passage 123 to generate a vortex between the opening 124Ab of the high-pressure steam nozzle chamber 124Aa in the high-pressure steam nozzle portion 124A provided with the nozzle portion vanes 126A and the annular member 127a at the proximal end portion of the turbine blades 127. As a result, the superheated steam G in the steam passage 123 is prevented from being mixed in a complex manner with the cooling steam C flowing toward the steam passage 123 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 121 and provide the projecting portion 51Eb in a position farther from the rotor 121. This configuration causes the cooling steam C discharged from the communication flow passage 51B penetrating the nozzle portion vanes 126A toward the outer circumferential surface of the rotor 121 to generate the vortex first due to the projecting portion 51Ea, and then due to the projecting portion 51Eb. As a result, the effect can be significantly obtained to prevent the superheated steam G in the steam passage 123 from being mixed in a complex manner with the cooling steam C flowing toward the steam passage 123. The projecting portions 51Ea and 51Eb may be provided together with the cooling steam nozzle 51C and the cooling holes 51D.

Figure 12:
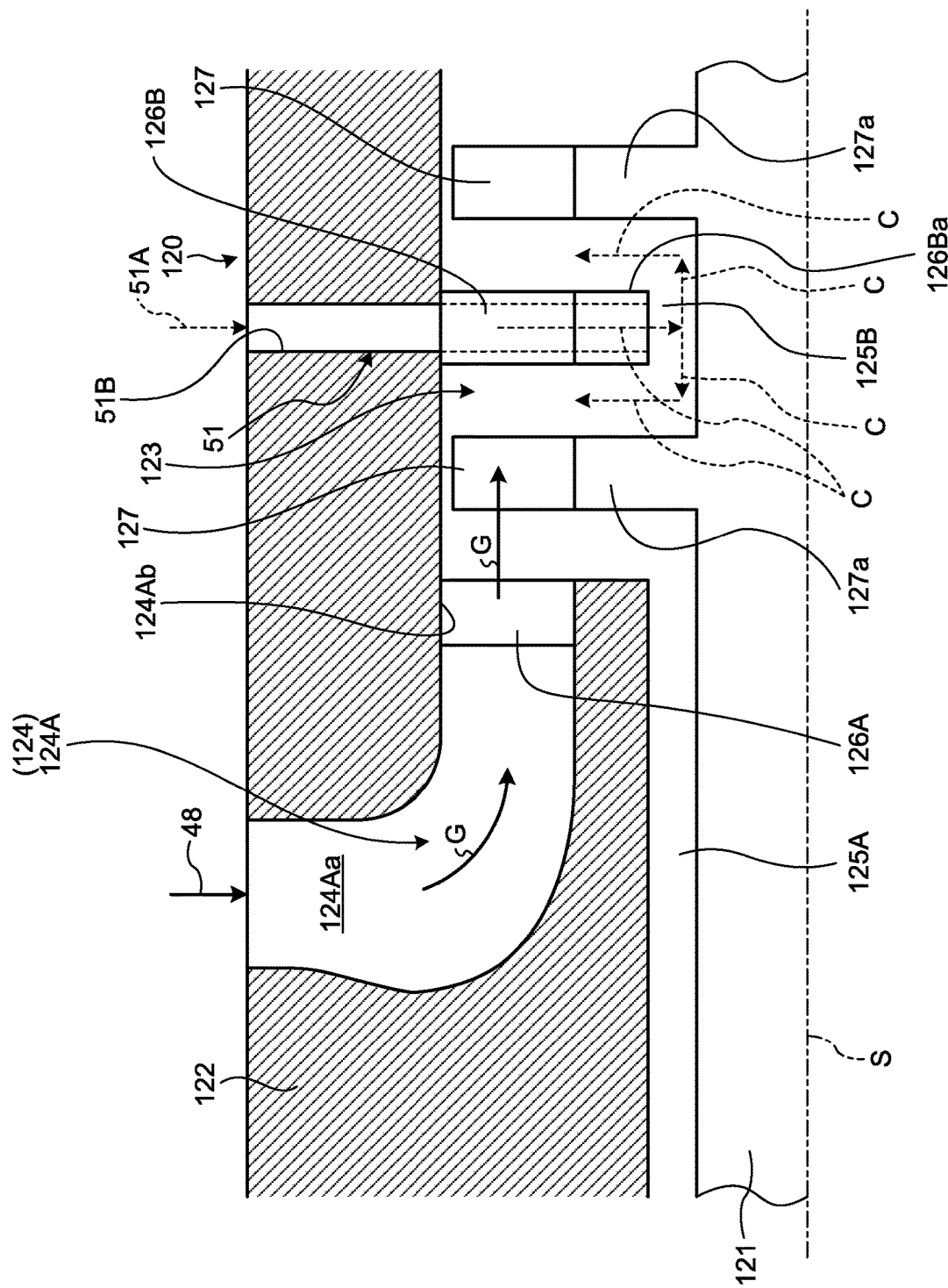
FIG. 12 is a schematic configuration diagram illustrating still another example of the cooling steam supply portion according to the first embodiment of the present invention.

In the cooling steam supply portion 51 illustrated in FIG. 12, the communication flow passage 51B is provided so as to penetrate the casing 122, the steam passage vanes 126B, and the annular member 126Ba at the distal end portion of the steam passage vanes 126B, to communicate with the gap 125B, and to be open toward the outer circumferential surface of the rotor 121. More than one of the communication flow passages 51B may be provided along the circumferential direction of the high-pressure steam nozzle portion 124A (rotational direction of the rotor 121), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 12, the cooling steam C supplied through the connection line 51A is discharged through the communication flow passage 51B toward the outer circumferential surface of the rotor 121 up to the gap 125B between the annular member 126Ba of the steam passage vanes 126B and the outer circumferential surface of the rotor 121, flows along the extending direction of the rotor 121 through the gap 125B up to the steam passage 123, and merges, between the steam passage vanes 126B and the turbine blades 127, with the superheated steam G supplied to the steam passage 123.

The cooling steam supply portion 51 illustrated in FIG. 12 discharges the cooling steam C higher in pressure and lower in temperature than the superheated steam G supplied to the high-pressure steam turbine 120 through the communication flow passage 51B to the gap 125B between the annular member 126Ba of the steam passage vanes 126B and the outer circumferential surface of the rotor 121. Thereby, the rotor 121 can be cooled. In addition, since the cooling steam supply portion 51 illustrated in FIG. 12 is provided with the communication flow passage 51B penetrating the steam passage vanes 126B, the steam passage vanes 126B can be cooled, and thus, the steam passage vanes 126B can be improved in durability against the rise in temperature of the high-pressure steam turbine 120.

Figure 13:
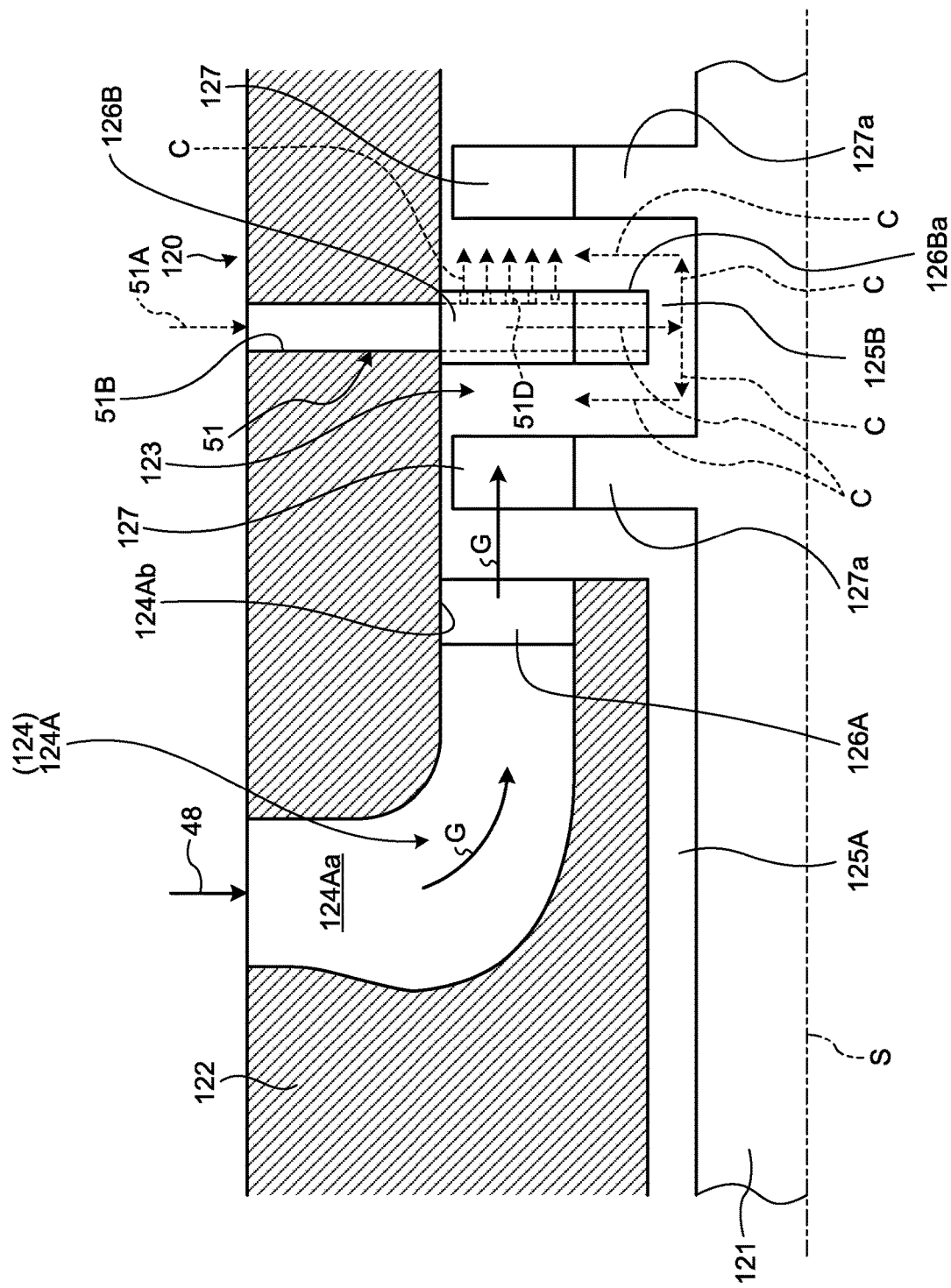
FIG. 13 is a schematic configuration diagram illustrating still another example of the cooling steam supply portion according to the first embodiment of the present invention.

In the cooling steam supply portion 51 illustrated in FIG. 13, the communication flow passage 51B illustrated in FIG. 12 includes the cooling holes 51D that penetrate the steam passage vanes 126B and are open to the steam passage 123. With this configuration, the cooling steam C is discharged to the steam passage 123 through the cooling holes 51D penetrating the steam passage vanes 126B. As a result, the nozzle portion vanes 126A can be cooled, and thus, the steam passage vanes 126B can be improved in durability against the further rise in temperature of the high-pressure steam turbine 120.

Figure 14:
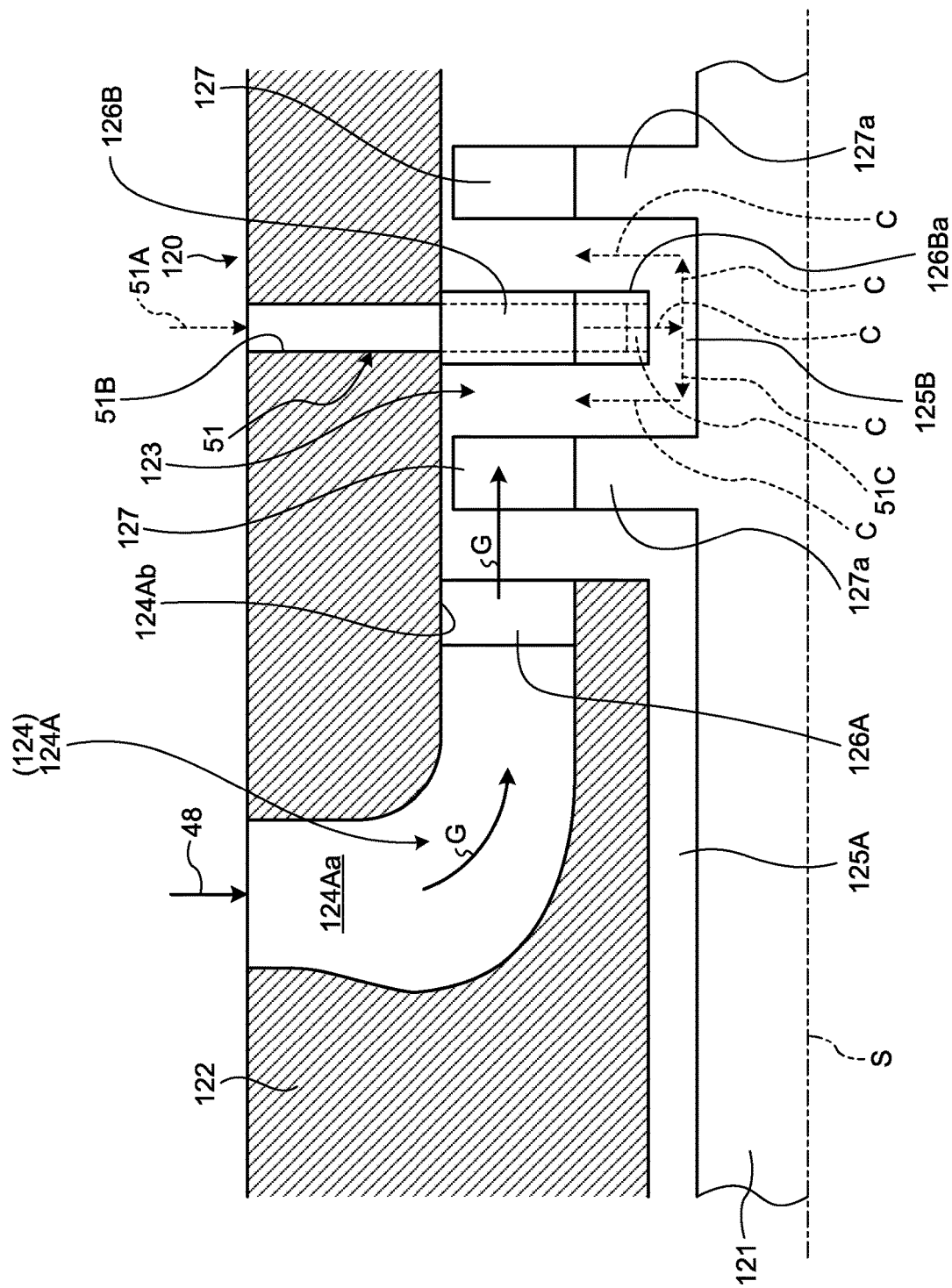
FIG. 14 is a schematic configuration diagram illustrating still another example of the cooling steam supply portion according to the first embodiment of the present invention.
Figure 15:
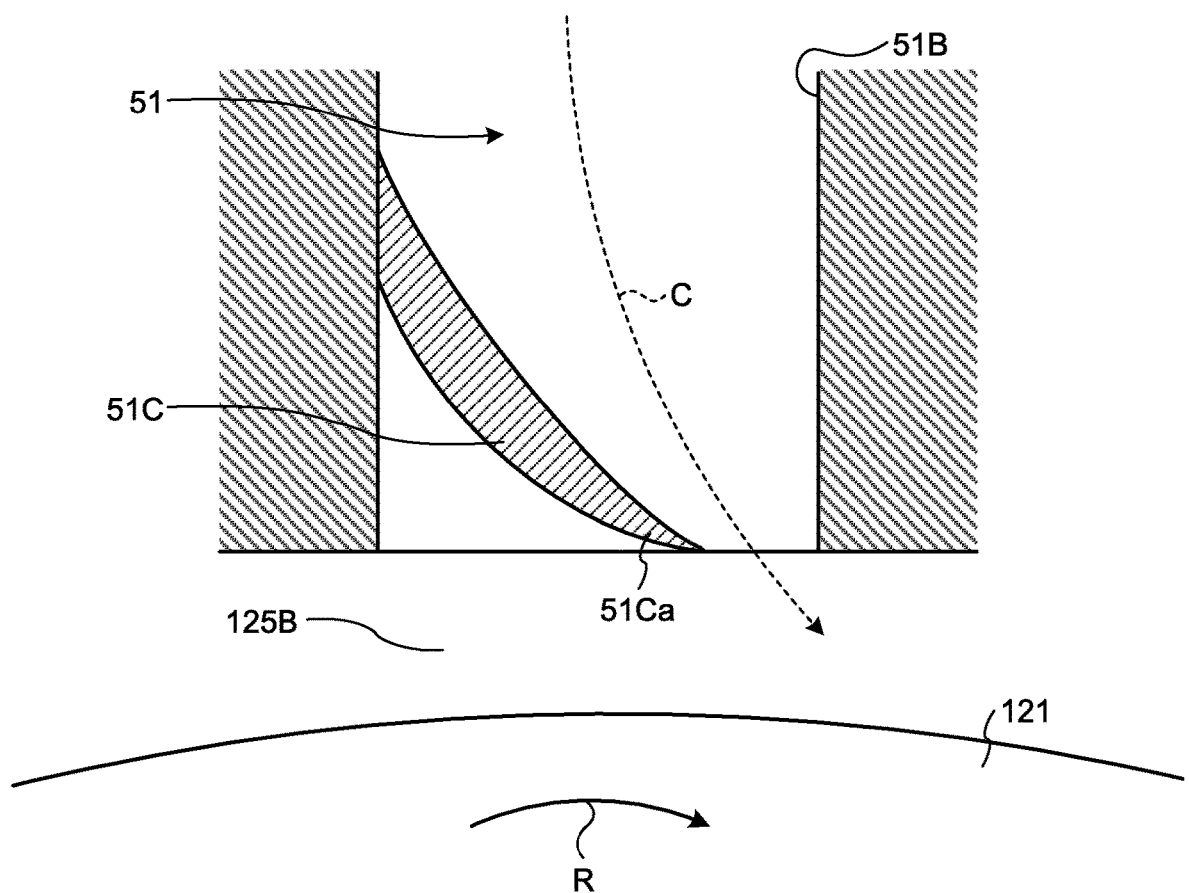
FIG. 15 is a schematic configuration diagram illustrating still another example of the cooling steam supply portion according to the first embodiment of the present invention.

In the cooling steam supply portion 51 illustrated in FIG. 14, the communication flow passage 51B illustrated in FIG. 12 preferably includes the cooling steam nozzle 51C provided at the opening communicating with the gap 125B. As illustrated in FIG. 15, the cooling steam nozzle 51C narrows the opening in the communication flow passage 51B communicating with the gap 125B. This configuration increases the flow velocity of the cooling steam C discharged from the communication flow passage 51B to the gap 125B. As a result, the temperature of the cooling steam C can be lowered, and the cooling efficiency can increase.

As illustrated in FIG. 15, the cooling steam nozzle 51C is preferably provided with the tip 51Ca thereof directed toward the rotational direction R of the rotor 121. With this configuration, the cooling steam C is discharged from the communication flow passage 51B to the gap 125B along the rotational direction R of the rotor 121. As a result, the frictional loss generated by the difference between the rotational velocity of the rotor 121 and the velocity of the cooling steam C can be reduced.

The configuration of the cooling steam nozzle 51C is not limited to a plate material as a separate member from the communication flow passage 51B as illustrated in FIGS. 14 and 15. The opening itself of the communication flow passage 51B may be narrowed to form the cooling steam nozzle 51C. The cooling steam nozzle 51C may be provided together with the cooling holes 51D.

Figure 16:
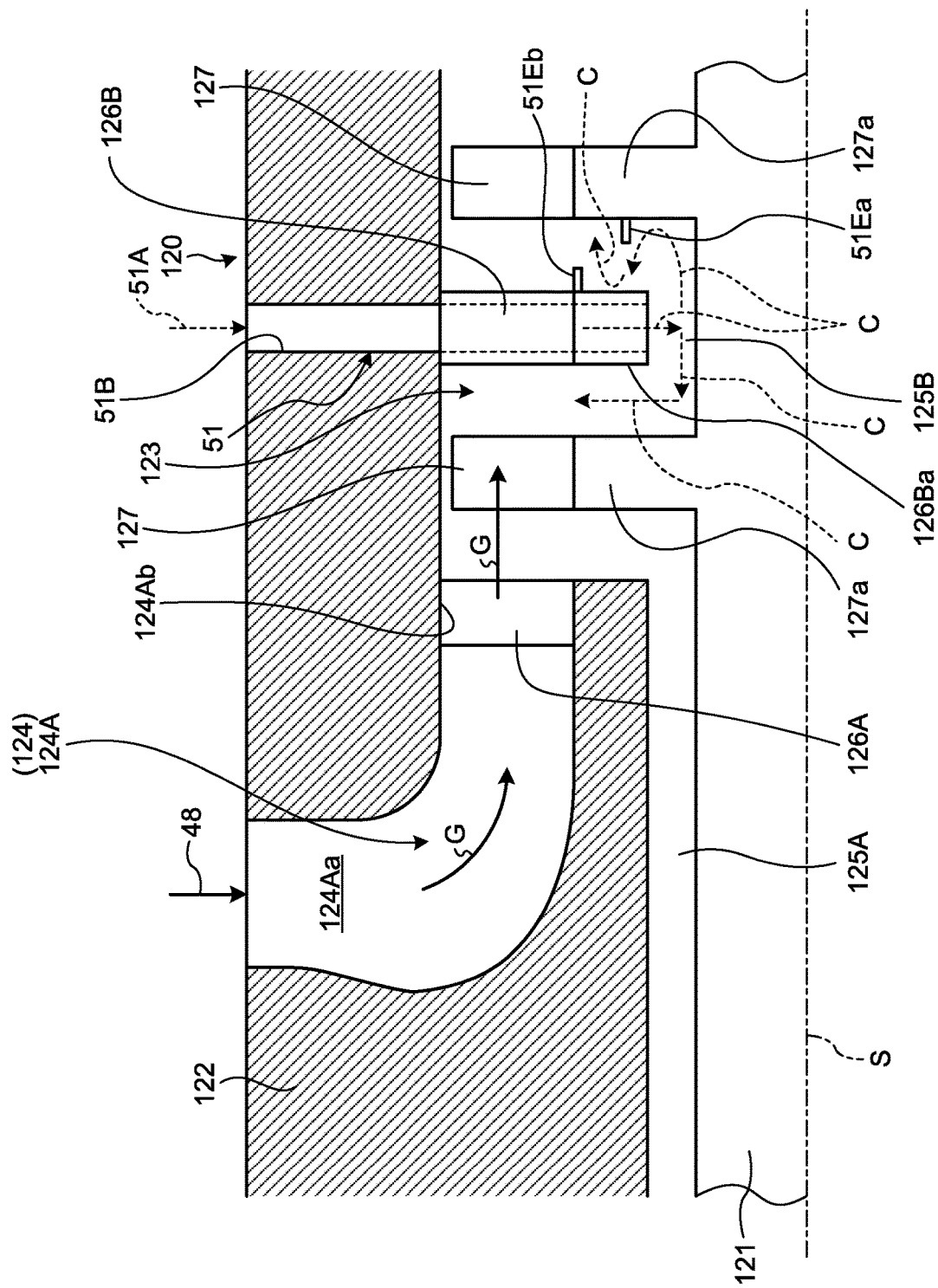
FIG. 16 is a schematic configuration diagram illustrating still another example of the cooling steam supply portion according to the first embodiment of the present invention.

The cooling steam supply portion 51 illustrated in FIG. 16 preferably includes the projecting portion 51Ea provided at the annular member 127a at the proximal end portion on the steam passage vane 126B side of the turbine blades 127 adjacent to the steam passage vanes 126B penetrated by the communication flow passage 51B illustrated in FIG. 12. The cooling steam supply portion 51 illustrated in FIG. 16 also preferably includes the projecting portion 51Eb provided at the annular member 126Ba that serves as the distal end portion of the steam passage vanes 126B penetrated by the communication flow passage 51B illustrated in FIG. 12 and that is opposed to the annular member 127a at the proximal end portion of the turbine blades 127.

The projecting portions 51Ea and 51Eb are preferably continuously provided along the circumferential direction of the high-pressure steam turbine 120 (rotational direction of the rotor 121).

With this configuration, the projecting portions 51Ea and 51Eb cause the cooling steam C flowing toward the steam passage 123 to generate a vortex between the annular member 126Ba at the distal end portion of the steam passage vanes 126B and the annular member 127a at the proximal end portion of the turbine blades 127. As a result, the superheated steam G in the steam passage 123 is prevented from being mixed in a complex manner with the cooling steam C flowing toward the steam passage 123 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 121 and provide the projecting portion 51Eb in a position farther from the rotor 121. This configuration causes the cooling steam C discharged from the communication flow passage 51B penetrating the steam passage vanes 126B toward the outer circumferential surface of the rotor 121 to generate the vortex first due to the projecting portion 51Ea, and then due to the projecting portion 51Eb. As a result, the effect can be significantly obtained to prevent the superheated steam G in the steam passage 123 from being mixed in a complex manner with the cooling steam C flowing toward the steam passage 123. The projecting portions 51Ea and 51Eb may be provided together with the cooling steam nozzle 51C and the cooling holes 51D. The projecting portions 51Ea and 51Eb illustrated in FIG. 15 are provided on a downstream side of the flow of the superheated steam G between the annular member 126Ba at the distal end portion of the steam passage vanes 126B and the annular member 127a at the proximal end portion of the turbine blades 127, but may be provided on an upstream side of the flow of the superheated steam G.

Second Embodiment

The following describes a second embodiment according to the present invention in detail based on the drawings. The present invention is not limited to the second embodiment. Components in the second embodiment to be described below include those replaceable by those skilled in the art and easy, or those substantially equivalent thereto.

Figure 17:
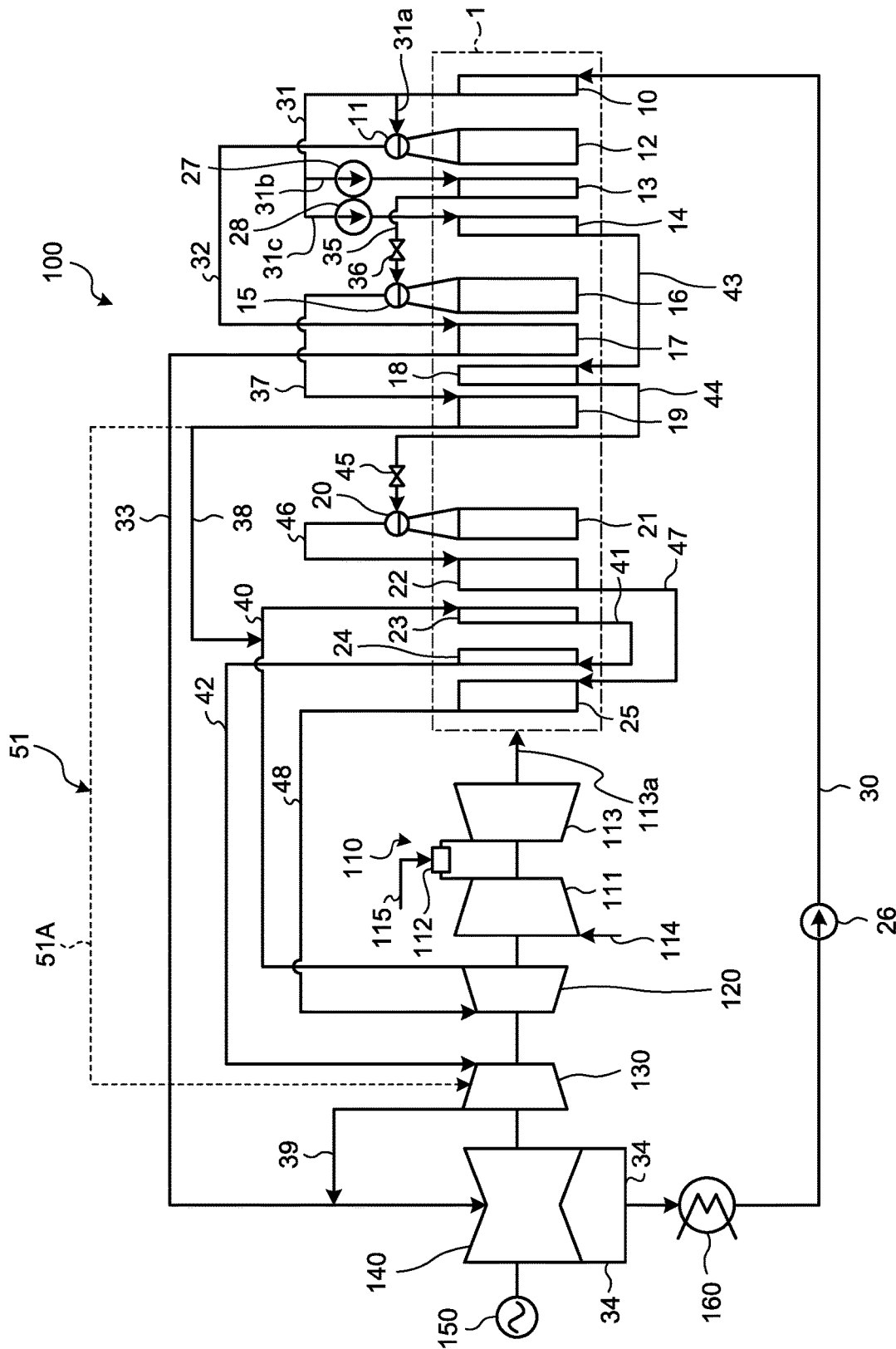
FIG. 17 is a schematic configuration diagram illustrating an example of the combined cycle plant according to a second embodiment of the present invention.
Figure 18:
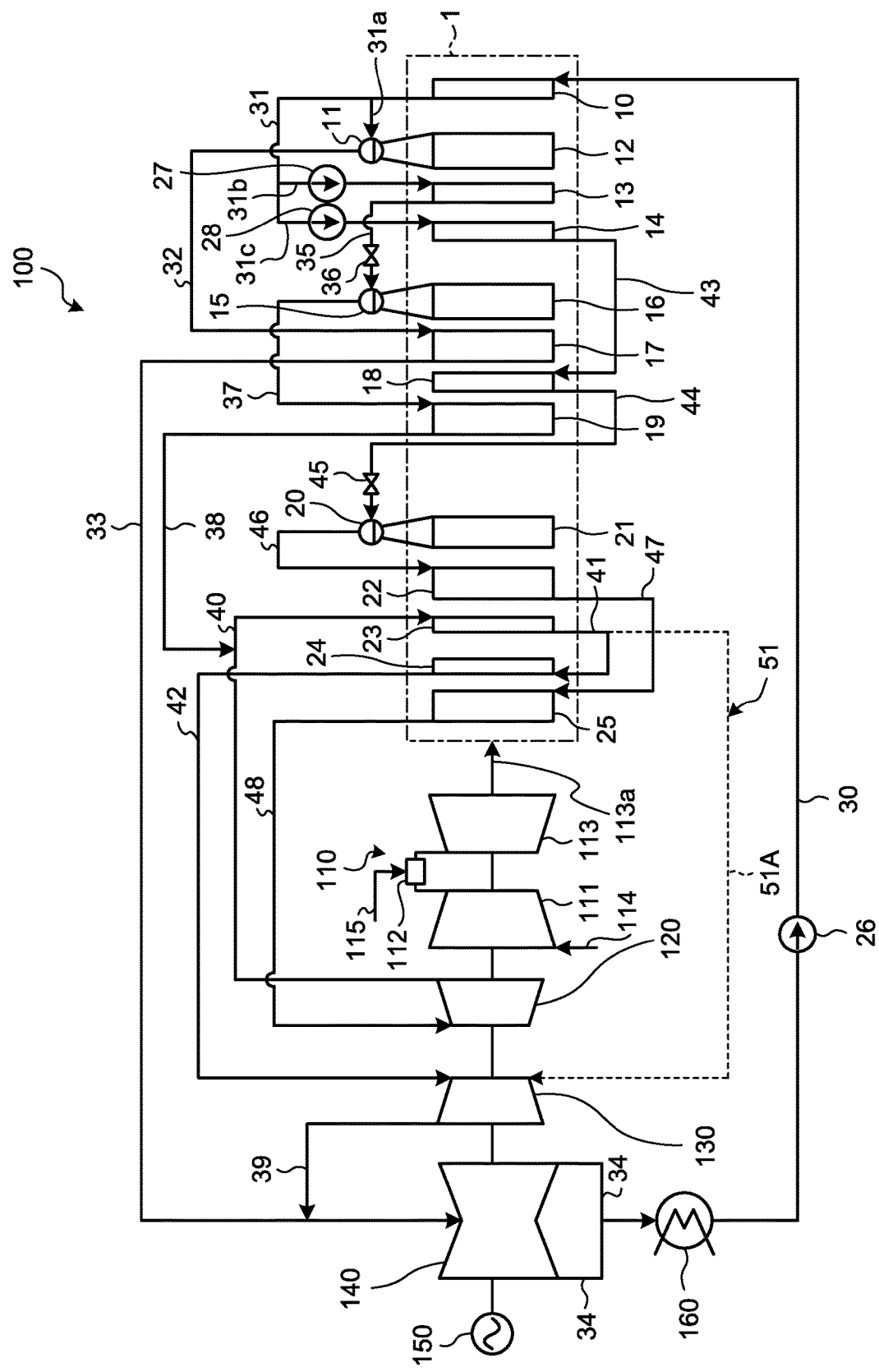
FIG. 18 is a schematic configuration diagram illustrating another example of the combined cycle plant according to the second embodiment of the present invention.

FIG. 17 is a schematic configuration diagram illustrating an example of the combined cycle plant according to the second embodiment. FIG. 18 is a schematic configuration diagram illustrating another example of the combined cycle plant according to the second embodiment. The combined cycle plant 100 illustrated in FIGS. 17 and 18 includes the gas turbine 110, the high-pressure steam turbine 120, the intermediate-pressure steam turbine 130, and the low-pressure steam turbine 140. The gas turbine 110, the high-pressure steam turbine 120, the intermediate-pressure steam turbine 130, and the low-pressure steam turbine 140 are coaxially disposed with the generator 150.

The gas turbine 110 includes the compressor 111, the combustor 112, and the turbine 113. In the compressor 111, the compressor inlet air 114 is raised in pressure and supplied to the combustor 112. In the combustor 112, the high-temperature combustion gas is generated from the supplied air and the fuel 115, and is supplied to the turbine 113. The combustion gas passing through the turbine 113 rotationally drives the turbine 113, and is then discharged as the flue gas.

The combined cycle plant 100 includes the boiler (exhausted heat recovery boiler) 1 that uses the flue gas discharged from the turbine 113 in the gas turbine 110 as the heat source to generate the superheated steam from water. The superheated steam generated by the boiler 1 drives the high-pressure steam turbine 120, the intermediate-pressure steam turbine 130, and the low-pressure steam turbine 140. The generator 150 is driven by the gas turbine 110, the high-pressure steam turbine 120, the intermediate-pressure steam turbine 130, and the low-pressure steam turbine 140 to generate the electric power. The steam used by the low-pressure steam turbine 140 is condensed into water by the condenser 160 connected to the low-pressure steam turbine 140, and is fed as the water for generating the superheated steam to the boiler 1.

The boiler 1 is connected to the flue gas duct 113a provided on the discharge side of the turbine 113 in the gas turbine 110. The boiler 1 is provided, from the downstream side of the flow of the flue gas, with the low-pressure economizer 10, the low-pressure drum 11, the low-pressure evaporator 12, the intermediate-pressure economizer 13, the high-pressure primary economizer 14, the intermediate-pressure drum 15, the intermediate-pressure evaporator 16, the low-pressure superheater 17, the high-pressure secondary economizer 18, the intermediate-pressure superheater 19, the high-pressure drum 20, the high-pressure evaporator 21, the high-pressure primary superheater 22, the primary reheater 23, the secondary reheater 24, and the high-pressure secondary superheater 25, and is also provided with the condensate pump 26, the intermediate-pressure feed water pump 27, and the high-pressure feed water pump 28.

The boiler 1 includes the low-pressure system that generates the superheated steam of low pressure for driving the low-pressure steam turbine 140, the intermediate-pressure system that generates the superheated steam of intermediate pressure for driving the intermediate-pressure steam turbine 130, and the high-pressure system that generates the superheated steam of high pressure for driving the high-pressure steam turbine 120. The low-pressure system includes the low-pressure economizer 10, the low-pressure drum 11, the low-pressure evaporator 12, the low-pressure superheater 17, and the condensate pump 26. The intermediate-pressure system includes the intermediate-pressure economizer 13, the intermediate-pressure drum 15, the intermediate-pressure evaporator 16, the intermediate-pressure superheater 19, the primary reheater 23, the secondary reheater 24, and the intermediate-pressure feed water pump 27. The high-pressure system includes the high-pressure primary economizer 14, the high-pressure secondary economizer 18, the high-pressure drum 20, the high-pressure evaporator 21, the high-pressure primary superheater 22, the high-pressure secondary superheater 25, and the high-pressure feed water pump 28.

In the low-pressure system, the low-pressure economizer 10 is connected to the condenser 160 through the connection line 30. The condensate pump 26 is provided in the connection line 30. The low-pressure economizer 10 is connected to the low-pressure drum 11 through the low-pressure branch line 31a of the connection line 31 branching into the three lines. The low-pressure drum 11 is connected to the low-pressure evaporator 12. The low-pressure drum 11 is moreover connected to the low-pressure superheater 17 through the connection line 32. The low-pressure superheater 17 is connected to the inlet side of the low-pressure steam turbine 140 through the connection line 33. The outlet side of the low-pressure steam turbine 140 is connected to the condenser 160 through the connection line 34.

That is, in the low-pressure system, the water (condensed water) in the condenser 160 is conducted by the condensate pump 26 through the connection line 30 into the low-pressure economizer 10, is heated therein, and flows into the low-pressure drum 11 through the low-pressure branch line 31a of the connection line 31. The water supplied to the low-pressure drum 11 evaporates into saturated steam in the low-pressure evaporator 12, is returned to the low-pressure drum 11, and is fed out to the low-pressure superheater 17 through the connection line 32. The saturated steam is superheated by the low-pressure superheater 17, and this superheated steam is supplied to the low-pressure steam turbine 140 through the connection line 33. The steam discharged after driving the low-pressure steam turbine 140 is conducted to the condenser 160 through the connection line 34 to turn into the water (condensed water), and the water is fed out by the condensate pump 26 to the low-pressure economizer 10 through the connection line 30.

In the intermediate-pressure system, the intermediate-pressure economizer 13 is connected to the low-pressure economizer 10 through the intermediate-pressure branch line 31b of the connection line 31 branching into the three lines. The intermediate-pressure feed water pump 27 is provided in the intermediate-pressure branch line 31b. The intermediate-pressure economizer 13 is also connected to the intermediate-pressure drum 15 through the connection line 35. The flow control valve 36 is provided at the intermediate portion of the connection line 35. The intermediate-pressure drum 15 is connected to the intermediate-pressure evaporator 16. The intermediate-pressure drum 15 is connected to the intermediate-pressure superheater 19 through the connection line 37. The intermediate-pressure superheater 19 is connected to the inlet side of the primary reheater 23 through the connection line 38. In the intermediate-pressure system, the primary reheater 23 is connected to the outlet side of the high-pressure steam turbine 120 through the connection line 40. The primary reheater 23 is connected to the secondary reheater 24 through the connection line 41. The secondary reheater 24 is connected to the inlet side of the intermediate-pressure steam turbine 130 through the connection line 42. The outlet side of the intermediate-pressure steam turbine 130 is connected to the inlet side of the low-pressure steam turbine 140 through the connection line 39.

That is, in the intermediate-pressure system, the water heated in the low-pressure economizer 10 is conducted by the intermediate-pressure feed water pump 27 into the intermediate-pressure economizer 13 through the intermediate-pressure branch line 31b of the connection line 31, is further heated therein, and flows into the intermediate-pressure drum 15 through the connection line 35. The water supplied to the intermediate-pressure drum 15 evaporates into saturated steam in the intermediate-pressure evaporator 16, is returned to the intermediate-pressure drum 15, and is fed out to the intermediate-pressure superheater 19 through the connection line 37. The saturated steam is superheated by the intermediate-pressure superheater 19, and this superheated steam is supplied to the primary reheater 23 through the connection line 38. In the intermediate-pressure system, the steam discharged after driving the high-pressure steam turbine 120 is fed out to the primary reheater 23 through the connection line 40. The steam is superheated by the primary reheater 23, and this superheated steam is fed out to the secondary reheater 24 through the connection line 41. The steam is further superheated by the secondary reheater 24, and this superheated steam is supplied to the intermediate-pressure steam turbine 130 through the connection line 42. The steam discharged after driving the intermediate-pressure steam turbine 130 is supplied to the low-pressure steam turbine 140 through the connection line 39.

Each of the primary reheater 23 and the secondary reheater 24 superheats the steam, thus having the same function as that of the superheater, and being included in superheaters in the second embodiment. In other words, the primary reheater 23 is also called the first superheater, and the secondary reheater 24 is also called the second superheater.

In the high-pressure system, the high-pressure primary economizer 14 is connected to the low-pressure economizer 10 through the high-pressure branch line 31c of the connection line 31 branching into the three lines. The high-pressure feed water pump 28 is provided in the high-pressure branch line 31c. The high-pressure primary economizer 14 is also connected to the high-pressure secondary economizer 18 through the connection line 43. The high-pressure secondary economizer 18 is connected to the high-pressure drum 20 through the connection line 44. The flow control valve 45 is provided at the intermediate portion of the connection line 44. The high-pressure drum 20 is connected to the high-pressure evaporator 21. The high-pressure drum 20 is also connected to the high-pressure primary superheater 22 through the connection line 46. The high-pressure primary superheater 22 is connected to the high-pressure secondary superheater 25 through the connection line 47. The high-pressure secondary superheater 25 is connected to the inlet side of the high-pressure steam turbine 120 through the connection line 48. The outlet side of the high-pressure steam turbine 120 is connected to the primary reheater 23 of the intermediate-pressure system through the connection line 40 as described above.

That is, in the high-pressure system, the water heated in the low-pressure economizer 10 is conducted by the high-pressure feed water pump 28 into the high-pressure primary economizer 14 through the high-pressure branch line 31c of the connection line 31, is further heated therein, further flows into the high-pressure secondary economizer 18 through the connection line 43, is further heated therein, and flows into the high-pressure drum 20 through the connection line 44. The water supplied to the high-pressure drum 20 evaporates into saturated steam in the high-pressure evaporator 21, is returned to the high-pressure drum 20, and is fed out to the high-pressure primary superheater 22 through the connection line 46. The saturated steam is superheated by the high-pressure primary superheater 22, and this superheated steam is supplied to the high-pressure secondary superheater 25 through the connection line 47. The superheated steam is further superheated by the high-pressure secondary superheater 25, and this superheated steam is supplied to the high-pressure steam turbine 120 through the connection line 48.

In the combined cycle plant 100 described above, the steam turbine of the second embodiment includes the cooling steam supply portion (second cooling steam supply portion) 51 that cools the inside of the intermediate-pressure steam turbine 130. As illustrated in FIGS. 17 and 18, the cooling steam supply portion 51 includes the connection line 51A that communicates a portion extending from an outlet of the intermediate-pressure evaporator 16 through the intermediate-pressure superheater 19 and the primary reheater 23 to the inside of the secondary reheater 24 with the inside of the intermediate-pressure steam turbine 130. Specifically, the connection line 51A communicates at least a part of the connection line 37 connecting the intermediate-pressure drum 15 to the intermediate-pressure superheater 19, the inside of the intermediate-pressure superheater 19, the connection line (and a part of the connection line 40) connecting the intermediate-pressure superheater 19 to the primary reheater 23, the inside of the primary reheater 23, the connection line 41 connecting the primary reheater 23 to the secondary reheater 24, and the inside of the secondary reheater 24 with the inside of the intermediate-pressure steam turbine 130.

The superheated steam supplied to the intermediate-pressure steam turbine 130 flows from the secondary reheater 24 through the connection line 42 as described above, and decreases in pressure while flowing through the connection line 42. Therefore, the steam flowing from the outlet of intermediate-pressure evaporator 16 through the intermediate-pressure superheater 19 and the primary reheater 23 to the inside of the secondary reheater 24 is higher in pressure and lower in temperature (at a temperature lower than approximately 550° C. to 600° C. of the superheated steam) than the superheated steam supplied to the intermediate-pressure steam turbine 130. Accordingly, the cooling steam higher in pressure and lower in temperature than the superheated steam supplied to the intermediate-pressure steam turbine 130 can be supplied to the inside of the intermediate-pressure steam turbine 130.

As described above, since the steam turbine of the second embodiment includes the cooling steam supply portion 51 that includes the connection line 51A that communicates the portion extending from the outlet of the intermediate-pressure evaporator 16 through the intermediate-pressure superheater 19 and the primary reheater 23 to the inside of the secondary reheater 24 with the inside of the intermediate-pressure steam turbine 130, the cooling steam higher in pressure and lower in temperature than the superheated steam supplied to the intermediate-pressure steam turbine 130 can be supplied to the inside of the intermediate-pressure steam turbine 130 in the combined cycle plant 100. As a result, high-temperature portions, such as a rotor, inside the intermediate-pressure steam turbine 130 can be cooled without requiring another source of power. Since the cooling is performed using the steam generated in the combined cycle plant 100 and not using any fluid in the intermediate-pressure steam turbine 130, the intermediate-pressure steam turbine 130 can be prevented from decreasing in operating efficiency, and as a result, the cycle efficiency can be prevented from decreasing.

In the steam turbine of the second embodiment, the connection line 51A preferably communicates the connection line 38 (and the part of the connection line 40) extending from an outlet of the intermediate-pressure superheater 19 to the inlet of the primary reheater 23 with the inside of the intermediate-pressure steam turbine 130, as illustrated in FIG. 17.

When the cooling steam is supplied from the connection line 38 (and the part of the connection line 40) extending from the outlet of the intermediate-pressure superheater 19 to the inlet of the primary reheater 23 to the inside of the intermediate-pressure steam turbine 130, the steam supplied to the primary reheater 23 and the secondary reheater 24 decreases. Consequently, the primary reheater 23 and the secondary reheater 24 increase in superheating efficiency, and the superheated steam supplied to the intermediate-pressure steam turbine 130 increases in temperature. As a result, the intermediate-pressure steam turbine 130 can increase in operating efficiency, and the cycle efficiency can increase.

When the cooling steam is supplied from the connection line 38 (and the part of the connection line 40) extending from the outlet of the intermediate-pressure superheater 19 to the inlet of the primary reheater 23 to the inside of the intermediate-pressure steam turbine 130, the amount of steam obtained from the intermediate-pressure evaporator 16 can increase if the temperature of the superheated steam supplied to the intermediate-pressure steam turbine 130 is constant. Consequently, the amount of the superheated steam supplied to the intermediate-pressure steam turbine 130 can increase. As a result, the intermediate-pressure steam turbine 130 can increase in operating efficiency, and the cycle efficiency can increase.

In the steam turbine of the second embodiment, the connection line 51A preferably communicates the connection line 41 extending from an outlet of the primary reheater 23 to an inlet of the secondary reheater 24 with the inside of the intermediate-pressure steam turbine 130, as illustrated in FIG. 18.

When the cooling steam is supplied from the connection line 41 extending from the outlet of the primary reheater 23 to the inlet of the secondary reheater 24 to the inside of the intermediate-pressure steam turbine 130, the steam supplied to the secondary reheater 24 decreases. Consequently, the secondary reheater 24 increases in superheating efficiency, and the superheated steam supplied to the intermediate-pressure steam turbine 130 increases in temperature. As a result, the intermediate-pressure steam turbine 130 can increase in operating efficiency, and the cycle efficiency can increase.

When the cooling steam is supplied from the connection line 41 extending from the outlet of the primary reheater 23 to the inlet of the secondary reheater 24 to the inside of the intermediate-pressure steam turbine 130, the amount of the steam obtained from the intermediate-pressure evaporator 16 can increase if the temperature of the superheated steam supplied to the intermediate-pressure steam turbine 130 is constant. Consequently, the amount of the superheated steam supplied to the intermediate-pressure steam turbine 130 can increase. As a result, the intermediate-pressure steam turbine 130 can increase in operating efficiency, and the cycle efficiency can increase.

FIGS. 19 to 32 are schematic configuration diagrams illustrating examples of the cooling steam supply portion according to the second embodiment.

The intermediate-pressure steam turbine 130 includes a rotor 131, a casing 132, a steam passage 133, and an intermediate-pressure steam supply portion 134. The rotor 131 is provided so as to extend along the axial center S of rotation of the rotor 131. The casing 132 accommodates the rotor 131, and supports the rotor 131 so as to be rotatable about the axial center S. The steam passage 133 is an annular space provided along the extending direction of the rotor 131 between the rotor 131 and the casing 132. The intermediate-pressure steam supply portion 134 is provided so as to communicate, from outside the casing 132 through the casing 132, with the steam passage 133, and is connected to the connection line 42 to be supplied with the steam superheated by the secondary reheater 24 so as to supply the steam to the steam passage 133.

The intermediate-pressure steam supply portion 134 includes an intermediate-pressure steam nozzle portion 134A. The intermediate-pressure steam nozzle portion 134A is formed in an annular shape surrounding the outer circumference of the rotor 131 and mounted to the casing 132 to have a gap 135A communicating with the steam passage 133 between the outer surface of the intermediate-pressure steam nozzle portion 134A and the outer circumferential surface of the rotor 131. The intermediate-pressure steam nozzle portion 134A has an intermediate-pressure steam nozzle chamber 134Aa formed therein along an annular shape and an opening 134Ab communicating with the steam passage 133 from the intermediate-pressure steam nozzle chamber 134Aa toward the extending direction of the rotor 131. The connection line 42 is connected to the intermediate-pressure steam nozzle portion 134A, and the steam superheated by the secondary repeater 24 is supplied to the intermediate-pressure steam nozzle chamber 134Aa, and discharged from the opening 134Ab to the steam passage 133.

In the intermediate-pressure steam supply portion 134, a plurality of nozzle portion vanes 136A are mounted along an annular shape to the opening 134Ab of the intermediate-pressure steam nozzle chamber 134Aa in the intermediate-pressure steam nozzle portion 134A. The rotor 131 side of the nozzle portion vanes 136A serves as a distal end portion, and the casing 132 side thereof serves as a proximal end portion. In the steam passage 133, a plurality of steam passage vanes 136B are mounted along an annular shape to the casing 132. A plurality of stages of the steam passage vanes 136B are provided along the extending direction of the rotor 131. The rotor 131 side of the steam passage vanes 136B serves as a distal end portion, to which an annular member 136Ba is mounted. A gap 135B is provided between the annular member 136Ba and the outer circumferential surface of the rotor 131. A side of the steam passage vanes 136B mounted to the casing 132 serves as a proximal end portion. In the steam passage 133, a plurality of turbine blades 137 are mounted to the outer circumference of the rotor 131 along an annular shape adjacent to the vanes 136A and 136B. A plurality of stages of the turbine blades 137 are provided along the extending direction of the rotor 131. A side of the turbine blades 137 mounted to the rotor 131 serves as a proximal end portion, and an annular member 137a is mounted between this proximal end portion and the rotor 131. A side of the turbine blades 137 facing the casing 132 serves as a distal end portion.

Accordingly, in the intermediate-pressure steam turbine 130, the steam superheated by the secondary repeater 24 is supplied to the intermediate-pressure steam nozzle chamber 134Aa, and discharged from the opening 134Ab to the steam passage 133, and the rotor 131 is rotated by the vanes 136A and 136B and the turbine blades 137.

In the steam turbine of the second embodiment, as illustrated in FIGS. 19 to 32, the cooling steam supply portion 51 for the intermediate-pressure steam turbine 130 having the above-described configuration includes the communication flow passage 51B that is connected to the connection line 51A and communicates from outside the casing 132 through the casing 132 to the steam passage 133 separately from the intermediate-pressure steam supply portion 134.

Figure 19:
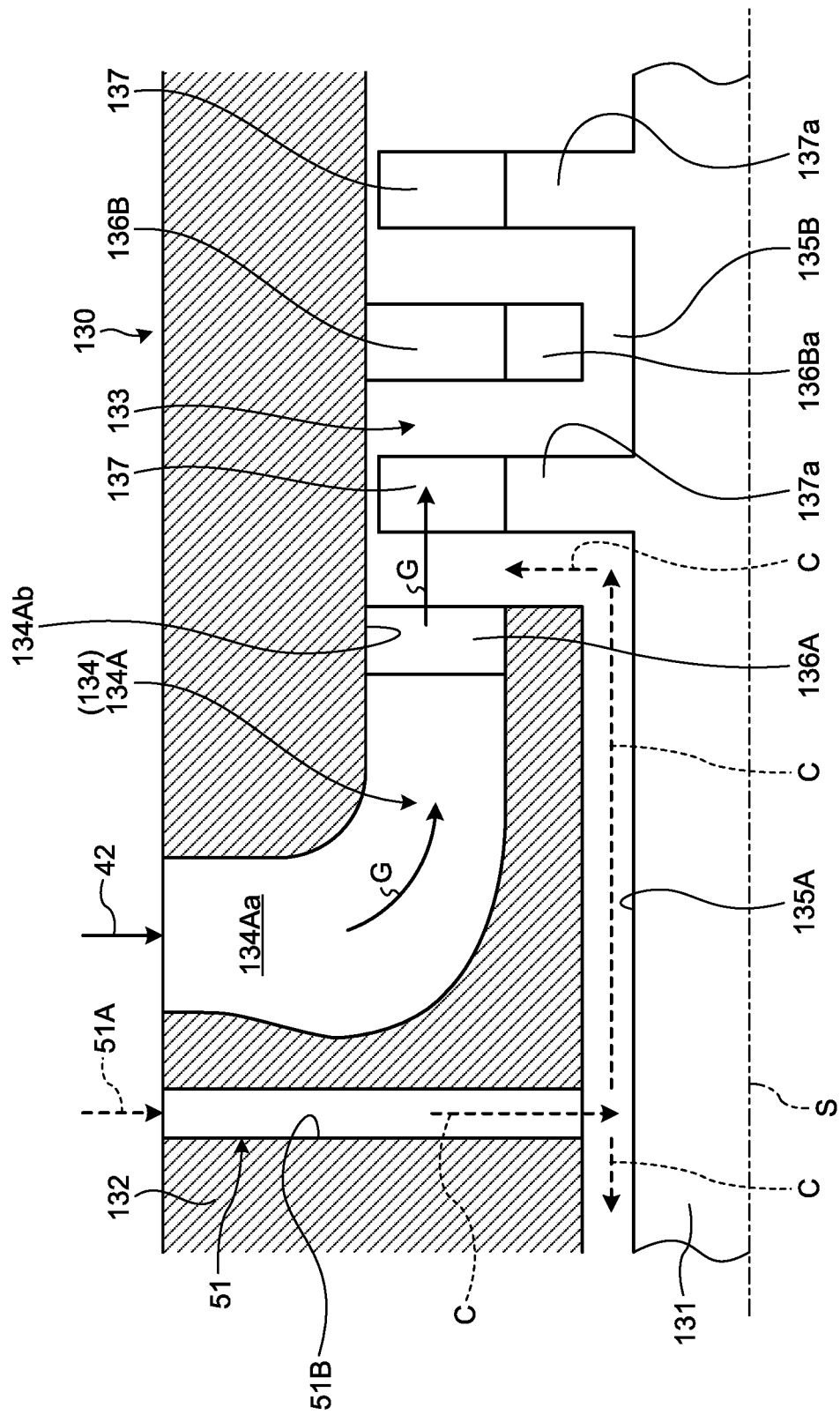
FIG. 19 is a schematic configuration diagram illustrating an example of the cooling steam supply portion according to the second embodiment of the present invention.

In the cooling steam supply portion 51 illustrated in FIG. 19, the communication flow passage 51B is provided so as to penetrate the casing 132 on the opposite side of the opening 134Ab of the intermediate-pressure steam nozzle chamber 134Aa in the intermediate-pressure steam nozzle portion 134A, and so as to communicate with the gap 135A and to be open toward the outer circumferential surface of the rotor 131. More than one of the communication flow passages 51B may be provided along the circumferential direction of the intermediate-pressure steam nozzle portion 134A (rotational direction of the rotor 131), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 19, the cooling steam C supplied through the connection line 51A is discharged through the communication flow passage 51B toward the outer circumferential surface of the rotor 131 up to the gap 135A between the intermediate-pressure steam supply portion 134 and the outer circumferential surface of the rotor 131, flows along the extending direction of the rotor 131 through the gap 135A up to the steam passage 133, and merges, between the nozzle portion vanes 136A and the turbine blades 137, with the superheated steam G supplied to the steam passage 133 through the intermediate-pressure steam supply portion 134.

The cooling steam supply portion 51 illustrated in FIG. 19 discharges the cooling steam C higher in pressure and lower in temperature than the superheated steam G supplied to the intermediate-pressure steam turbine 130 through the communication flow passage 51B to the gap 135A between the intermediate-pressure steam supply portion 134 and the outer circumferential surface of the rotor 131. Thereby, the rotor 131 can be cooled. In addition, since the cooling steam supply portion 51 illustrated in FIG. 19 discharges the cooling steam C higher in pressure and lower in temperature than the superheated steam G supplied to the intermediate-pressure steam turbine 130 through the communication flow passage 51B to the gap 135A between the intermediate-pressure steam supply portion 134 and the outer circumferential surface of the rotor 131, the superheated steam G is prevented from leaking out from the steam passage 133 through the gap 135A. As a result, since the superheated steam G is prevented from being lost, the intermediate-pressure steam turbine 130 can increase in operating efficiency, and the cycle efficiency can increase.

Figure 20:
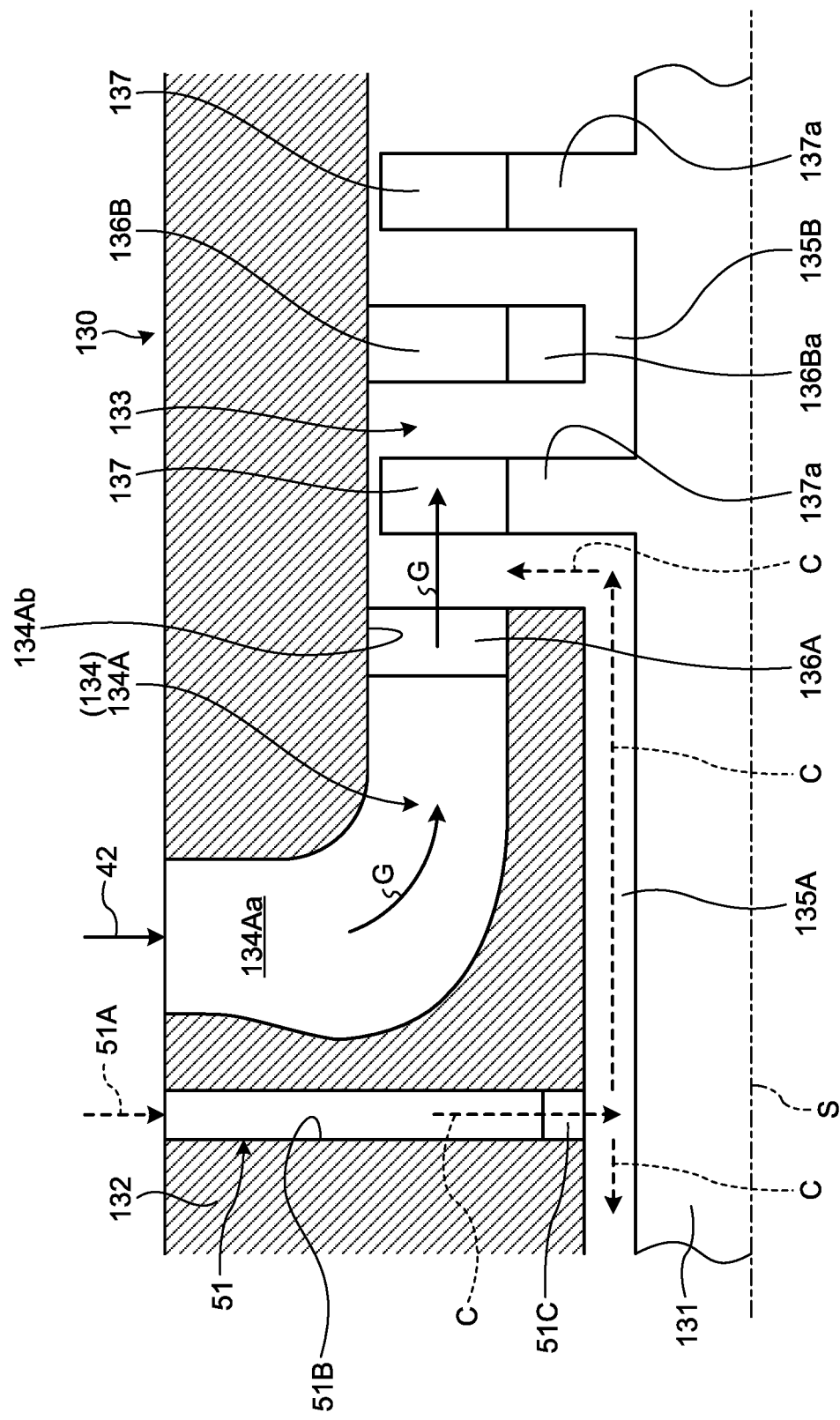
FIG. 20 is a schematic configuration diagram illustrating another example of the cooling steam supply portion according to the second embodiment of the present invention.
Figure 21:
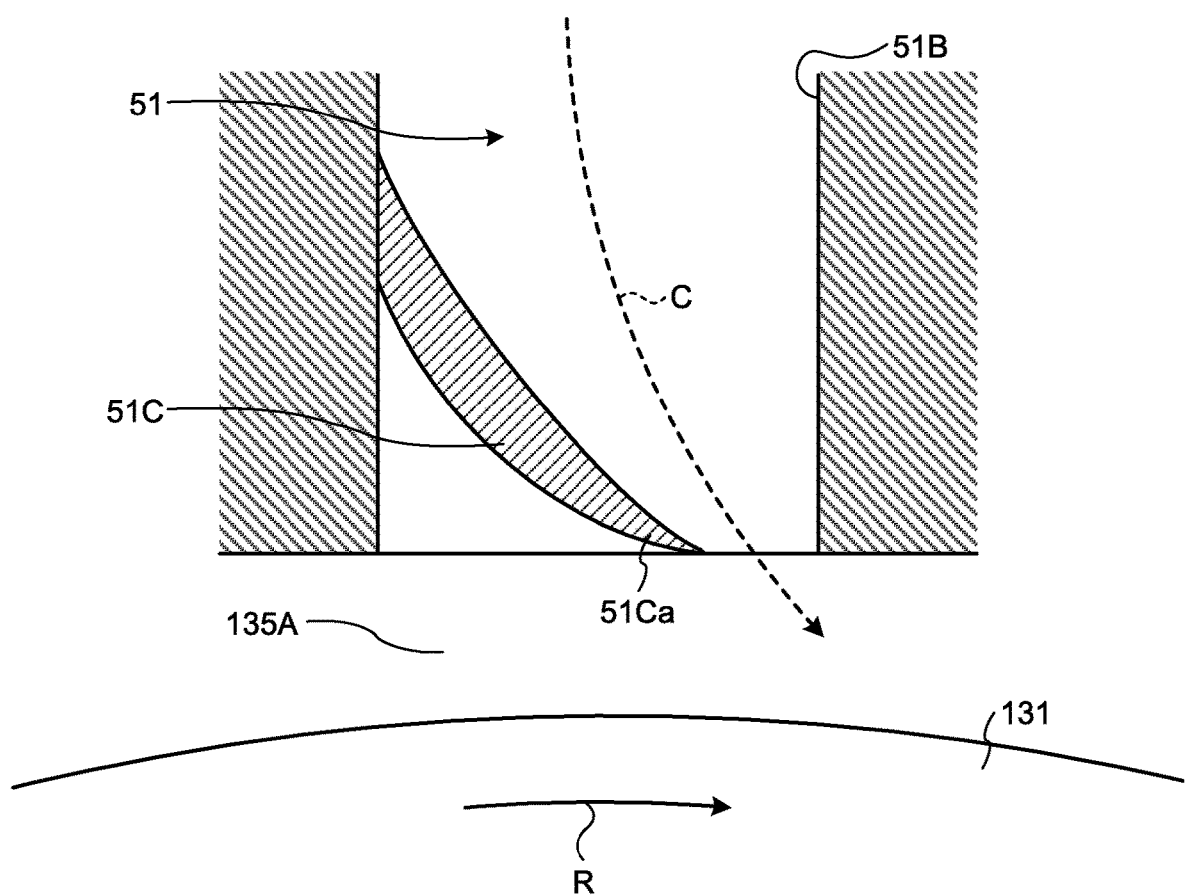
FIG. 21 is a schematic configuration diagram illustrating still another example of the cooling steam supply portion according to the second embodiment of the present invention.

In the cooling steam supply portion 51 illustrated in FIG. 20, the communication flow passage 51B illustrated in FIG. 19 preferably includes the cooling steam nozzle 51C provided at an opening communicating with the gap 135A. As illustrated in FIG. 21, the cooling steam nozzle 51C narrows the opening in the communication flow passage 51B communicating with the gap 135A. This configuration increases the flow velocity of the cooling steam C discharged from the communication flow passage 51B to the gap 135A. As a result, the temperature of the cooling steam C can be lowered, and the cooling efficiency can increase.

As illustrated in FIG. 21, the cooling steam nozzle 51C is preferably provided with the tip 51Ca thereof directed toward the rotational direction R of the rotor 131. With this configuration, the cooling steam C is discharged from the communication flow passage 51B to the gap 135A along the rotational direction R of the rotor 131. As a result, the frictional loss generated by the difference between the rotational velocity of the rotor 131 and the velocity of the cooling steam C can be reduced.

The configuration of the cooling steam nozzle 51C is not limited to a plate material as a separate member from the communication flow passage 51B as illustrated in FIGS. 20 and 21. The opening itself of the communication flow passage 51B may be narrowed to form the cooling steam nozzle 51C.

Figure 22:
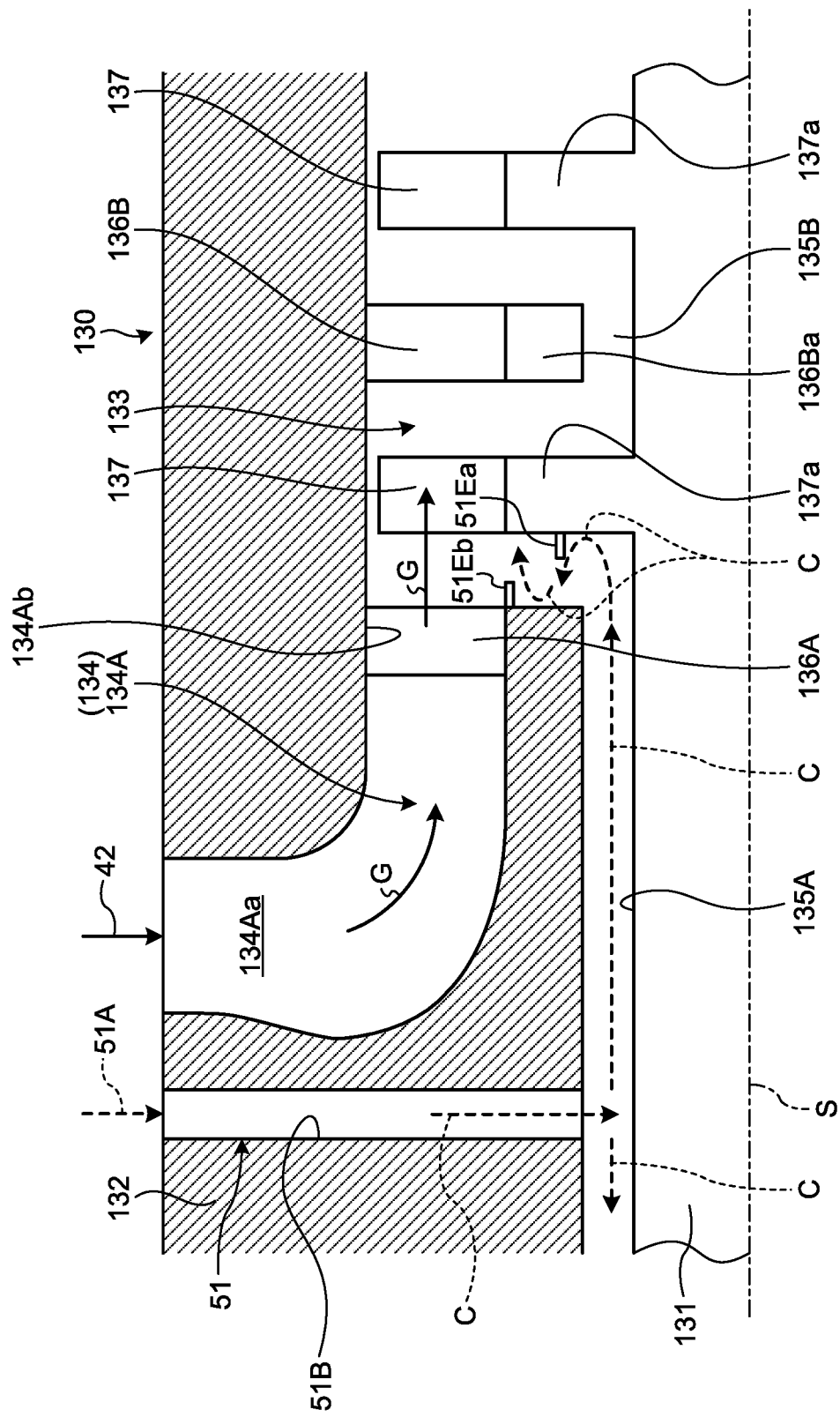
FIG. 22 is a schematic configuration diagram illustrating still another example of the cooling steam supply portion according to the second embodiment of the present invention.

The cooling steam supply portion 51 illustrated in FIG. 22 preferably includes the projecting portion 51Ea that serves as a portion where the gap 135A penetrated by the communication flow passage 51B illustrated in FIG. 19 reaches the steam passage 133 and that is provided at the annular member 137a at the proximal end portion on the nozzle portion vane 136A side of the turbine blades 137 adjacent to the nozzle portion vanes 136A. The cooling steam supply portion 51 illustrated in FIG. 22 also preferably includes the projecting portion 51Eb that serves as a portion where the gap 135A penetrated by the communication flow passage 51B illustrated in FIG. 19 reaches the steam passage 133 and that is provided at a part of the intermediate-pressure steam nozzle portion 134A serving as the distal end portion of the nozzle portion vanes 136A and opposed to the annular member 137a at the proximal end portion of the turbine blades 137.

The projecting portions 51Ea and 51Eb are preferably continuously provided along the circumferential direction of the intermediate-pressure steam turbine 130 (rotational direction of the rotor 131).

With this configuration, the projecting portions 51Ea and 51Eb cause the cooling steam C flowing toward the steam passage 133 to generate a vortex between the opening 134Ab of the intermediate-pressure steam nozzle chamber 134Aa in the intermediate-pressure steam nozzle portion 134A provided with the nozzle portion vanes 136A and the annular member 137a at the proximal end portion of the turbine blades 137. As a result, the superheated steam G in the steam passage 133 is prevented from being mixed in a complex manner with the cooling steam C flowing toward the steam passage 133 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 131 and provide the projecting portion 51Eb in a position farther from the rotor 131. This configuration causes the cooling steam C discharged from the communication flow passage 51B penetrating toward the nozzle portion vanes 136A toward the outer circumferential surface of the rotor 131 to generate the vortex first due to the projecting portion 51Ea, and then due to the projecting portion 51Eb. As a result, the effect can be significantly obtained to prevent the superheated steam G in the steam passage 133 from being mixed in a complex manner with the cooling steam C flowing toward the steam passage 133. The projecting portions 51Ea and 51Eb may be provided together with the cooling steam nozzle 51C.

Figure 23:
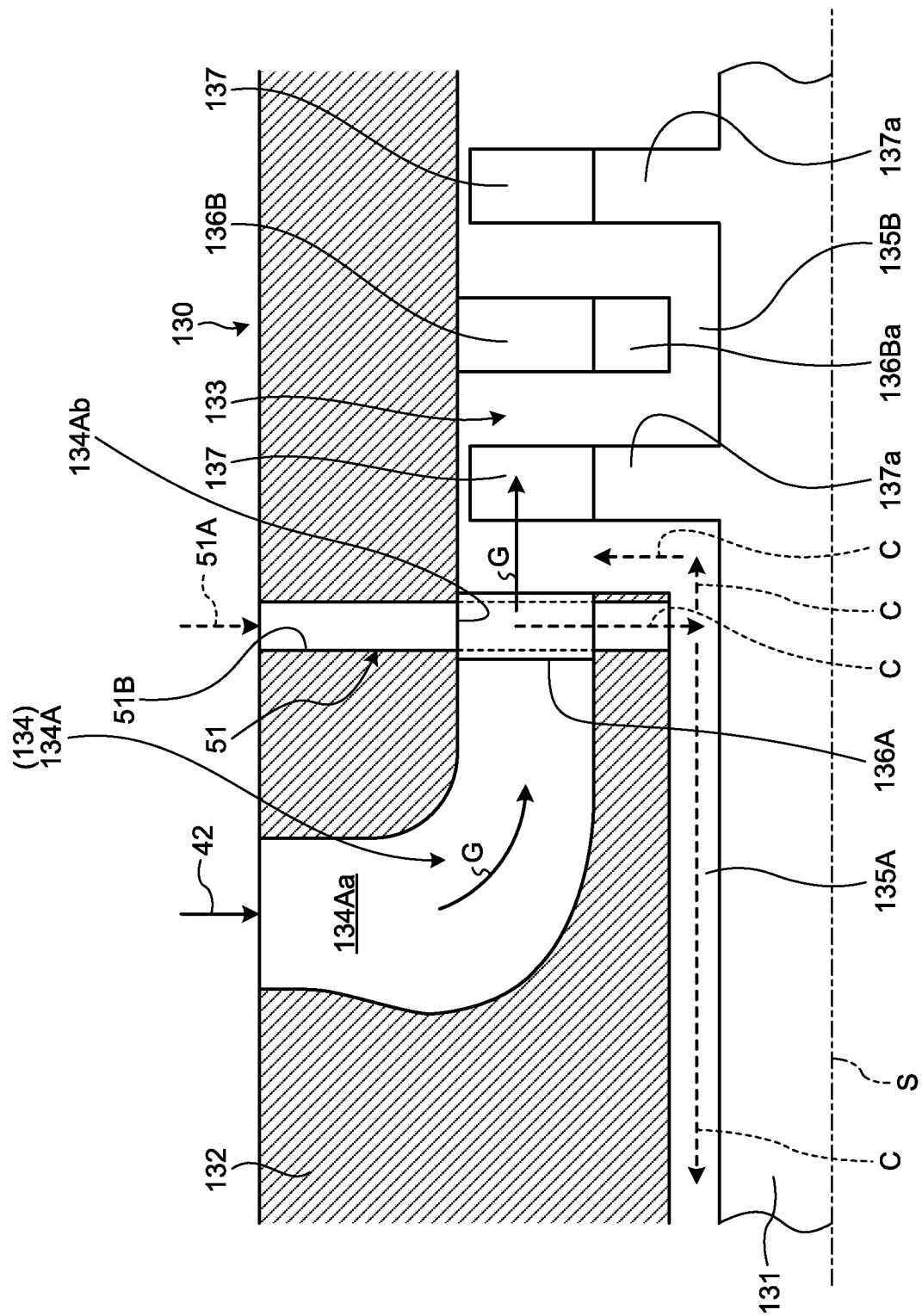
FIG. 23 is a schematic configuration diagram illustrating still another example of the cooling steam supply portion according to the second embodiment of the present invention.

In the cooling steam supply portion 51 illustrated in FIG. 23, the communication flow passage 51B is provided so as to penetrate the casing 132, the opening 134Ab of the intermediate-pressure steam nozzle chamber 134Aa in the intermediate-pressure steam nozzle portion 134A, and the nozzle portion vanes 136A, to communicate with the gap 135A, and to be open toward the outer circumferential surface of the rotor 131. More than one of the communication flow passages 51B may be provided along the circumferential direction of the intermediate-pressure steam nozzle portion 134A (rotational direction of the rotor 131), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 23, the cooling steam C supplied through the connection line 51A is discharged through the communication flow passage 51B toward the outer circumferential surface of the rotor 131 up to the gap 135A between the intermediate-pressure steam supply portion 134 and the outer circumferential surface of the rotor 131, flows along the extending direction of the rotor 131 through the gap 135A up to the steam passage 133, and merges, between the nozzle portion vanes 136A and the turbine blades 137, with the superheated steam G supplied to the steam passage 133.

The cooling steam supply portion 51 illustrated in FIG. 23 discharges the cooling steam C higher in pressure and lower in temperature than the superheated steam G supplied to the intermediate-pressure steam turbine 130 through the communication flow passage 51B to the gap 135A between the intermediate-pressure steam supply portion 134 and the outer circumferential surface of the rotor 131. Thereby, the rotor 131 can be cooled. In addition, since the cooling steam supply portion 51 illustrated in FIG. 23 discharges the cooling steam C higher in pressure and lower in temperature than the superheated steam G supplied to the intermediate-pressure steam turbine 130 through the communication flow passage 51B to the gap 135A between the intermediate-pressure steam supply portion 134 and the outer circumferential surface of the rotor 131, the superheated steam G is prevented from leaking out from the steam passage 133 through the gap 135A. As a result, since the superheated steam G is prevented from being lost, the intermediate-pressure steam turbine 130 can increase in operating efficiency, and the cycle efficiency can increase. Furthermore, since the cooling steam supply portion 51 illustrated in FIG. 23 is provided with the communication flow passage 51B penetrating the nozzle portion vanes 136A, the nozzle portion vanes 136A can be cooled, and thus, the nozzle portion vanes 136A can be improved in durability against a rise in temperature of the intermediate-pressure steam turbine 130.

Figure 24:
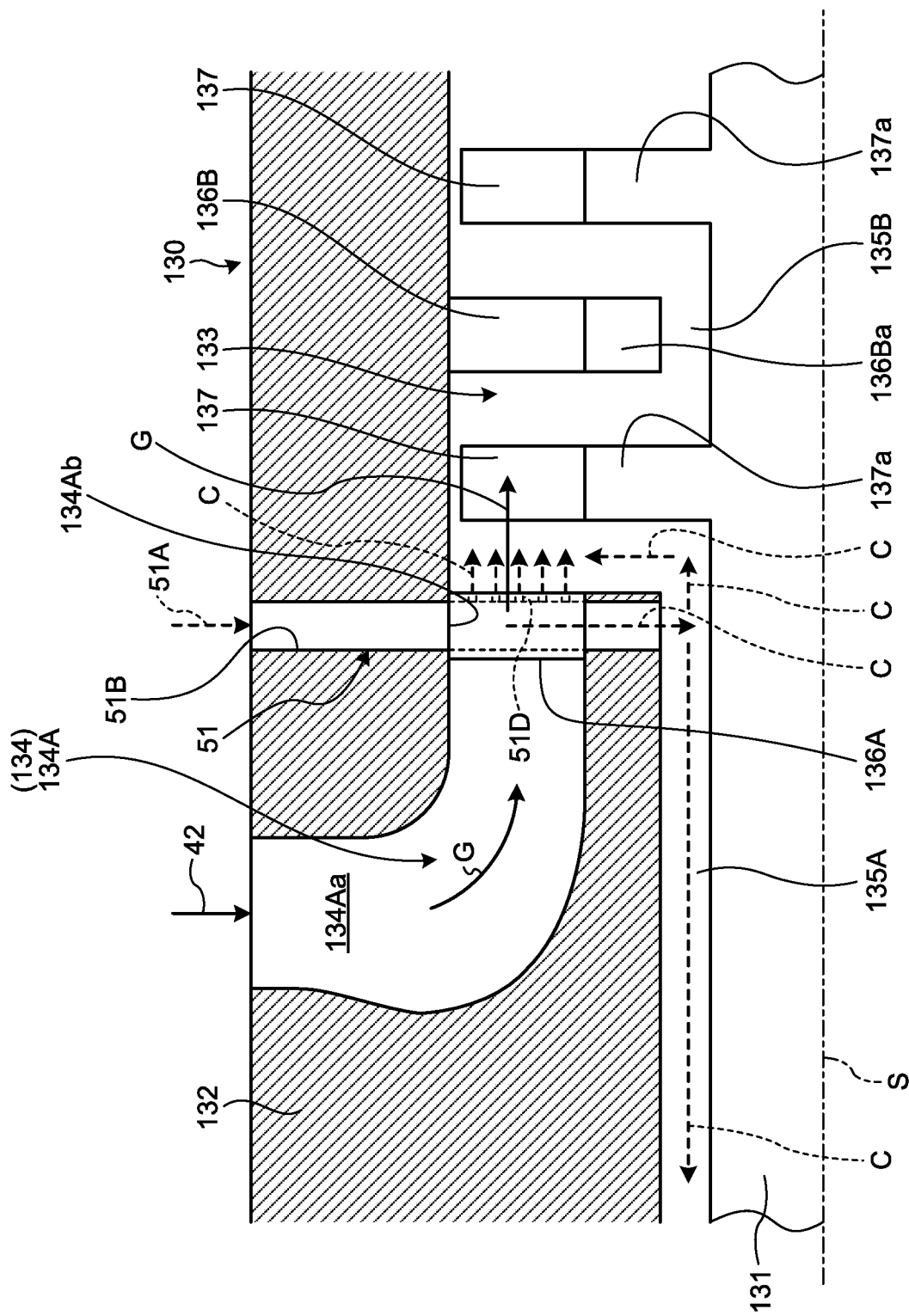
FIG. 24 is a schematic configuration diagram illustrating still another example of the cooling steam supply portion according to the second embodiment of the present invention.

In the cooling steam supply portion 51 illustrated in FIG. 24, the communication flow passage 51B illustrated in FIG. 23 includes the cooling holes 51D that penetrate the nozzle portion vanes 136A and are open to the steam passage 133. With this configuration, the cooling steam C is discharged to the steam passage 133 through the cooling holes 51D penetrating the nozzle portion vanes 136A. As a result, the nozzle portion vanes 136A can be cooled, and thus, the nozzle portion vanes 136A can be improved in durability against a further rise in temperature of the intermediate-pressure steam turbine 130.

Figure 25:
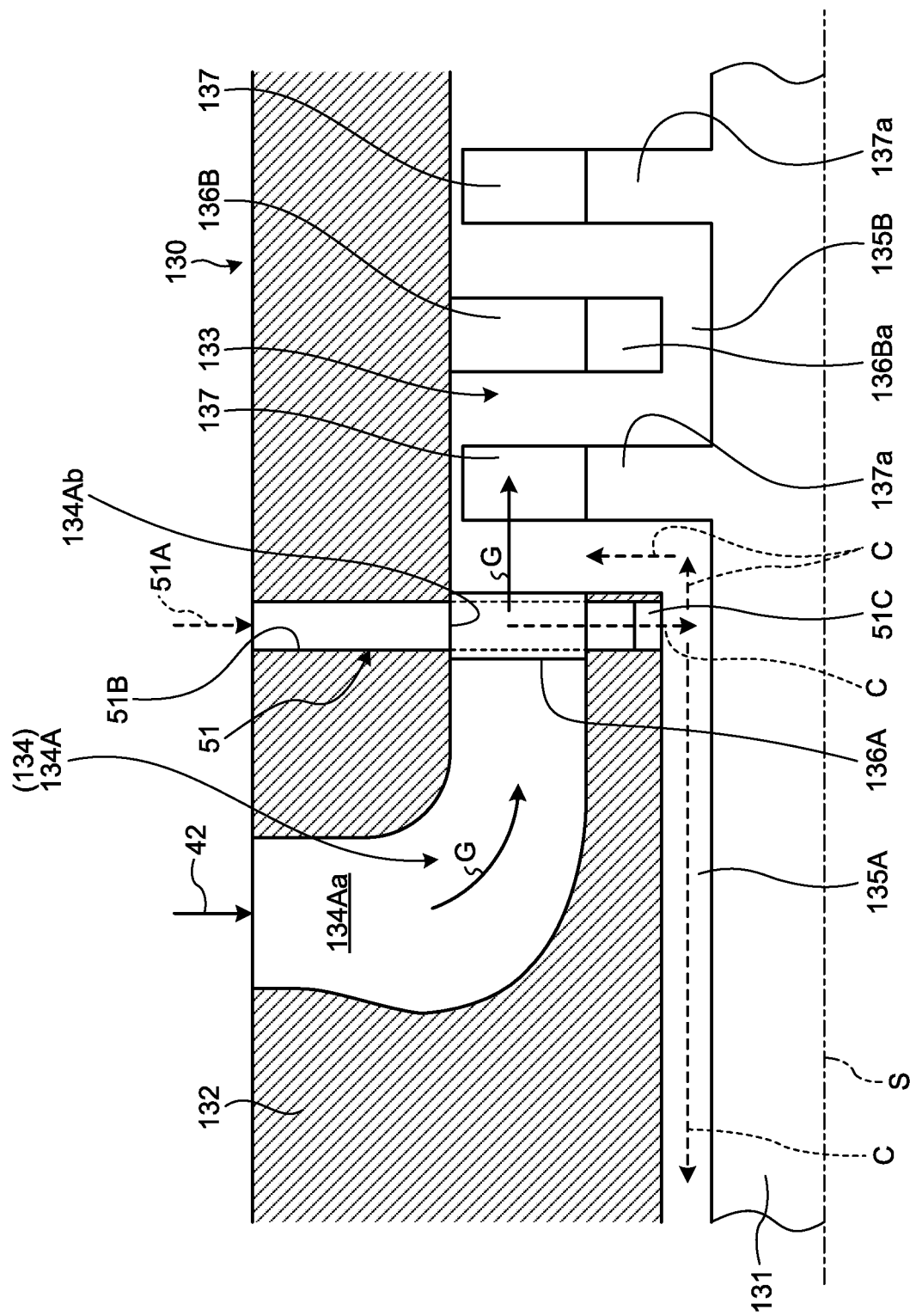
FIG. 25 is a schematic configuration diagram illustrating still another example of the cooling steam supply portion according to the second embodiment of the present invention.
Figure 26:
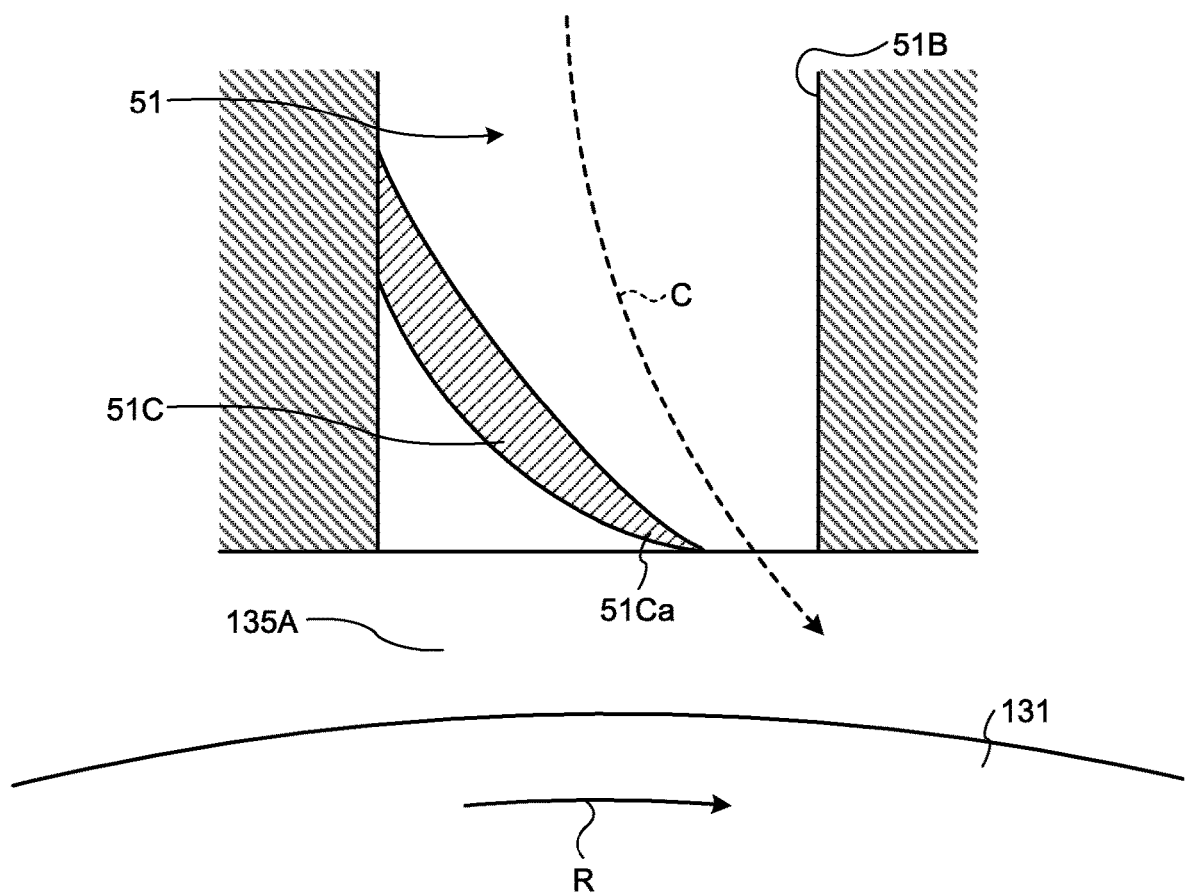
FIG. 26 is a schematic configuration diagram illustrating still another example of the cooling steam supply portion according to the second embodiment of the present invention.

In the cooling steam supply portion 51 illustrated in FIG. 25, the communication flow passage 51B illustrated in FIG. 23 preferably includes the cooling steam nozzle 51C provided at the opening communicating with the gap 135A. As illustrated in FIG. 26, the cooling steam nozzle 51C narrows the opening in the communication flow passage 51B communicating with the gap 135A. This configuration increases the flow velocity of the cooling steam C discharged from the communication flow passage 51B to the gap 135A. As a result, the temperature of the cooling steam C can be lowered, and the cooling efficiency can increase.

As illustrated in FIG. 26, the cooling steam nozzle 51C is preferably provided with the tip 51Ca thereof directed toward the rotational direction R of the rotor 131. With this configuration, the cooling steam C is discharged from the communication flow passage 51B to the gap 135A along the rotational direction R of the rotor 131. As a result, the frictional loss generated by the difference between the rotational velocity of the rotor 131 and the velocity of the cooling steam C can be reduced.

The configuration of the cooling steam nozzle 51C is not limited to a plate material as a separate member from the communication flow passage 51B as illustrated in FIGS. 25 and 26. The opening itself of the communication flow passage 51B may be narrowed to form the cooling steam nozzle 51C. The cooling steam nozzle 51C may be provided together with the cooling holes 51D.

Figure 27:
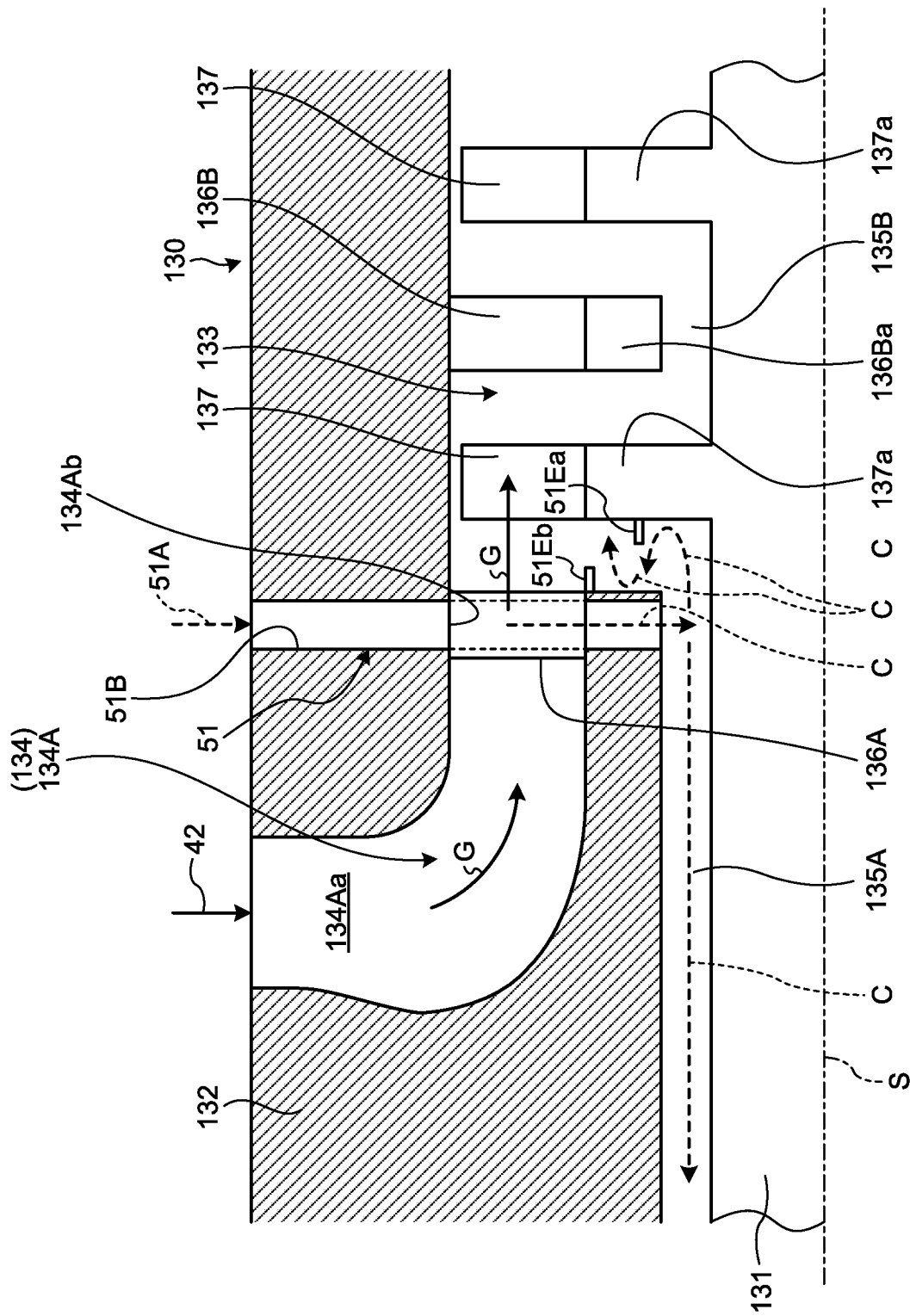
FIG. 27 is a schematic configuration diagram illustrating still another example of the cooling steam supply portion according to the second embodiment of the present invention.

The cooling steam supply portion 51 illustrated in FIG. 27 preferably includes the projecting portion 51Ea provided at the annular member 137a at the proximal end portion on the nozzle portion vane 136A side of the turbine blades 137 adjacent to the nozzle portion vanes 136A penetrated by the communication flow passage 51B illustrated in FIG. 23. The cooling steam supply portion 51 illustrated in FIG. 27 also preferably includes the projecting portion 51Eb provided at a part of the intermediate-pressure steam nozzle portion 134A that serves as the distal end portion of the nozzle portion vanes 136A penetrated by the communication flow passage 51B illustrated in FIG. 23 and that is opposed to the annular member 137a at the proximal end portion of the turbine blades 137.

The projecting portions 51Ea and 51Eb are preferably continuously provided along the circumferential direction of the intermediate-pressure steam turbine 130 (rotational direction of the rotor 131).

With this configuration, the projecting portions 51Ea and 51Eb cause the cooling steam C flowing toward the steam passage 133 to generate a vortex between the opening 134Ab of the intermediate-pressure steam nozzle chamber 134Aa in the intermediate-pressure steam nozzle portion 134A provided with the nozzle portion vanes 136A and the annular member 137a at the proximal end portion of the turbine blades 137. As a result, the superheated steam G in the steam passage 133 is prevented from being mixed in a complex manner with the cooling steam C flowing toward the steam passage 133 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 131 and provide the projecting portion 51Eb in a position farther from the rotor 131. This configuration causes the cooling steam C discharged from the communication flow passage 51B penetrating the nozzle portion vanes 136A toward the outer circumferential surface of the rotor 131 to generate the vortex first due to the projecting portion 51Ea, and then due to the projecting portion 51Eb. As a result, the effect can be significantly obtained to prevent the superheated steam G in the steam passage 133 from being mixed in a complex manner with the cooling steam C flowing toward the steam passage 133. The projecting portions 51Ea and 51Eb may be provided together with the cooling steam nozzle 51C and the cooling holes 51D.

Figure 28:
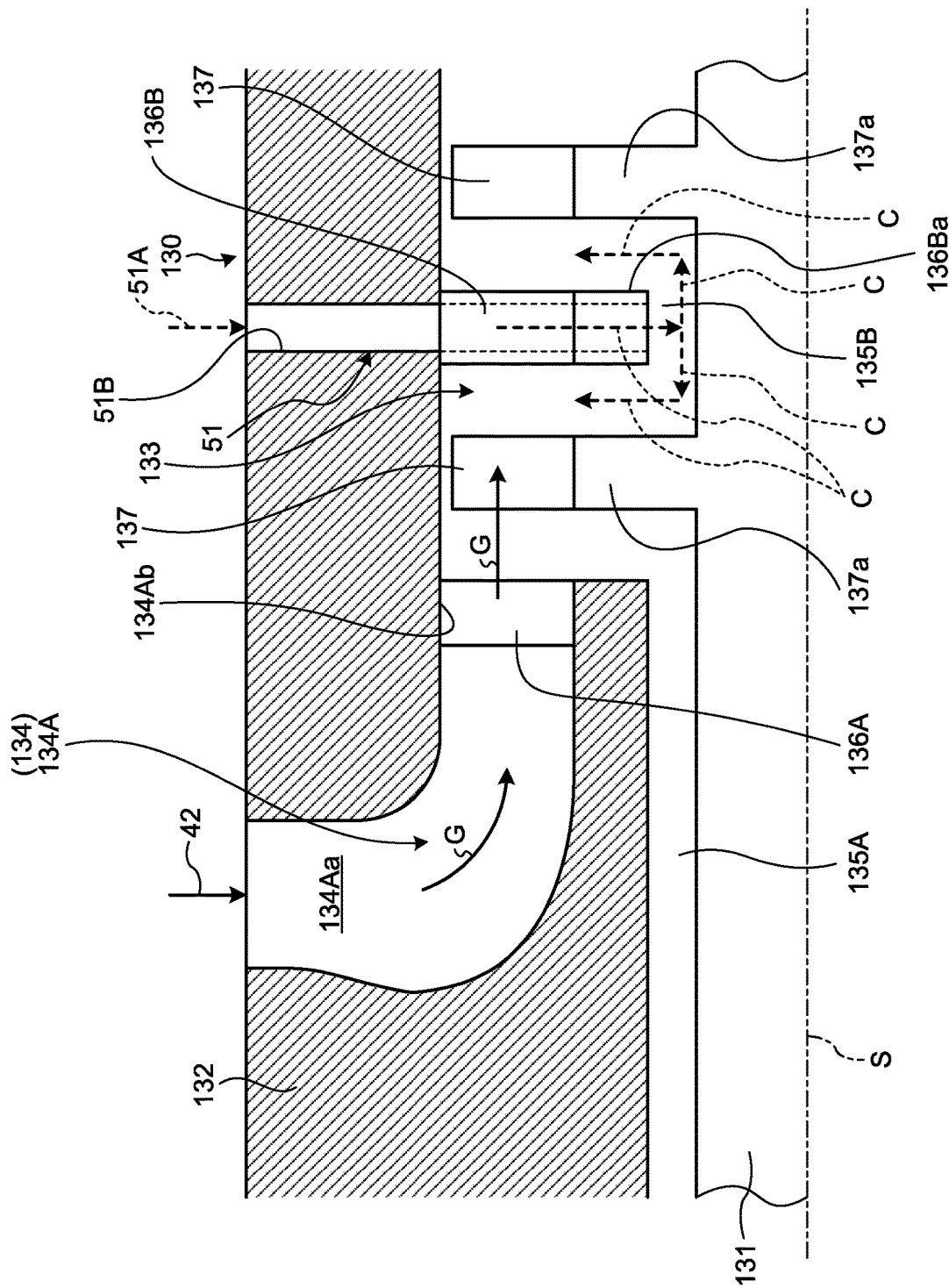
FIG. 28 is a schematic configuration diagram illustrating still another example of the cooling steam supply portion according to the second embodiment of the present invention.

In the cooling steam supply portion 51 illustrated in FIG. 28, the communication flow passage 51B is provided so as to penetrate the casing 132, the steam passage vanes 136B, and the annular member 136Ba at the distal end portion of the steam passage vanes 136B, to communicate with the gap 135B, and to be open toward the outer circumferential surface of the rotor 131. More than one of the communication flow passages 51B may be provided along the circumferential direction of the intermediate-pressure steam nozzle portion 134A (rotational direction of the rotor 131), or the communication flow passage 51B may be provided alone. If more than one of the communication flow passages 51B are provided, the connection line 51A branches into a plurality of lines, and is connected to the communication flow passages 51B.

Accordingly, as illustrated in FIG. 28, the cooling steam C supplied through the connection line 51A is discharged through the communication flow passage 51B toward the outer circumferential surface of the rotor 131 up to the gap 135B between the annular member 136Ba of the steam passage vanes 136B and the outer circumferential surface of the rotor 131, flows along the extending direction of the rotor 131 through the gap 135B up to the steam passage 133, and merges, between the steam passage vanes 136B and the turbine blades 137, with the superheated steam G supplied to the steam passage 133.

The cooling steam supply portion 51 illustrated in FIG. 28 discharges the cooling steam C higher in pressure and lower in temperature than the superheated steam G supplied to the intermediate-pressure steam turbine 130 through the communication flow passage 51B to the gap 135B between the annular member 136Ba of the steam passage vanes 136B and the outer circumferential surface of the rotor 131. Thereby, the rotor 131 can be cooled. In addition, since the cooling steam supply portion 51 illustrated in FIG. 28 is provided with the communication flow passage 51B penetrating the steam passage vanes 136B, the steam passage vanes 136B can be cooled, and thus, the steam passage vanes 136B can be improved in durability against the rise in temperature of the intermediate-pressure steam turbine 130.

Figure 29:
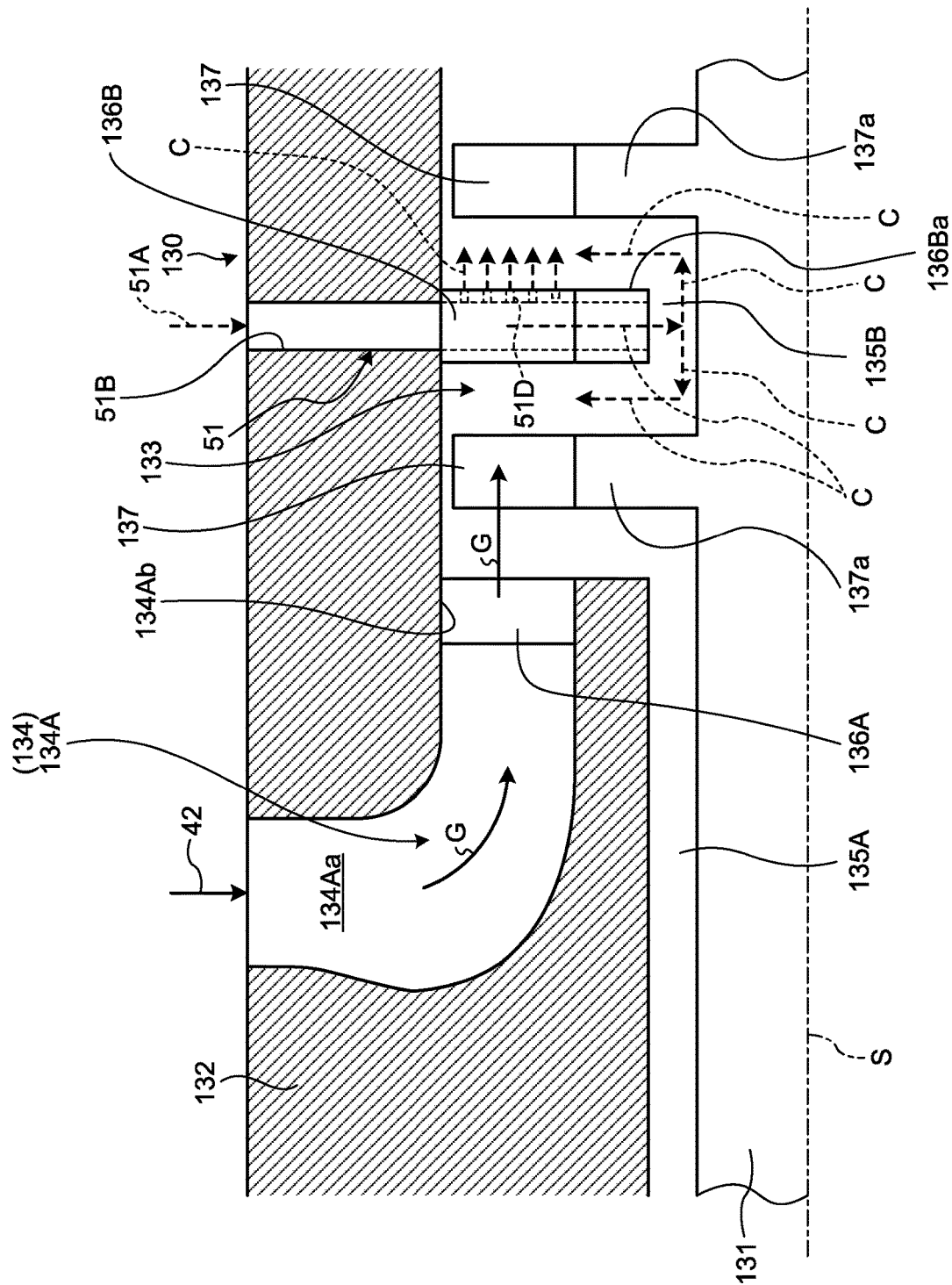
FIG. 29 is a schematic configuration diagram illustrating still another example of the cooling steam supply portion according to the second embodiment of the present invention.

In the cooling steam supply portion 51 illustrated in FIG. 29, the communication flow passage 51B illustrated in FIG. 28 includes the cooling holes 51D that penetrate the steam passage vanes 136B and are open to the steam passage 133. With this configuration, the cooling steam C is discharged to the steam passage 133 through the cooling holes 51D penetrating the steam passage vanes 136B. As a result, the nozzle portion vanes 136A can be cooled, and thus, the steam passage vanes 136B can be improved in durability against the further rise in temperature of the intermediate-pressure steam turbine 130.

Figure 30:
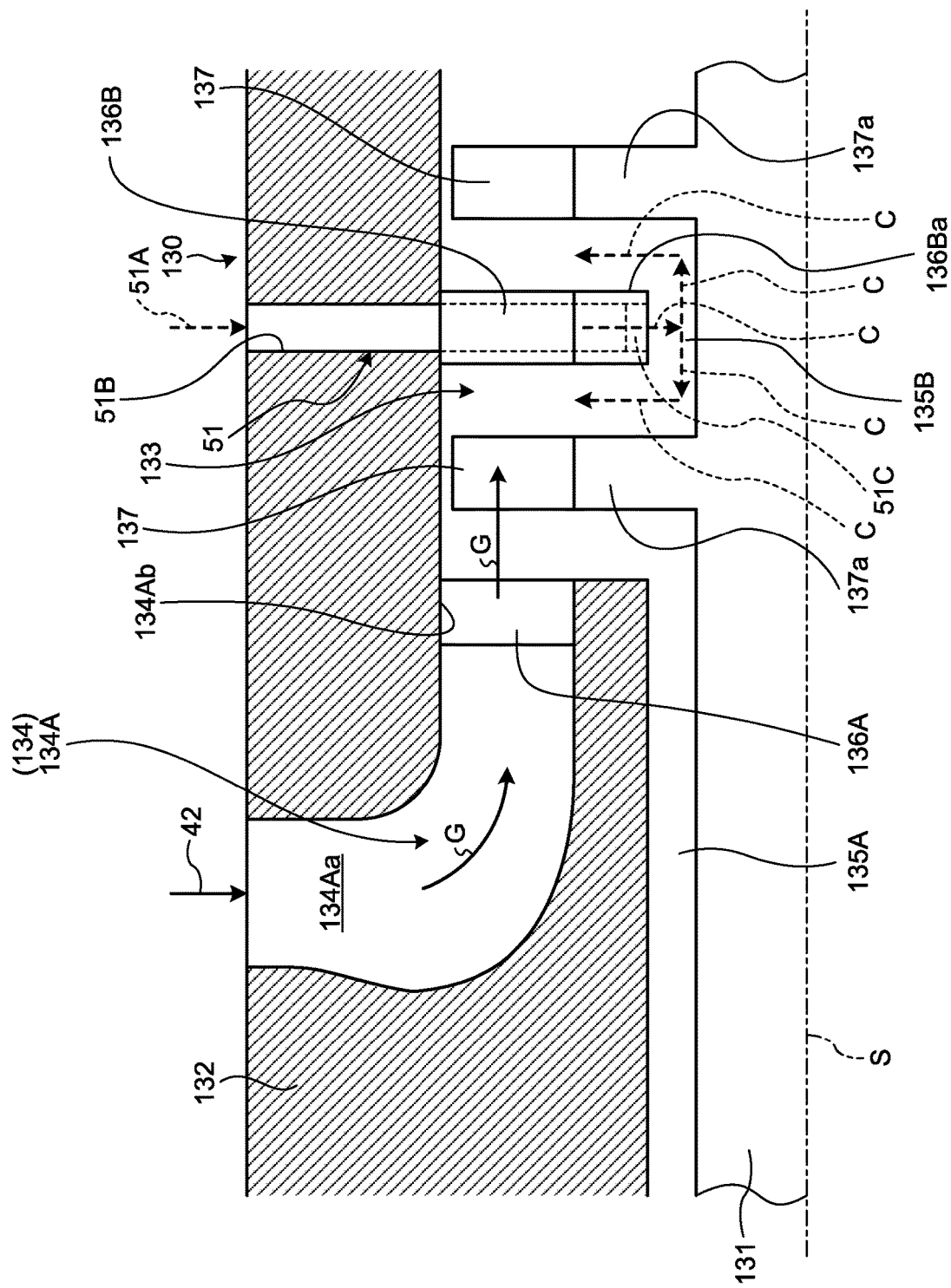
FIG. 30 is a schematic configuration diagram illustrating still another example of the cooling steam supply portion according to the second embodiment of the present invention.
Figure 31:
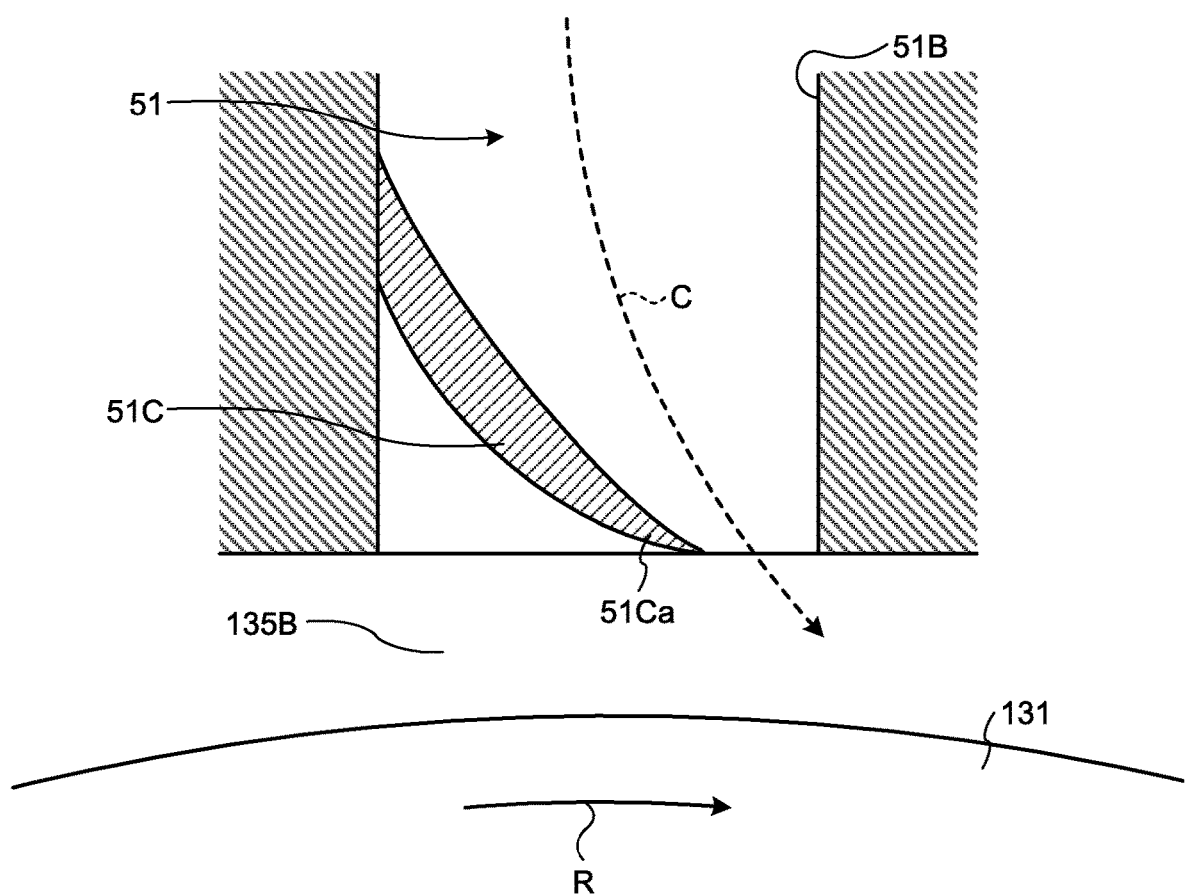
FIG. 31 is a schematic configuration diagram illustrating still another example of the cooling steam supply portion according to the second embodiment of the present invention.

In the cooling steam supply portion 51 illustrated in FIG. 30, the communication flow passage 51B illustrated in FIG. 28 preferably includes the cooling steam nozzle 51C provided at the opening communicating with the gap 135B. As illustrated in FIG. 31, the cooling steam nozzle 51C narrows the opening in the communication flow passage 51B communicating with the gap 135B. This configuration increases the flow velocity of the cooling steam C discharged from the communication flow passage 51B to the gap 135B. As a result, the temperature of the cooling steam C can be lowered, and the cooling efficiency can increase.

As illustrated in FIG. 31, the cooling steam nozzle 51C is preferably provided with the tip 51Ca thereof directed toward the rotational direction R of the rotor 131. With this configuration, the cooling steam C is discharged from the communication flow passage 51B to the gap 135B along the rotational direction R of the rotor 131. As a result, the frictional loss generated by the difference between the rotational velocity of the rotor 131 and the velocity of the cooling steam C can be reduced.

The configuration of the cooling steam nozzle 51C is not limited to a plate material as a separate member from the communication flow passage 51B as illustrated in FIGS. 30 and 31 but may be formed by narrowing the opening of the communication flow passage 51B. The cooling steam nozzle 51C may be provided together with the cooling holes 51D.

Figure 32:
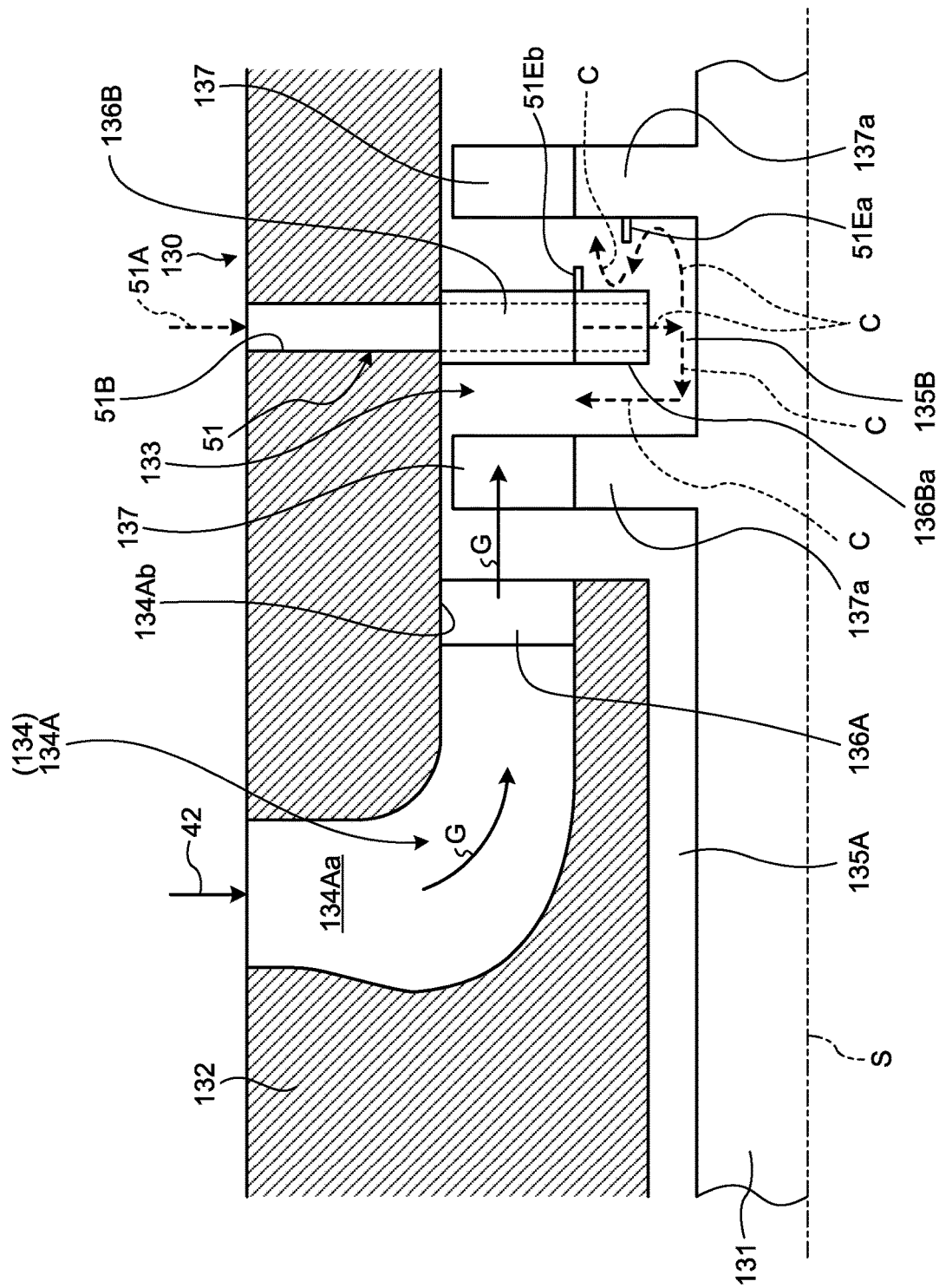
FIG. 32 is a schematic configuration diagram illustrating still another example of the cooling steam supply portion according to the second embodiment of the present invention.

The cooling steam supply portion 51 illustrated in FIG. 32 preferably includes the projecting portion 51Ea provided at the annular member 137a at the proximal end portion on the steam passage vane 136B side of the turbine blades 137 adjacent to the steam passage vanes 136B penetrated by the communication flow passage 51B illustrated in FIG. 28. The cooling steam supply portion 51 illustrated in FIG. 32 also preferably includes the projecting portion 51Eb provided at the annular member 136Ba that serves as the distal end portion of the steam passage vanes 136B penetrated by the communication flow passage 51B illustrated in FIG. 28 and that is opposed to the annular member 137a at the proximal end portion of the turbine blades 137.

The projecting portions 51Ea and 51Eb are preferably continuously provided along the circumferential direction of the intermediate-pressure steam turbine 130 (rotational direction of the rotor 131).

With this configuration, the projecting portions 51Ea and 51Eb cause the cooling steam C flowing toward the steam passage 133 to generate a vortex between the annular member 136Ba at the distal end portion of the steam passage vanes 136B and the annular member 137a at the proximal end portion of the turbine blades 137. As a result, the superheated steam G in the steam passage 133 is prevented from being mixed in a complex manner with the cooling steam C flowing toward the steam passage 133 to raise the temperature of the cooling steam C, and thus, the cooling efficiency can increase.

Although the configuration may be such that only either one of the projecting portions 51Ea or 51Eb is provided, both the projecting portions 51Ea and 51Eb are preferably provided. In the case of providing both the projecting portions 51Ea and 51Eb, it is preferable to provide the projecting portion 51Ea in a position closer to the rotor 131 and provide the projecting portion 51Eb in a position farther from the rotor 131. This configuration causes the cooling steam C discharged from the communication flow passage 51B penetrating the steam passage vanes 136B toward the outer circumferential surface of the rotor 131 to generate the vortex first due to the projecting portion 51Ea, and then due to the projecting portion 51Eb. As a result, the effect can be significantly obtained to prevent the superheated steam G in the steam passage 133 from being mixed in a complex manner with the cooling steam C flowing toward the steam passage 133. The projecting portions 51Ea and 51Eb may be provided together with the cooling steam nozzle 51C and the cooling holes 51D. The projecting portions 51Ea and 51Eb illustrated in FIG. 32 are provided on a downstream side of the flow of the superheated steam G between the annular member 136Ba at the distal end portion of the steam passage vanes 136B and the annular member 137a at the proximal end portion of the turbine blades 137, but may be provided on an upstream side of the flow of the superheated steam G.

The configuration of the intermediate-pressure steam turbine 130 illustrated in FIGS. 28 to 32 includes an integrated configuration with the high-pressure steam turbine 120. In this case, the gap 135A is supplied with the steam that is used for driving the high-pressure steam turbine 120, and that is higher in pressure and lower in temperature than the superheated steam G. Consequently, the rotor 131 is cooled at the gap 135A, and, in addition, the superheated steam G is prevented from leaking out from the gap 135A. In this configuration, the cooling steam C is discharged from the communication flow passage 51B penetrating the steam passage vanes 136B toward the outer circumferential surface of the rotor 131 up to the gap 135B, and cools the rotor 131 in the vicinity of the gap 135B.

The above-described second embodiment may be configured in combination with the above-described first embodiment.

REFERENCE SIGNS LIST 1 boiler
10 low-pressure economizer
11 low-pressure drum
12 low-pressure evaporator
13 intermediate-pressure economizer
14 high-pressure primary economizer
15 intermediate-pressure drum
16 intermediate-pressure evaporator
17 low-pressure superheater
18 high-pressure secondary economizer
19 intermediate-pressure superheater
20 high-pressure drum
21 high-pressure evaporator
22 high-pressure primary superheater
23 primary reheater
24 secondary reheater
25 high-pressure secondary superheater
26 condensate pump
27 intermediate-pressure feed water pump
28 high-pressure feed water pump
30 connection line
31 connection line
31a low-pressure branch line
31b intermediate-pressure branch line
31c high-pressure branch line
32 connection line
33 connection line
34 connection line
35 connection line
36 flow control valve
37 connection line
38 connection line
39 connection line
40 connection line
41 connection line
42 connection line
43 connection line
44 connection line
45 flow control valve
46 connection line
47 connection line
48 connection line 49 connection line
51 cooling steam supply portion
51A connection line
51B communication flow passage
51C cooling steam nozzle
51Ca tip
51D cooling holes
51Ea projecting portion
51Eb projecting portion
100, 200 combined cycle plant
110 gas turbine
111 compressor
112 combustor
113 turbine
113a flue gas duct
114 compressor inlet air
115 fuel
120 high-pressure steam turbine
121 rotor
122 casing
123 steam passage
124 high-pressure steam supply portion
124A high-pressure steam nozzle portion
124Aa high-pressure steam nozzle chamber
124Ab opening
125A gap
125B gap
126A nozzle portion vanes
126B steam passage vanes
126Ba annular member
127 turbine blades
127a annular member
130 intermediate-pressure steam turbine
131 rotor
132 casing
133 steam passage
134 intermediate-pressure steam supply portion
134A intermediate-pressure steam nozzle portion
134Aa intermediate-pressure steam nozzle chamber
134Ab opening
135A gap
135B gap
136A nozzle portion vanes
136B steam passage vanes
136Ba annular member
137 turbine blades
137a annular member
140 low-pressure steam turbine
150 generator
160 condenser
C cooling steam
G superheated steam
R rotational direction
S axial center

The invention claimed is:

1. A combined cycle plant, comprising:
a gas turbine;
a boiler, a heat source of the boiler being a flue gas discharged from the gas turbine;
a high-pressure steam turbine that comprises a first rotor extending along an axial center of rotation of the first rotor, a first casing accommodating the first rotor, a first steam passage provided along an extending direction of the first rotor between the first rotor and the first casing, and a high-pressure steam supply portion provided so as to communicate, from outside the first casing through the first casing, with the first steam passage and configured to be supplied with high-pressure steam generated by the boiler, the high-pressure steam turbine being driven by the high-pressure steam;
a low-pressure steam turbine configured to be driven by low-pressure steam generated by the boiler and by discharged steam that has flowed through the high-pressure steam turbine;
a condenser configured to condense discharged steam that has flowed through the low-pressure steam turbine into a condensate;
a condensate pump configured to supply the condensate from the condenser to the boiler; and
a first cooling steam supply portion that comprises a first communication flow passage communicating, from outside the first casing through the first casing, with the first steam passage separately from the high-pressure steam supply portion, and that communicates with an inside of the high-pressure steam turbine, wherein
the boiler comprises a high-pressure evaporator configured to generate the high-pressure steam from the condensate from the condenser, a high-pressure primary superheater configured to superheat the high-pressure steam generated by the high-pressure evaporator, and a high-pressure secondary superheater configured to further superheat the high-pressure steam superheated by the high-pressure primary superheater, the high-pressure steam further superheated by the high-pressure secondary superheater being supplied for driving the high-pressure steam turbine, and
a first passage extends from an outlet of the high-pressure evaporator, through the high-pressure primary superheater, and into the high-pressure secondary superheater, and the first cooling steam supply portion comprises a first connection line that communicates the inside of the high-pressure steam turbine with the first passage at a point between the outlet of the high-pressure evaporator and an inlet of the high-pressure secondary superheater.

2. The combined cycle plant according to claim 1, wherein
the high-pressure steam supply portion comprises a high-pressure steam nozzle portion that is formed in an annular shape surrounding an outer circumference of the first rotor and mounted to the first casing to have a first gap communicating with the first steam passage between an outer surface of the high-pressure steam nozzle portion and an outer circumferential surface of the first rotor, the high-pressure steam nozzle portion having a high-pressure steam nozzle chamber formed therein, the high-pressure steam nozzle chamber having an opening communicating with the first steam passage long the extending direction of the first rotor, the high-pressure steam nozzle chamber being supplied with the high-pressure steam,
nozzle portion vanes are mounted to the opening of the high-pressure steam nozzle chamber in the high-pressure steam nozzle portion, and
the first communication flow passage is provided so as to penetrate the nozzle portion vanes and communicate with the first gap.

3. The combined cycle plant according to claim 2, wherein the point at which the first connection line communicates the inside of the high-pressure steam turbine with the first passage is between an outlet of the high-pressure primary superheater and the inlet of the high-pressure secondary superheater.

4. The combined cycle plant according to claim 1, further comprising:
an intermediate-pressure steam turbine that comprises a second rotor extending along an axial center of rotation of the second rotor, a second casing accommodating the second rotor, a second steam passage provided along an extending direction of the second rotor between the second rotor and the second casing, and an intermediate-pressure steam supply portion provided so as to communicate, from outside the second casing through the second casing, with the second steam passage and configured to be supplied with intermediate-pressure steam generated by the boiler, the intermediate-pressure steam turbine being driven by the intermediate-pressure steam; and
a second cooling steam supply portion that comprises a second communication flow passage communicating, from outside the second casing through the second casing, with the second steam passage separately from the intermediate-pressure steam supply portion, and that communicates with an inside of the intermediate-pressure steam turbine, wherein
the intermediate-pressure steam supply portion comprises an intermediate-pressure steam nozzle portion that is formed in an annular shape surrounding an outer circumference of the second rotor and mounted to the second casing to have a second gap communicating with the second steam passage between an outer surface of the intermediate-pressure steam nozzle portion and an outer circumferential surface of the second rotor, the intermediate-pressure steam nozzle portion having an intermediate-pressure steam nozzle chamber formed therein, the intermediate-pressure steam nozzle chamber having an opening communicating with the second steam passage along the extending direction of the second rotor, the intermediate-pressure steam nozzle chamber being supplied with the intermediate-pressure steam,
nozzle portion vanes are mounted to the opening of the intermediate-pressure steam nozzle chamber in the intermediate-pressure steam nozzle portion, and
the second communication flow passage is provided so as to penetrate the nozzle portion vanes of the opening of the intermediate pressure steam nozzle chamber and communicate with the second gap.

5. The combined cycle plant according to claim 4, wherein
the boiler further comprises an intermediate-pressure evaporator configured to generate the intermediate-pressure steam from the condensate from the condenser, an intermediate-pressure superheater configured to superheat the intermediate-pressure steam generated by the intermediate-pressure evaporator, a primary reheater configured to reheat the intermediate-pressure steam superheated by the intermediate-pressure superheater, and a secondary reheater configured to reheat the intermediate-pressure steam superheated by the primary reheater, the intermediate-pressure steam superheated by the secondary reheater being supplied for driving the intermediate-pressure steam turbine, and
a second passage extends from an outlet of the intermediate-pressure evaporator, through the intermediate-pressure superheater and the primary reheater, and into the secondary reheater, and the second cooling steam supply portion comprises a second connection line that communicates the inside of the intermediate-pressure steam turbine with the second passage at a point between the outlet of the intermediate-pressure evaporator and an inlet of the secondary reheater.

6. The combined cycle plant according to claim 5, wherein the point at which the second connection line communicates the inside of the intermediate-pressure steam turbine with the second passage is between an outlet of the intermediate-pressure superheater and an inlet of the primary reheater.

7. The combined cycle plant according to claim 5, wherein the point at which the second connection line communicates the inside of the intermediate-pressure steam turbine with the second passage is between an outlet of the primary reheater and the inlet of the secondary reheater.

8. The combined cycle plant according to claim 1, wherein
steam passage vanes are mounted to the first casing forming the first steam passage to have a gap communicating with the first steam passage between the steam passage vanes and an outer circumferential surface of the first rotor, and
the first communication flow passage is provided so as to penetrate the steam passage vanes and communicate with the gap.

9. The combined cycle plant according to claim 8, wherein
turbine blades are mounted to the outer circumferential surface of the first rotor adjacent to the steam passage vanes, and
the first cooling steam supply portion comprises a projecting portion provided at least at one of
a proximal end portion of the turbine blades adjacent to the steam passage vanes penetrated by the first communication flow passage, on a side of the turbine blades which faces the steam passage vanes, and
a distal end portion of the steam passage vanes penetrated by the first communication flow passage, on a side of the steam passage vanes which faces the turbine blades.

10. The combined cycle plant according to claim 8, wherein the first communication flow passage comprises a cooling hole penetrating the steam passage vanes and open to the first steam passage.

11. The combined cycle plant according to claim 8, wherein the first communication flow passage comprises a cooling steam nozzle provided at an opening communicating with the gap.

12. The combined cycle plant according to claim 11, wherein the cooling steam nozzle is provided with a tip thereof directed toward a rotational direction of the first rotor.

13. A combined cycle plant, comprising:
a gas turbine;
a boiler, a heat source of the boiler being a flue gas discharged from the gas turbine;
a high-pressure steam turbine configured to be driven by high-pressure steam generated by the boiler;
a low-pressure steam turbine configured to be driven by low-pressure steam generated by the boiler and by discharged steam that has flowed through the high-pressure steam turbine;
a condenser configured to condense discharged steam that has flowed through the low-pressure steam turbine into a condensate; and
a condensate pump configured to supply the condensate from the condenser to the boiler, wherein the boiler comprises a high-pressure evaporator configured to generate the high-pressure steam from the condensate from the condenser, a high-pressure primary superheater configured to superheat the high-pressure steam generated by the high-pressure evaporator, and a high-pressure secondary superheater configured to further superheat the high-pressure steam superheated by the high-pressure primary superheater, the high-pressure steam further superheated by the high-pressure secondary superheater being supplied for driving the high-pressure steam turbine, and a passage extends from an outlet of the high-pressure evaporator, through the high-pressure primary superheater, and into the high-pressure secondary superheater, and the combined cycle plant further comprises a cooling steam supply portion comprising a connection line that communicates an inside of the high-pressure steam turbine with the passage at a point between the outlet of the high-pressure evaporator and an inlet of the high-pressure secondary superheater.

14. A combined cycle plant, comprising:

a gas turbine;

a boiler, a heat source of the boiler being a flue gas discharged from the gas turbine;

a high-pressure steam turbine configured to be driven by high-pressure steam generated by the boiler;

an intermediate-pressure steam turbine configured to be driven by intermediate-pressure steam generated by the boiler;

a low-pressure steam turbine configured to be driven by low-pressure steam generated by the boiler, and by discharged steam that has flowed through the intermediate-pressure steam turbine;

a condenser configured to condense discharged steam that has flowed through the low-pressure steam turbine into a condensate; and a condensate pump configured to supply the condensate from the condenser to the boiler, wherein the boiler comprises an intermediate-pressure evaporator configured to generate the intermediate-pressure steam from the condensate from the condenser, an intermediate-pressure superheater configured to superheat the intermediate-pressure steam generated by the intermediate-pressure evaporator, a primary reheater configured to reheat the intermediate-pressure steam superheated by the intermediate-pressure superheater, and a secondary reheater configured to reheat the intermediate-pressure steam superheated by the primary reheater, the intermediate-pressure steam superheated by the secondary reheater being supplied for driving the intermediate-pressure steam turbine, and a passage extends from an outlet of the intermediate-pressure evaporator, through the intermediate-pressure superheater and the primary reheater, and into the secondary reheater, and the combined cycle plant further comprises a cooling steam supply portion comprising a connection line that communicates an inside of the intermediate-pressure steam turbine with the passage at a point between the outlet of the intermediate-pressure evaporator and an inlet of the secondary reheater.

* * * * *